(12) United States Patent  
Vaidyanathan et al.

(10) Patent No.: US 10,719,974 B1  
(45) Date of Patent: Jul. 21, 2020

(54) APPARATUS AND METHOD FOR EFFICIENTLY STORING RAY TRAVERSAL DATA

(71) Applicant: Intel Corporation, Santa Clara, CA (US)

(72) Inventors: Karthik Vaidyanathan, San Francisco, CA (US); Sven Woop, Völklingen (DE); Carsten Benthin, Völklingen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/367,062

(22) Filed: Mar. 27, 2019

Related U.S. Application Data

(63) Continuation-in-part of application No. 16/235,604, filed on Dec. 28, 2018.

(51) Int. Cl.
  *G06T 15/06* (2011.01)
  *G06T 17/00* (2006.01)
  (Continued)

(52) U.S. Cl.
  CPC ............... *G06T 15/06* (2013.01); *G06T 1/60* (2013.01); *G06T 9/40* (2013.01); *G06T 17/005* (2013.01);
  (Continued)

(58) Field of Classification Search
  None
  See application file for complete search history.

(56) References Cited

U.S. PATENT DOCUMENTS 8,289,324 B1  10/2012  Lee et al.
2016/0292908 A1*  10/2016  Obert ..................... G06T 1/20
(Continued)

FOREIGN PATENT DOCUMENTS

WO  2008/012199 A2  1/2008
WO  2009/063319 A2  5/2009

OTHER PUBLICATIONS

Non-Final Office Action received for U.S. Appl. No. 16/235,604, dated Nov. 19, 2019, 6 pages.
(Continued)

*Primary Examiner* — Vu Nguyen
(74) *Attorney, Agent, or Firm* — Nicholson De Vos Webster & Elliott LLP

(57) ABSTRACT

Apparatus and method for preventing re-traversal of a prior path on a restart. For example, one embodiment of an apparatus comprises: a ray generator to generate a plurality of rays in a first graphics scene; a bounding volume hierarchy (BVH) generator to construct a BVH comprising a plurality of hierarchically arranged nodes, wherein the BVH comprises a specified number of child nodes at a current BVH level beneath a parent node in the hierarchy; traversal/intersection circuitry to traverse one or more of the rays through the hierarchically arranged nodes of the BVH to form a current traversal path and intersect the one or more rays with primitives contained within the nodes; and traversal tracking circuitry to maintain a path encoding array to store path data related to the current traversal path, the path data comprising an index of a currently traversed child node; wherein the traversal/intersection circuitry is to prevent one or more subsequent rays from re-intersecting primitives from which they originated and/or avoid re-traversing the current traversal path based on the path data in the path encoding array.

27 Claims, 54 Drawing Sheets

(51) Int. Cl.
*G06T 9/40* (2006.01)
*G06T 1/60* (2006.01)
(52) U.S. Cl.
CPC ...... *G06T 2210/12* (2013.01); *G06T 2210/21* (2013.01)

(56) References Cited

U.S. PATENT DOCUMENTS

2019/0035138 A1* 1/2019 Fuetterling ............. G06T 15/06
2019/0197761 A1* 6/2019 Saleh ...................... G06T 15/04

OTHER PUBLICATIONS

Keely, S., "Reduced Precision for Hardware Ray Tracing in GPUs", High Performance Graphics, Jonathan Ragan-Kelley and Ingo Wald (Editors), 2014, 12 pages.
Laine, Samuli, "Restart Trail for Stackless BVH Traversal", High Performance Graphics, M. Doggett, S. Laine, and W. Hunt (Editors), 2010, 5 pages.
Vaidyanathan et al., "Watertight Ray Traversal with Reduced Precision", High Performance Graphics, Ulf Assarsson and Warren Hunt (Editors), 2016, 8 pages.
Vaidyanathan et al., U.S. Appl. No. 16/056,222, filed Aug. 6, 2018, entitled "Programmable Ray Tracing With Hardware Acceleration on a Graphics Processor", 92 pages.
Ylitie et al., "Efficient Incoherent Ray Traversal on GPUs Through Compressed Wide BVHs", HPG '17, Jul. 28-30, 2017, 13 pages.
Extended European Search Report, EP App. No. 19200961.1, dated Mar. 27, 2020, 10 pages.
Extended European Search Report, EP App. No. 19204304.0, dated Mar. 27, 2020, 10 pages.
Vaidyanathan et al., "Wide BVH Traversal with a Short Stack", High-Performance Graphics, Intel Corporation, 2019, 5 pages.

* cited by examiner

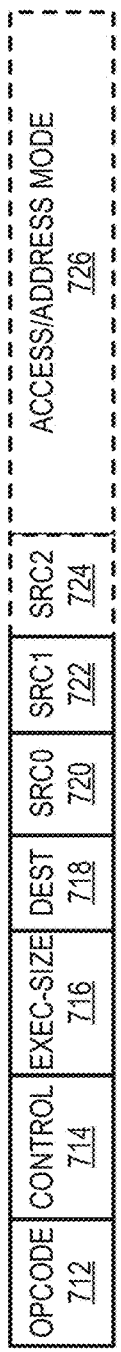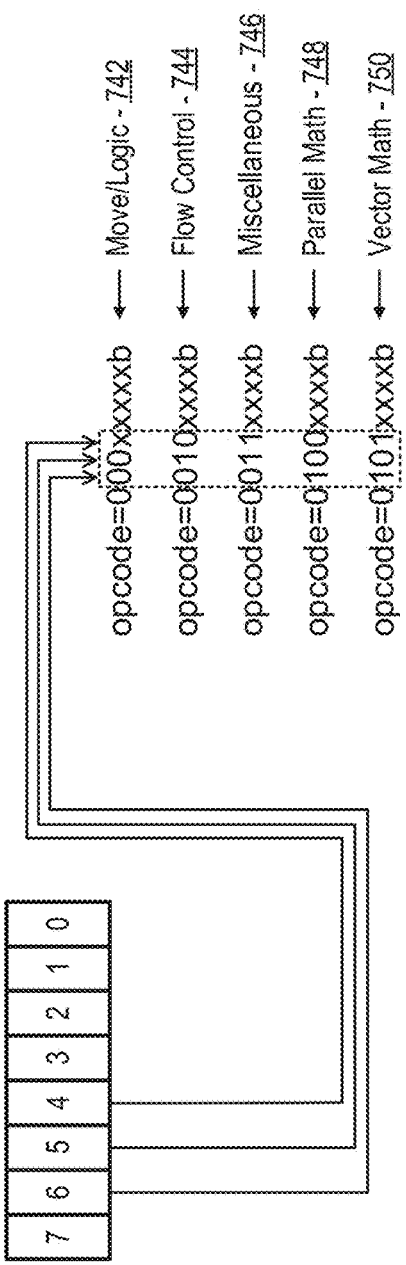
FIG. 7

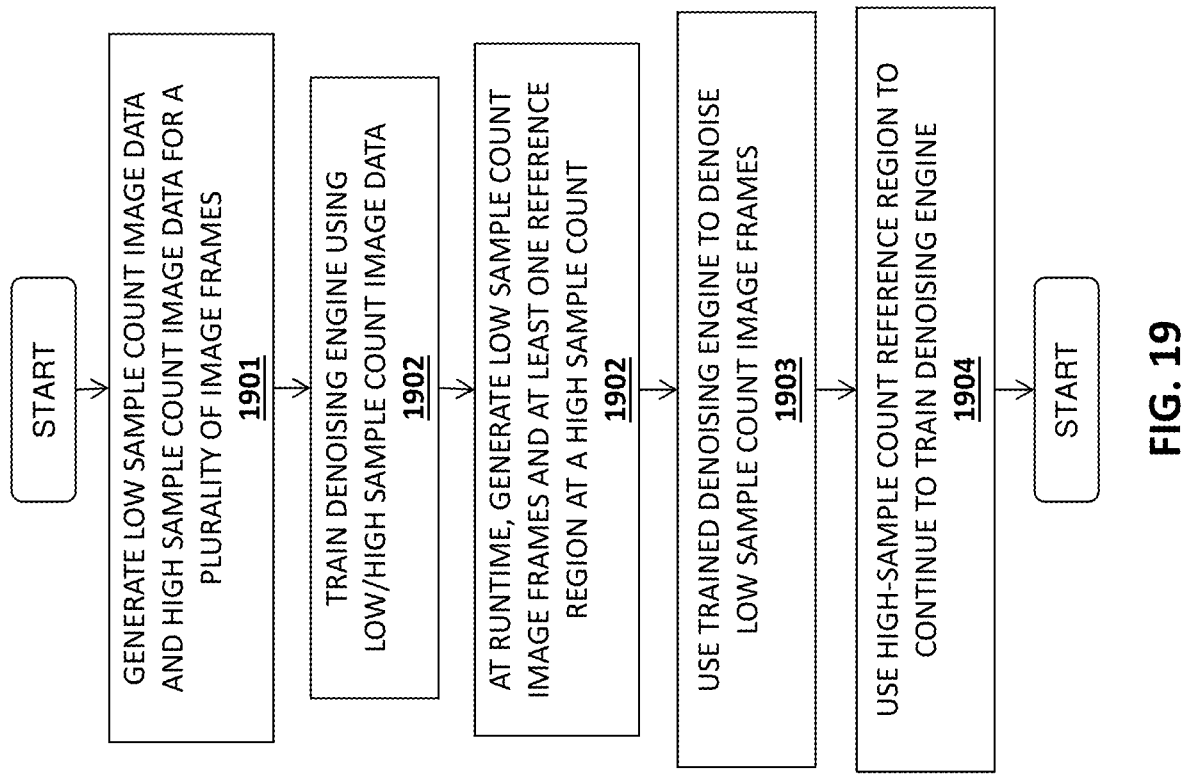

APPARATUS AND METHOD FOR EFFICIENTLY STORING RAY TRAVERSAL DATA

BACKGROUND

Field of the Invention

This invention relates generally to the field of graphics processors. More particularly, the invention relates to an apparatus and method for efficiently storing ray traversal data.

Description of the Related Art

Ray tracing is a technique in which a light transport is simulated through physically-based rendering. Widely used in cinematic rendering, it was considered too resource-intensive for real-time performance until just a few years ago. One of the key operations in ray tracing is processing a visibility query for ray-scene intersections known as "ray traversal" which computes ray-scene intersections by traversing and intersecting nodes in a bounding volume hierarchy (BVH).

Denoising has become a critical feature for real-time ray tracing with smooth, noiseless images. Rendering can be done across a distributed system on multiple devices, but so far the existing denoising frameworks all operate on a single instance on a single machine. If rendering is being done across multiple devices, they may not have all rendered pixels accessible for computing a denoised portion of the image.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 19 illustrates one embodiment of a method for training a machine-learning engine;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
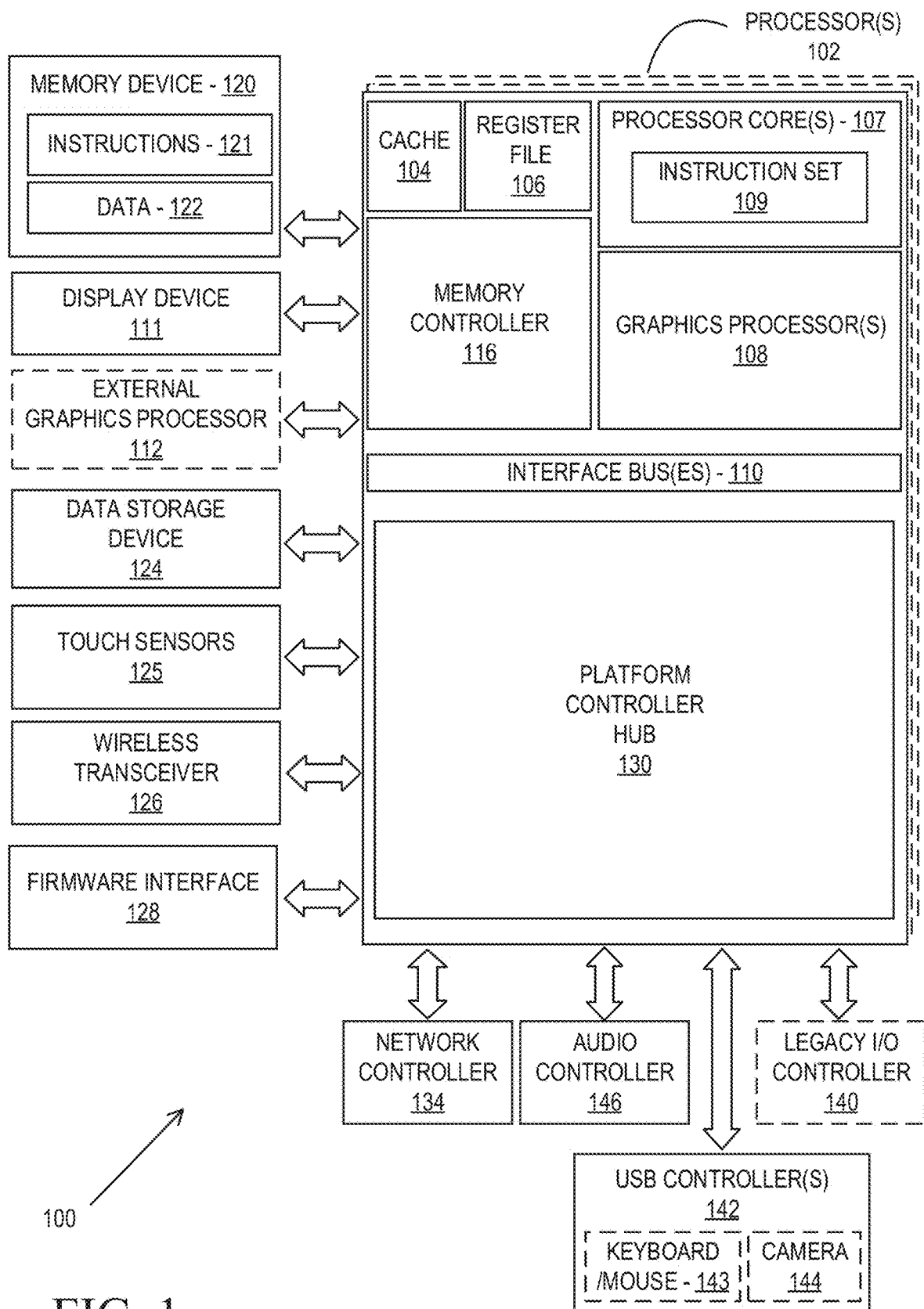
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 1160 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

Figure 2:
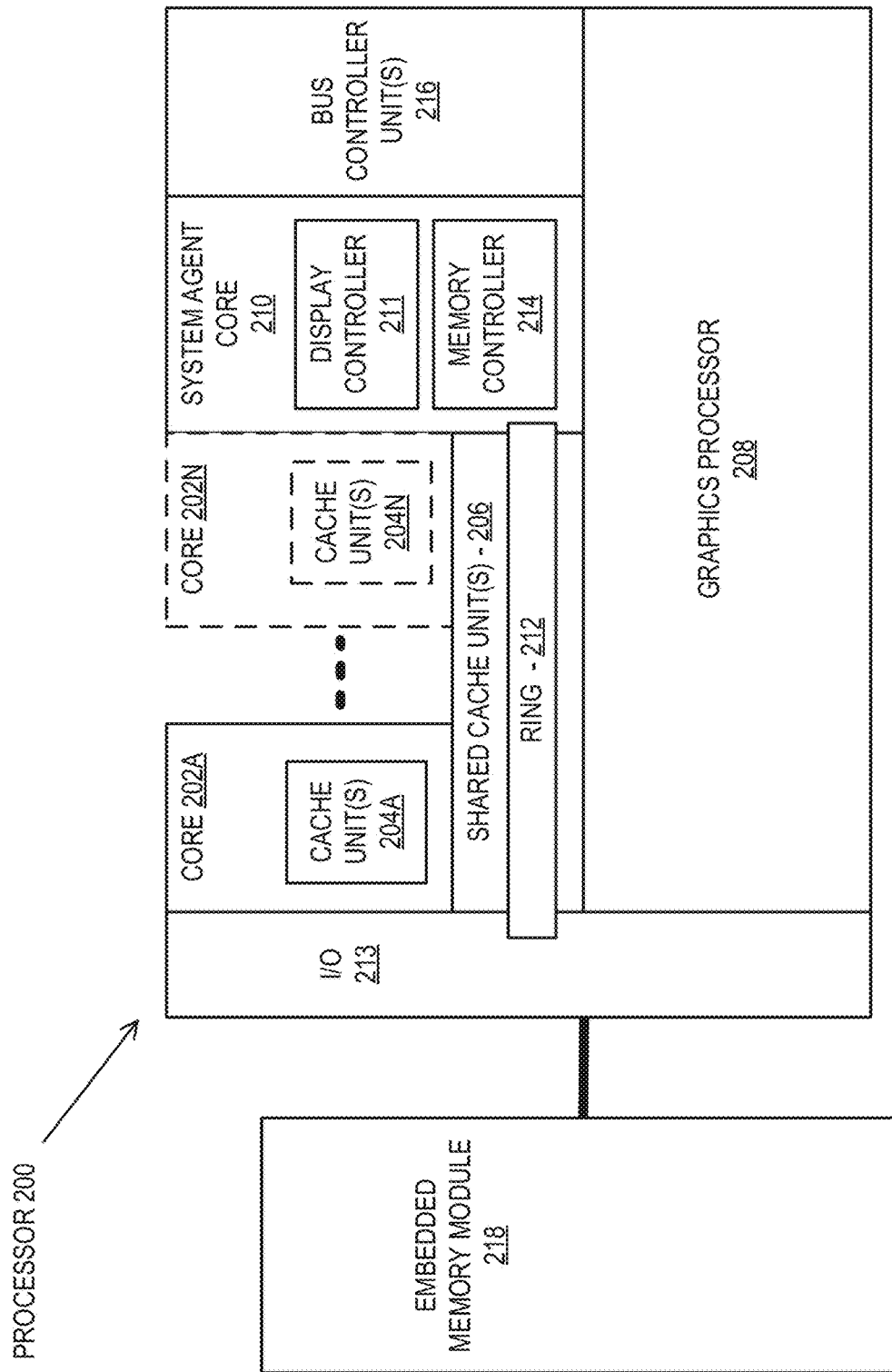
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
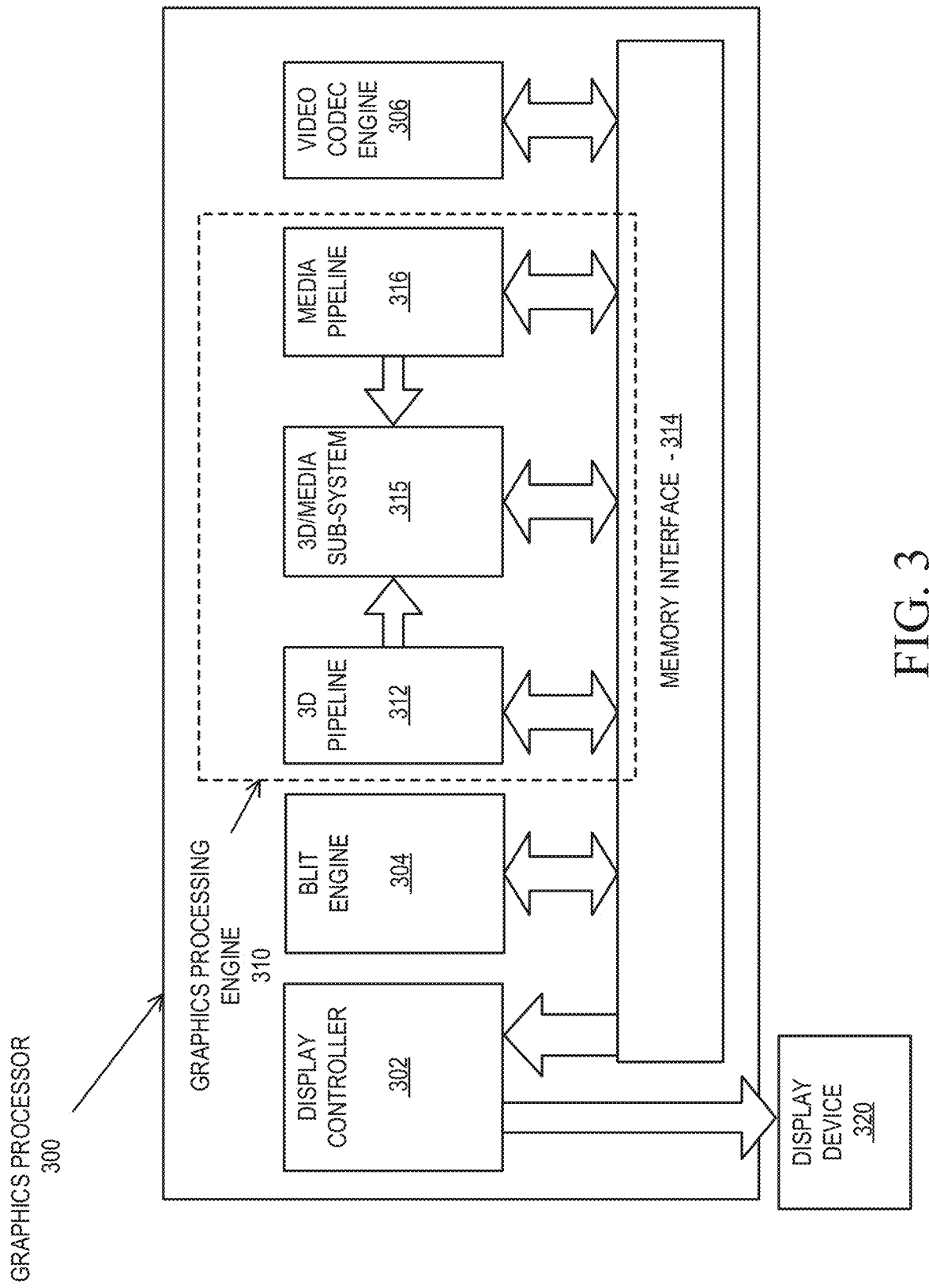
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
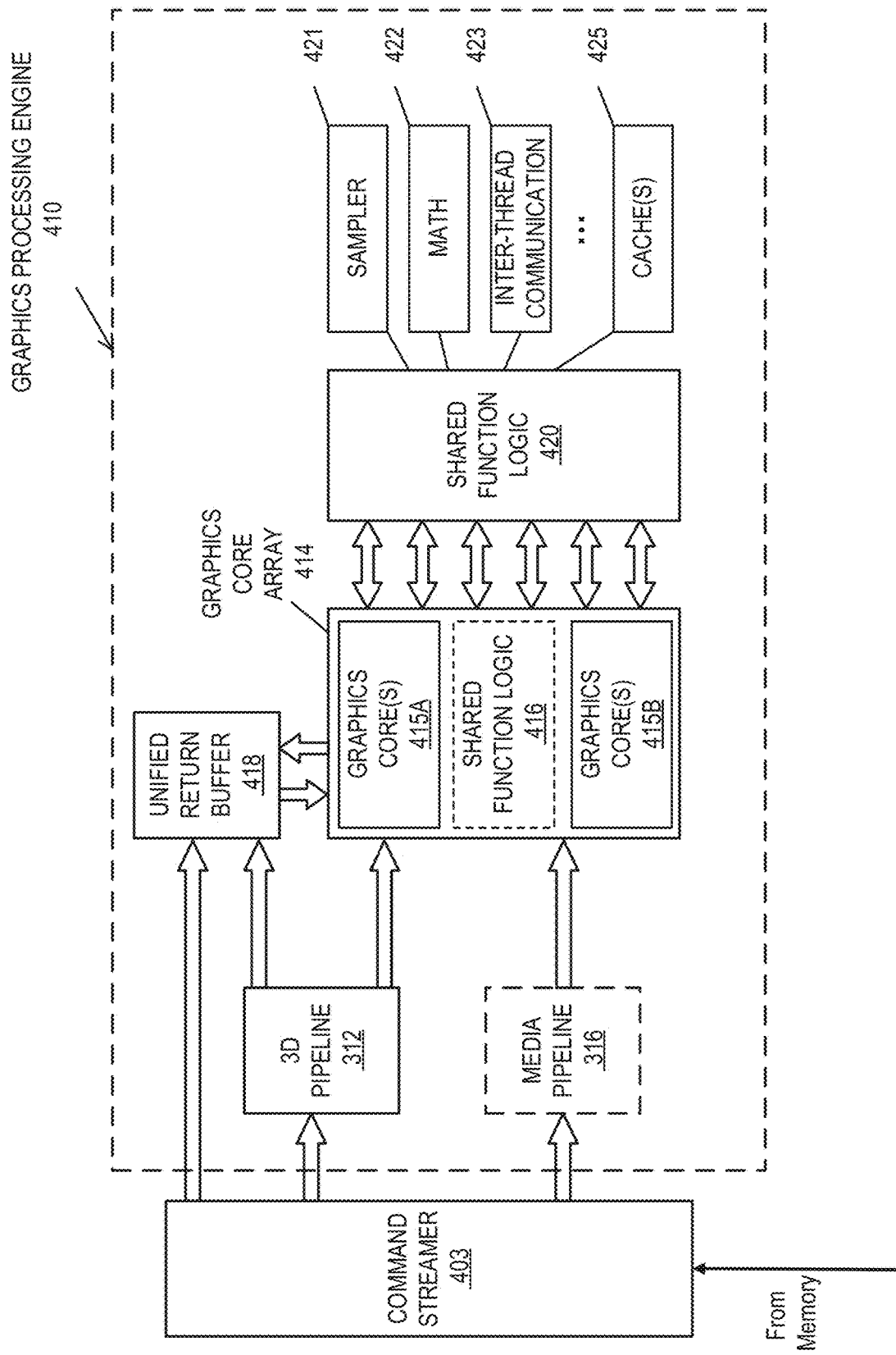
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
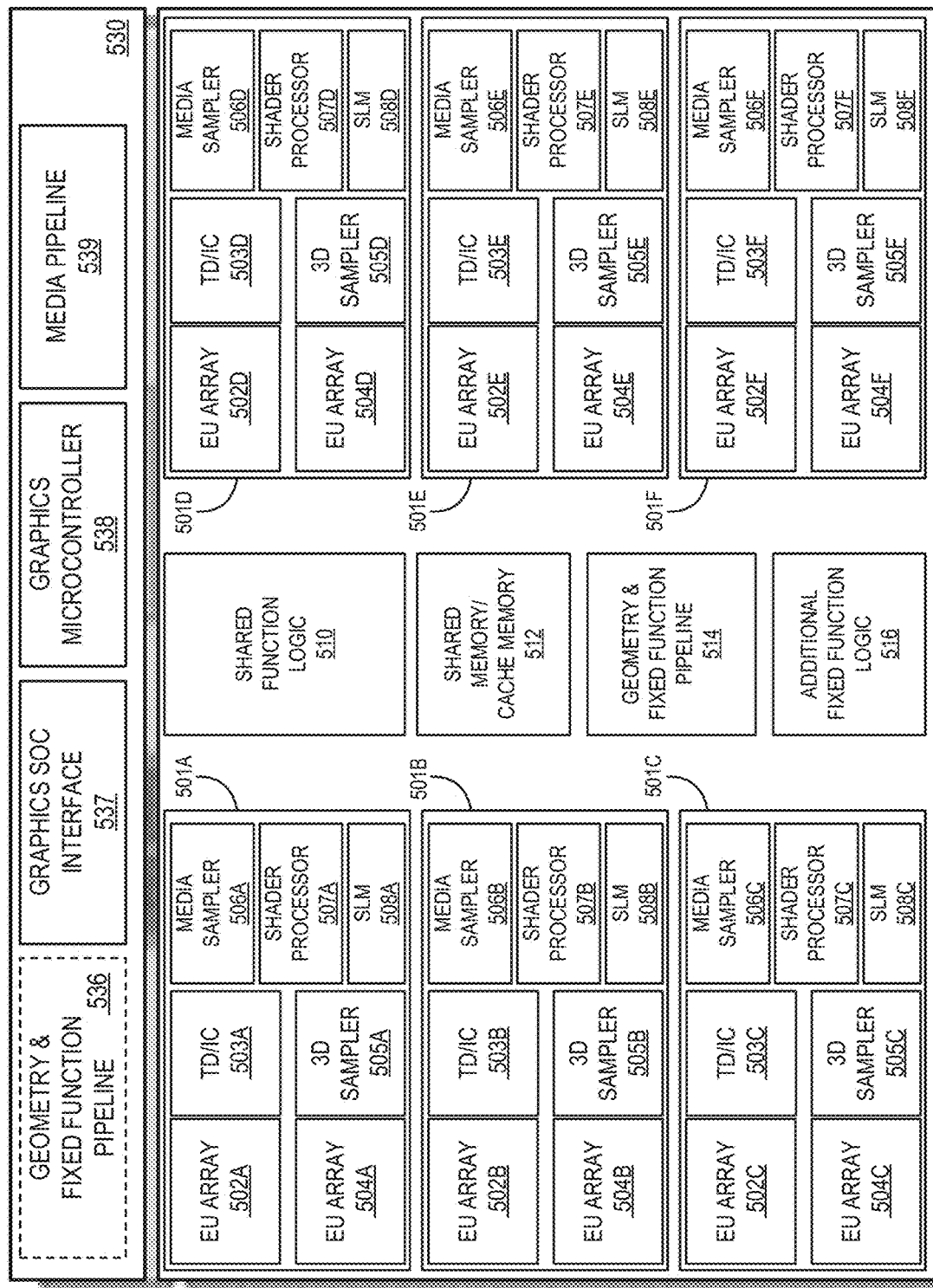
FIG. 5 is a block diagram of another embodiment of a graphics processor.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics processor core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor core 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics processor core 500 and other processor cores within a system on a chip integrated circuit. The graphics microcontroller 538 is a programmable sub-processor that is configurable to manage various functions of the graphics processor core 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics processor core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics processor core 500 and CPUs within the SoC. The SoC interface 537 can also implement power management controls for the graphics processor core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics processor core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics processor core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics processor core 500, providing the graphics processor core 500 with the ability to save and restore registers within the graphics processor core 500 across low-power state transitions independently from the operating system and/or graphics driver software on the system.

The graphics processor core 500 may have greater than or fewer than the illustrated sub-cores 501A-501F, up to N modular sub-cores. For each set of N sub-cores, the graphics processor core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics processor core 500. The shared and/or cache memory 512 can be a last-level cache for the set of N sub-cores 501A-501F within the graphics processor core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics processor core 500 includes additional fixed function logic 516 that can include various fixed function acceleration logic for use by the graphics processor core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
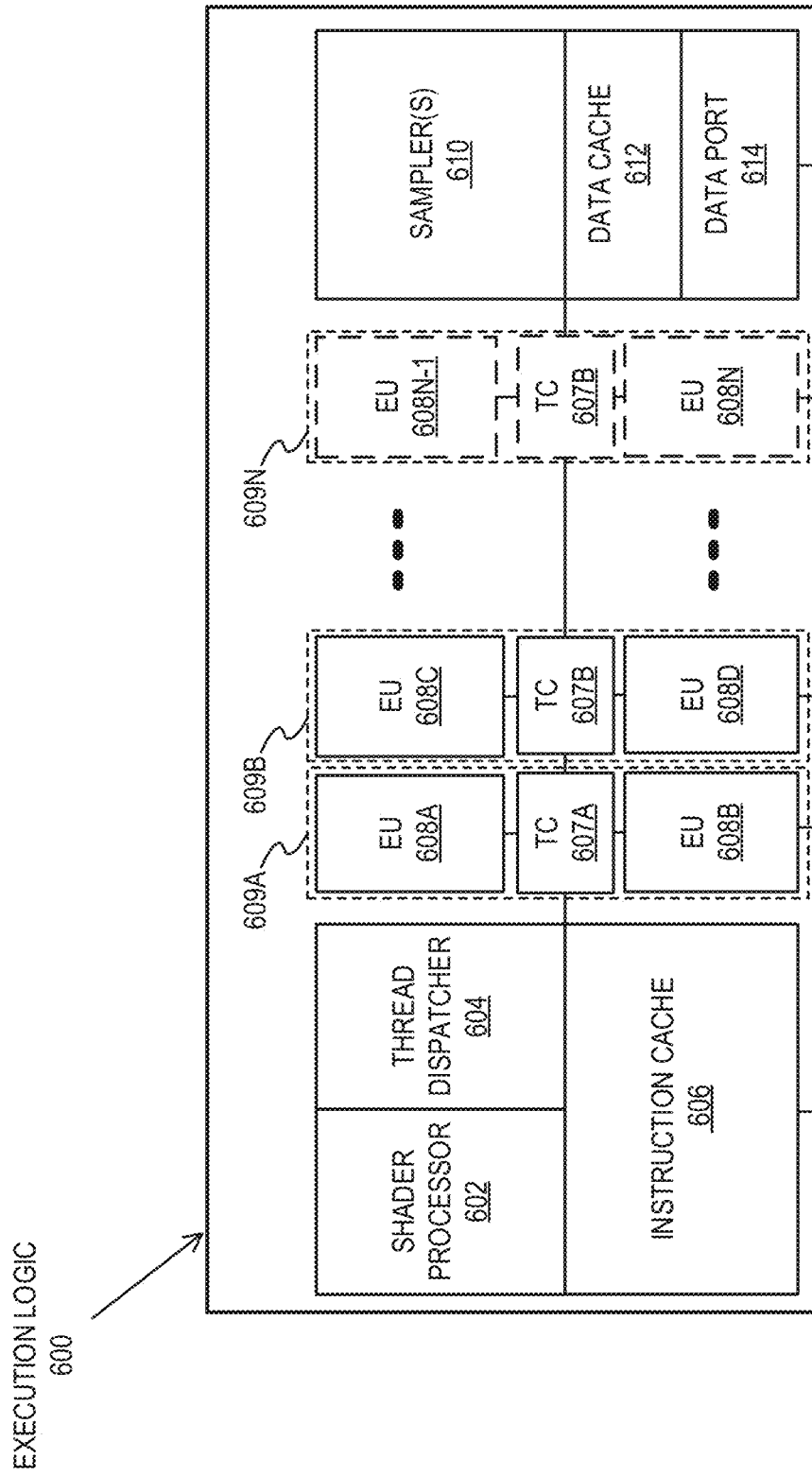
FIGS. 6A-B illustrate examples of execution circuitry and logic.
Figure 6B:
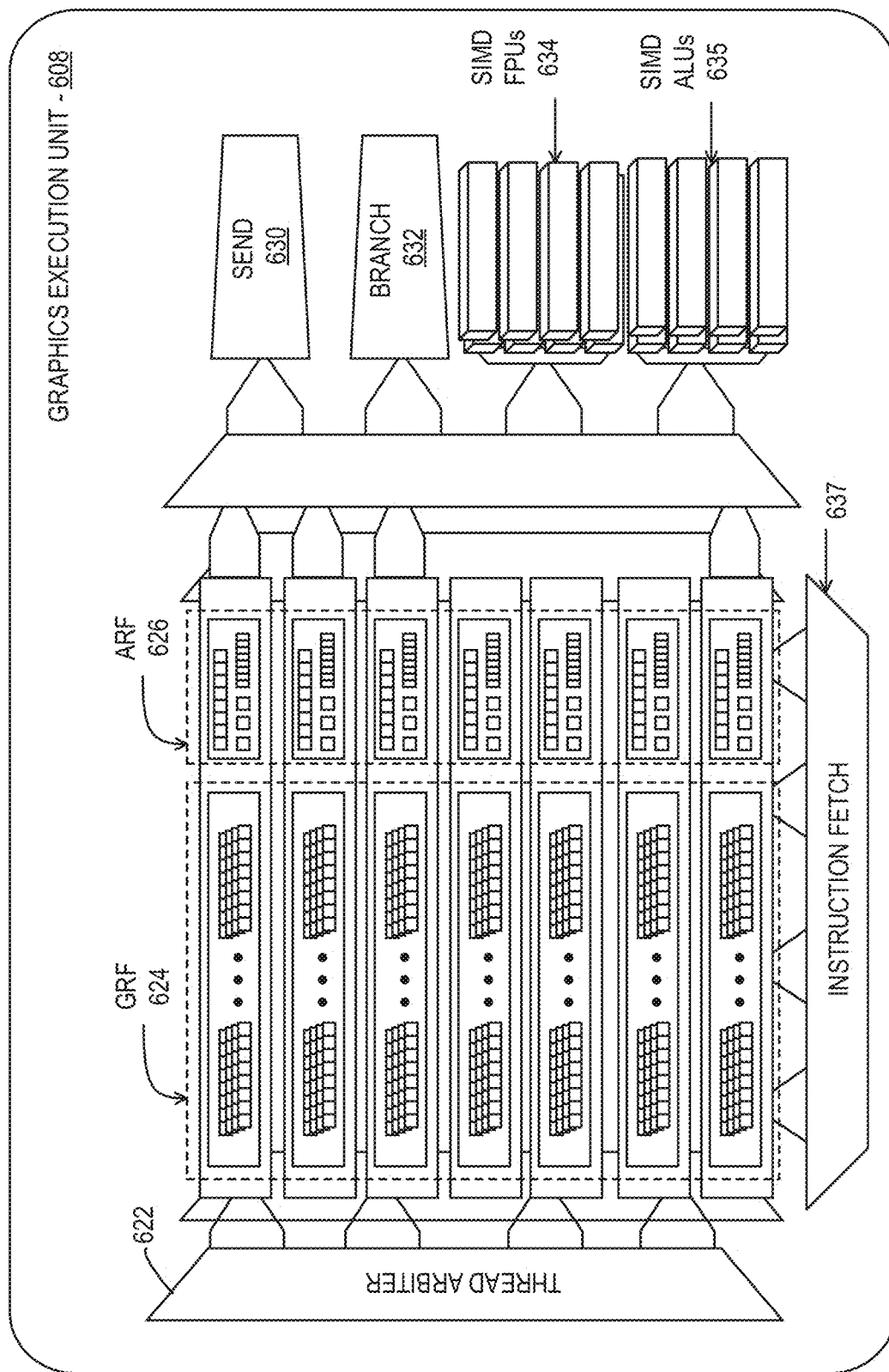

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi- Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 6342, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can chose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
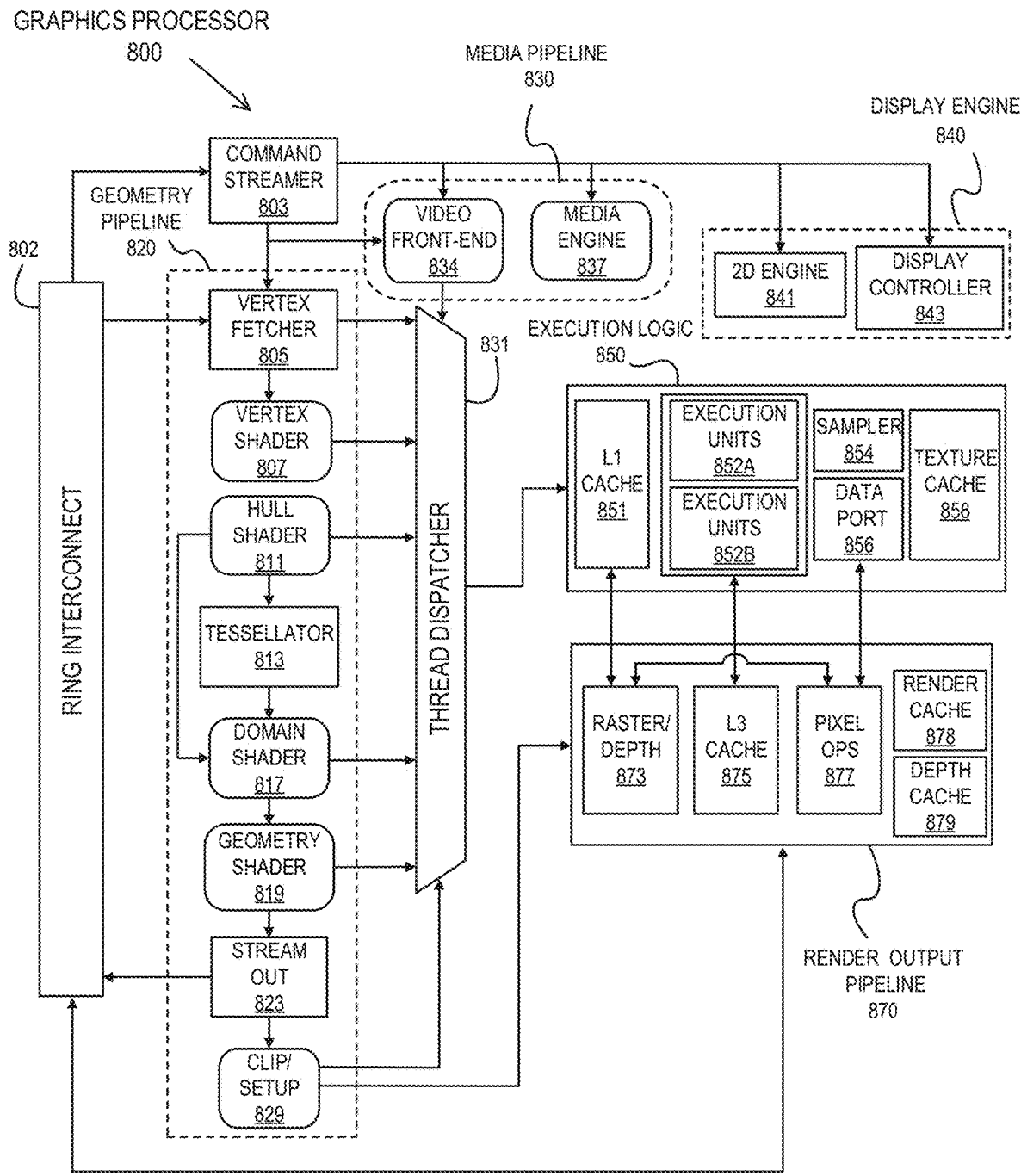
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
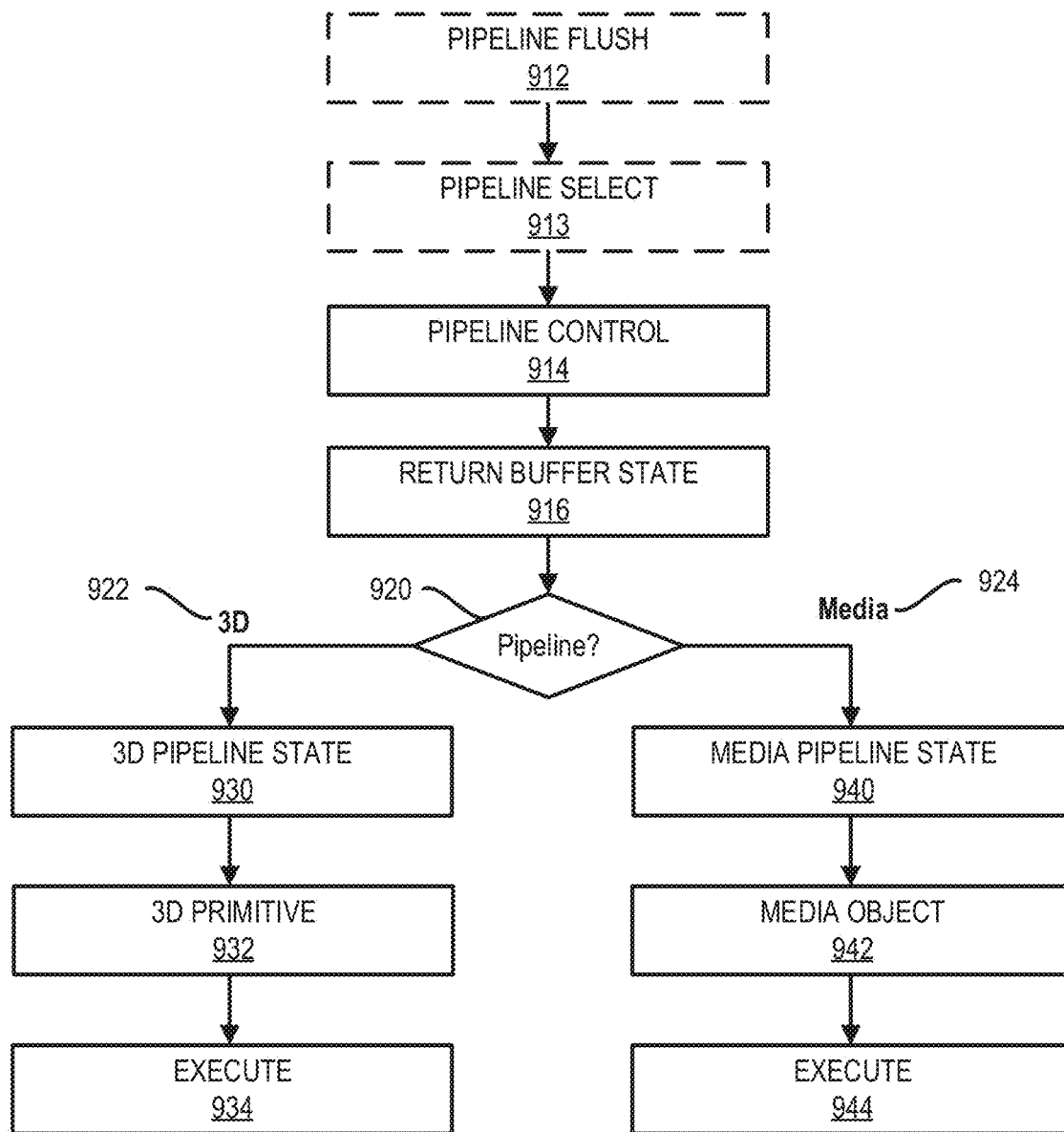
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
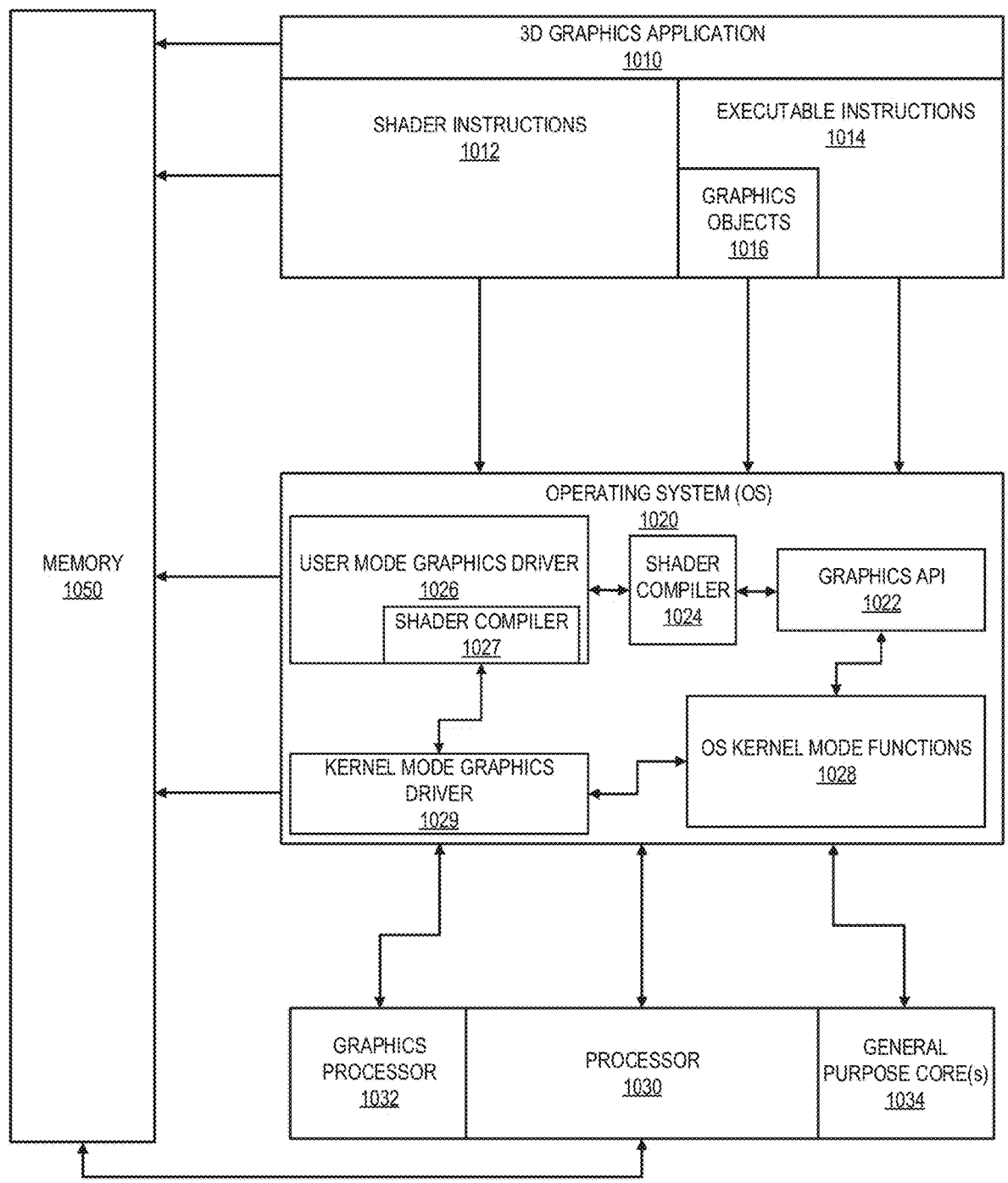
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
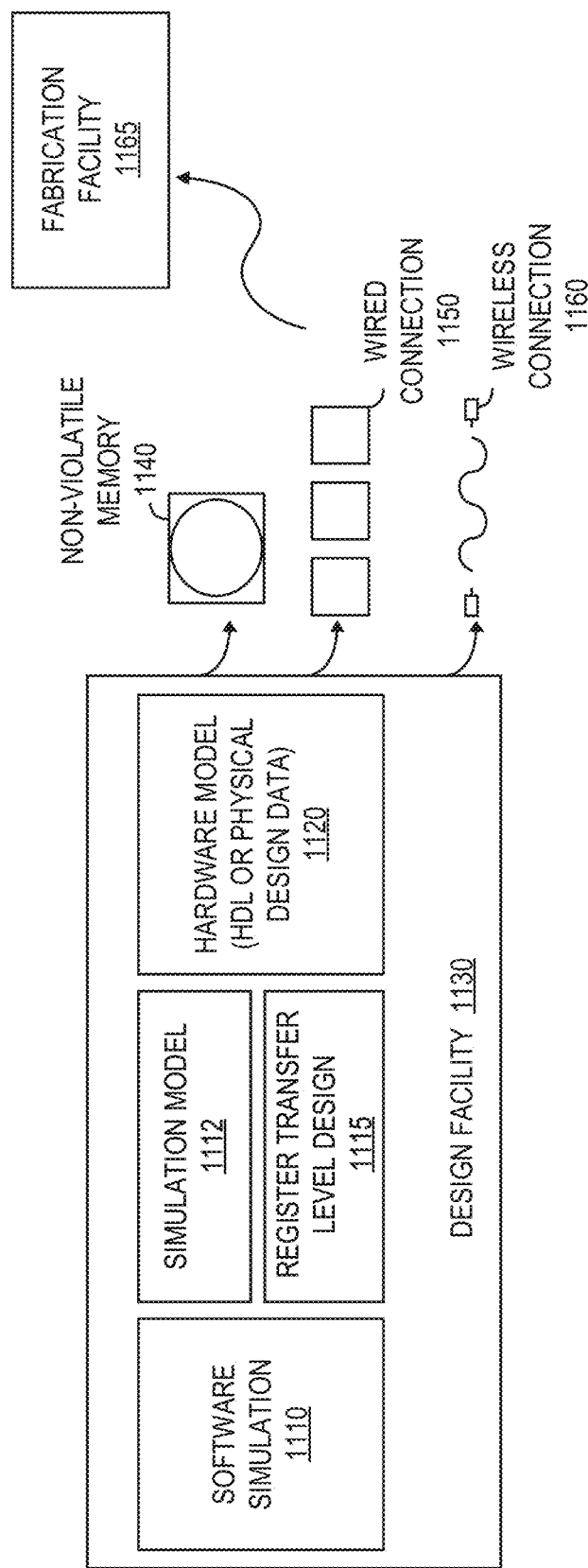
FIGS. 11A-B illustrate an exemplary IP core development system that may be used to manufacture an integrated circuit and an exemplary package assembly.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
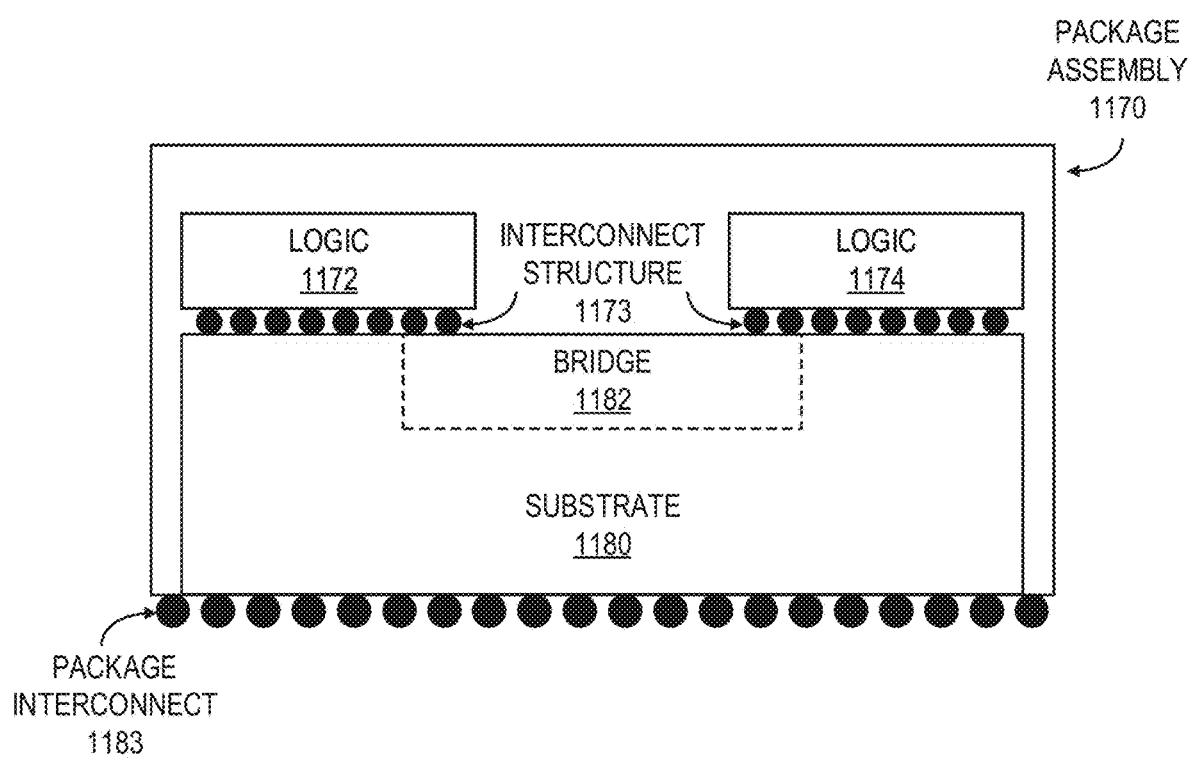

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
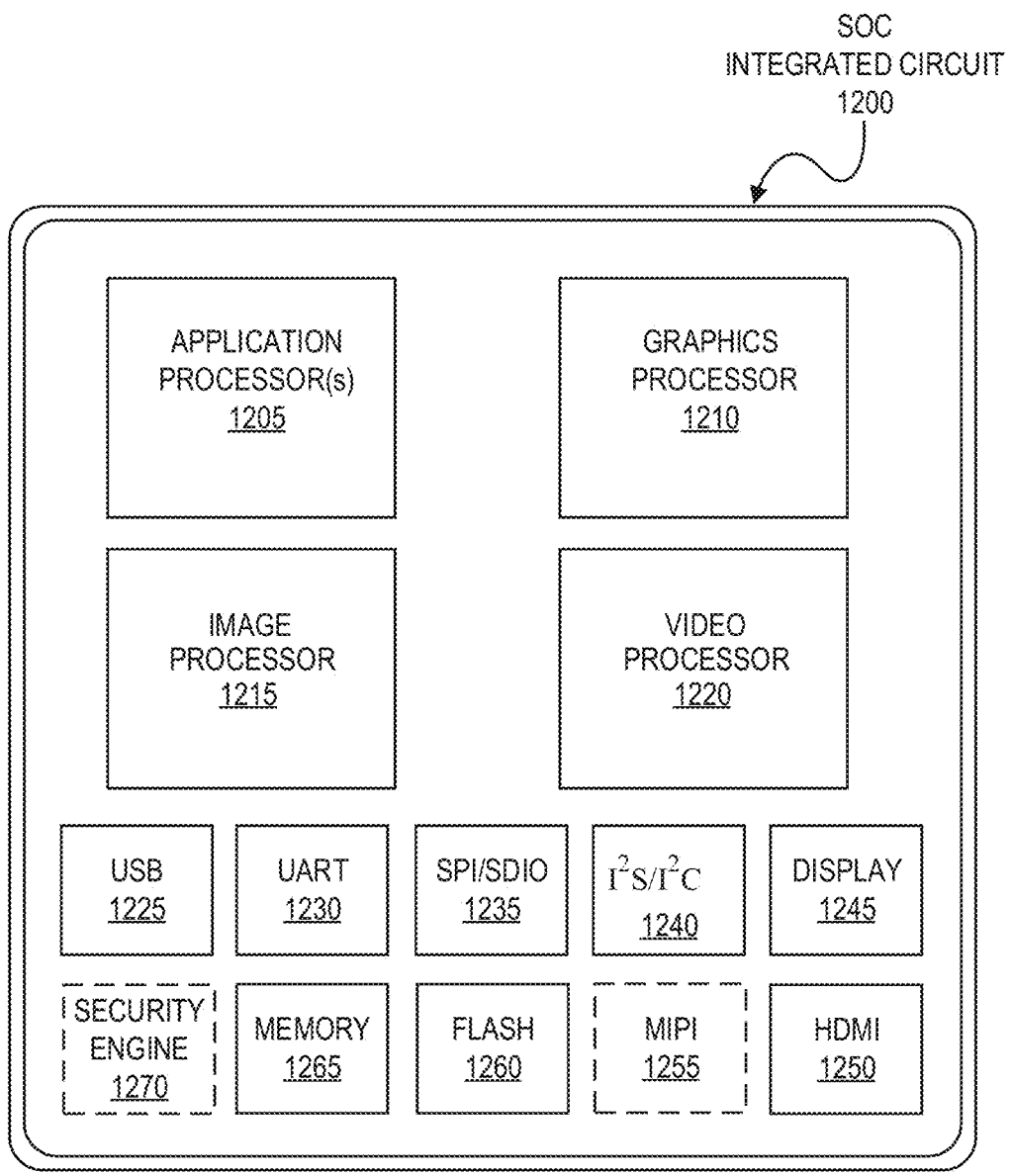
FIG. 12 illustrates an exemplary system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
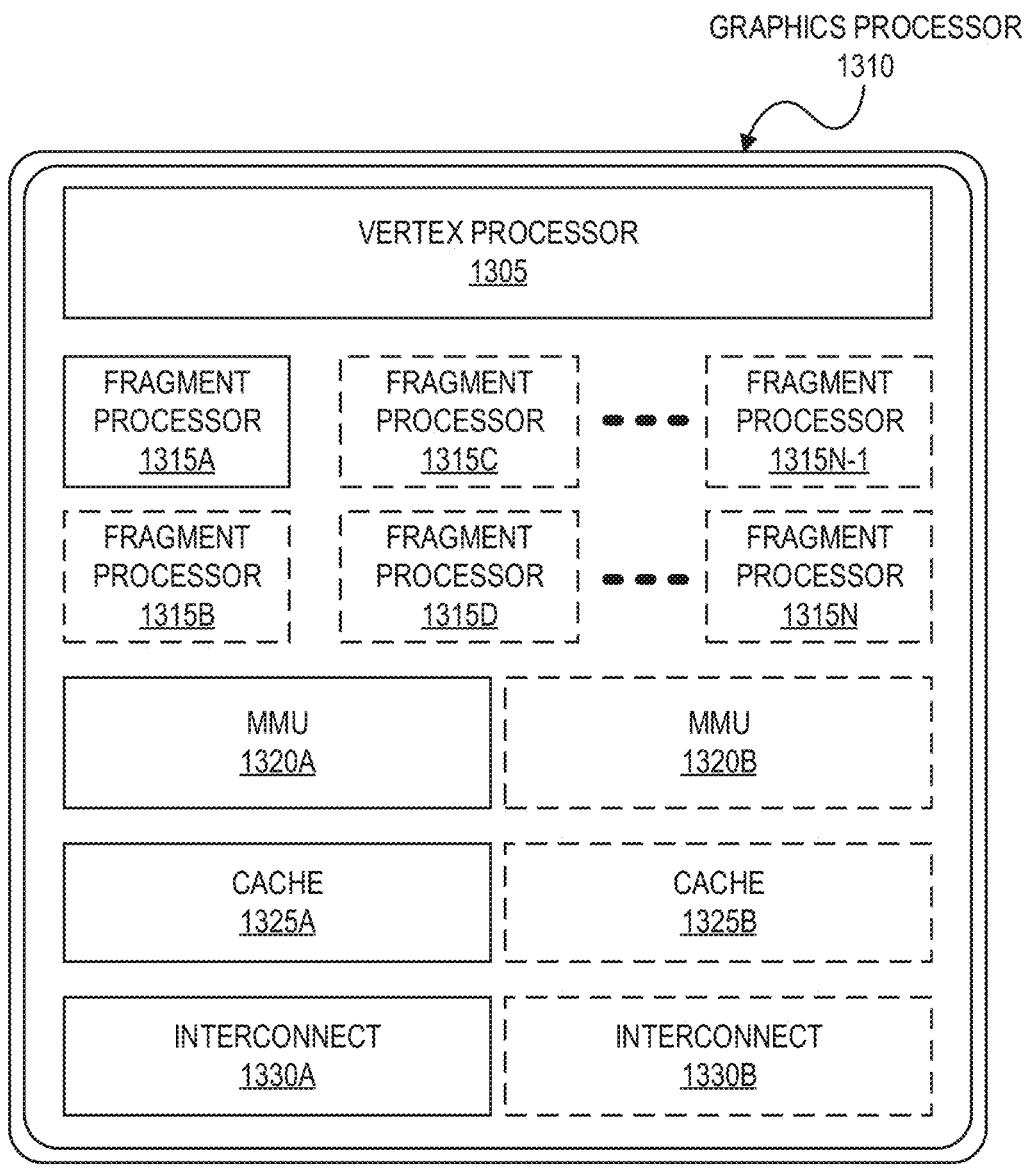
FIGS. 13A-B illustrate an exemplary graphics processor of a system on a chip integrated circuit that may be fabricated using one or more IP cores.
Figure 13B:
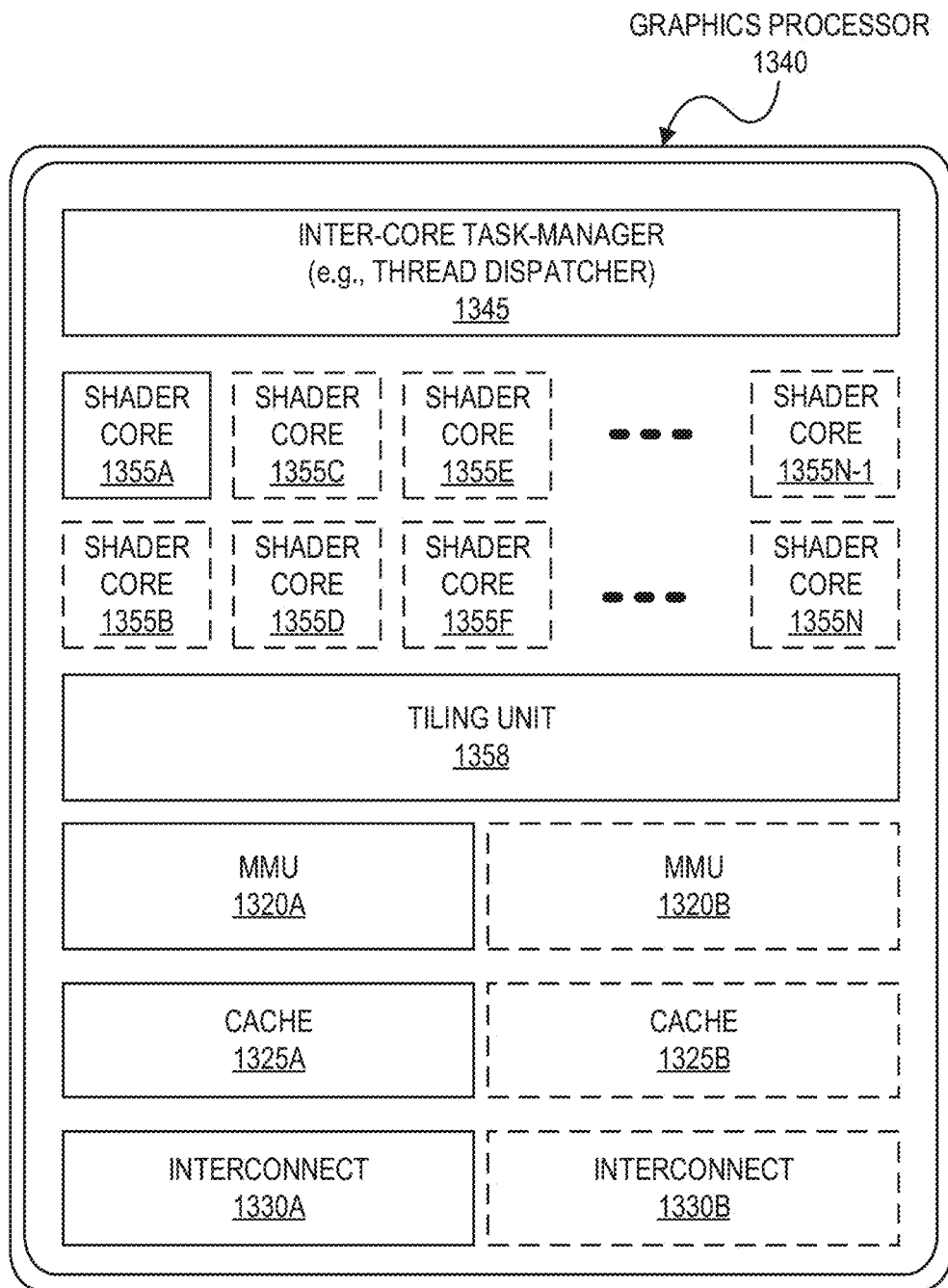

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a frame buffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
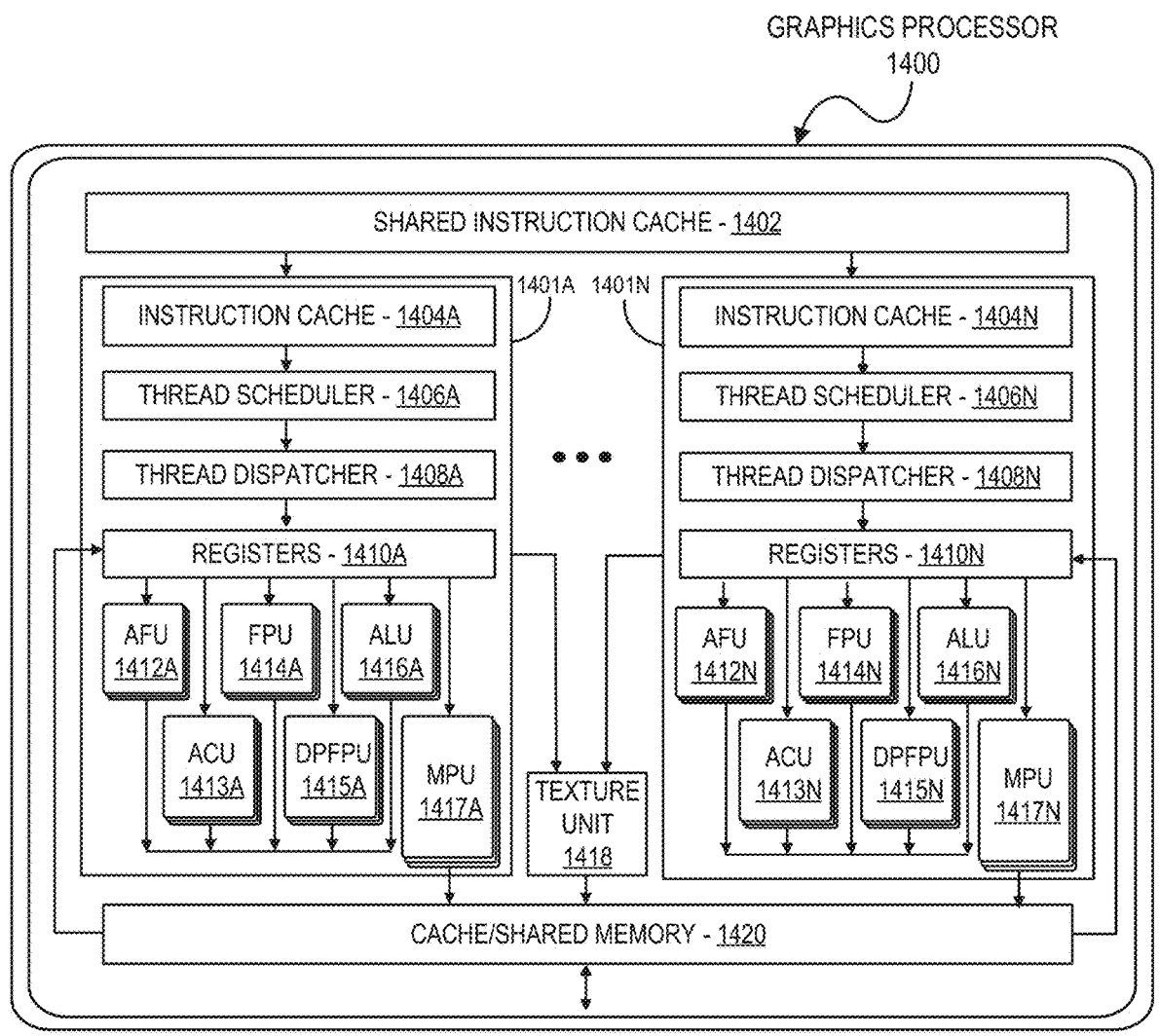
FIG. 14A-B illustrate exemplary graphics processor architectures.
Figure 14B:
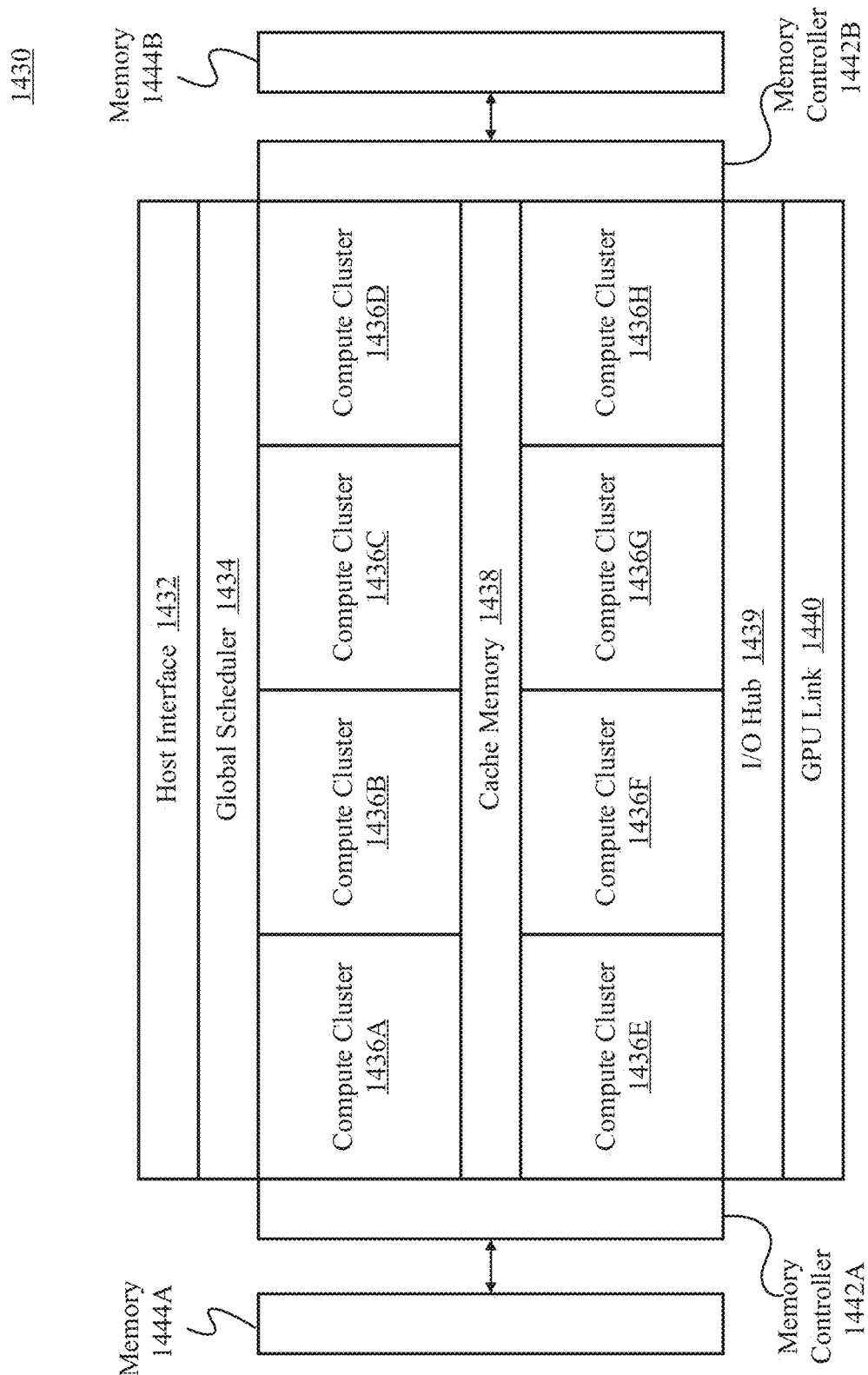

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates an additional highly-parallel general-purpose graphics processing unit 1430, which is a highly-parallel general-purpose graphics processing unit suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A-1440N. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 14434A-14434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

Ray Tracing with Machine Learning

As mentioned above, ray tracing is a graphics processing technique in which a light transport is simulated through physically-based rendering. One of the key operations in ray tracing is processing a visibility query which requires traversal and intersection testing of nodes in a bounding volume hierarchy (BVH).

Ray- and path-tracing based techniques compute images by tracing rays and paths through each pixel, and using random sampling to compute advanced effects such as shadows, glossiness, indirect illumination, etc. Using only a few samples is fast but produces noisy images while using many samples produces high quality images, but is cost prohibitive.

In the last several years, a breakthrough solution to ray-/path-tracing for real-time use has come in the form of "denoising"—the process of using image processing techniques to produce high quality, filtered/denoised images from noisy, low-sample count inputs. The most effective denoising techniques rely on machine learning techniques where a machine-learning engine learns what a noisy image would likely look like if it had been computed with more samples. In one particular implementation, the machine learning is performed by a convolutional neural network (CNN); however, the underlying principles of the invention are not limited to a CNN implementation. In such an implementation, training data is produced with low-sample count inputs and ground-truth. The CNN is trained to predict the converged pixel from a neighborhood of noisy pixel inputs around the pixel in question.

Though not perfect, this AI-based denoising technique has proven surprisingly effective. The caveat, however, is that good training data is required, since the network may otherwise predict the wrong results. For example, if an animated movie studio trained a denoising CNN on past movies with scenes on land and then attempted to use the trained CNN to denoise frames from a new movie set on water, the denoising operation will perform sub-optimally.

To address this problem, one embodiment of the invention gathers learning data dynamically, while rendering, and continuously trains a machine learning engine, such as a CNN, based on the data on which it is currently being run, thus continuously improving the machine learning engine for the task at hand. This embodiment may still perform a training phase prior to runtime, but continues to adjust the machine learning weights as needed during runtime. In addition, this embodiment avoids the high cost of computing the reference data required for the training by restricting the generation of learning data to a sub-region of the image every frame or every N frames. In particular, the noisy inputs of a frame are generated for denoising the full frame with the current network. in addition, a small region of reference pixels are generated and used for continuous training, as described below.

While a CNN implementation is described with respect to certain embodiments, any form of machine learning engine may be used including, but not limited to systems which perform supervised learning (e.g., building a mathematical model of a set of data that contains both the inputs and the desired outputs), unsupervised learning (e.g., which evaluate the input data for certain types of structure), and/or a combination of supervised and unsupervised learning.

Existing de-noising implementations operate in a training phase and a runtime phase. During the training phase, a network topology is defined which receives a region of N×N pixels with various per-pixel data channels such as pixel color, depth, normal, normal deviation, primitive IDs, and albedo and generates a final pixel color. A set of "representative" training data is generated using one frame's worth of low-sample count inputs, and referencing the "desired" pixel colors computed with a very high sample count. The network is trained towards these inputs, generating a set of "ideal" weights for the network. In these implementations, the reference data is used to train the network's weights to most closely match the network's output to the desired result.

At runtime, the given, pre-computed ideal network weights are loaded and the network is initialized. For each frame, a low-sample count image of denoising inputs (i.e., the same as used for training) is generated. For each pixel, the given neighborhood of pixels' inputs is run through the network to predict the "denoised" pixel color, generating a denoised frame.

Figure 15:
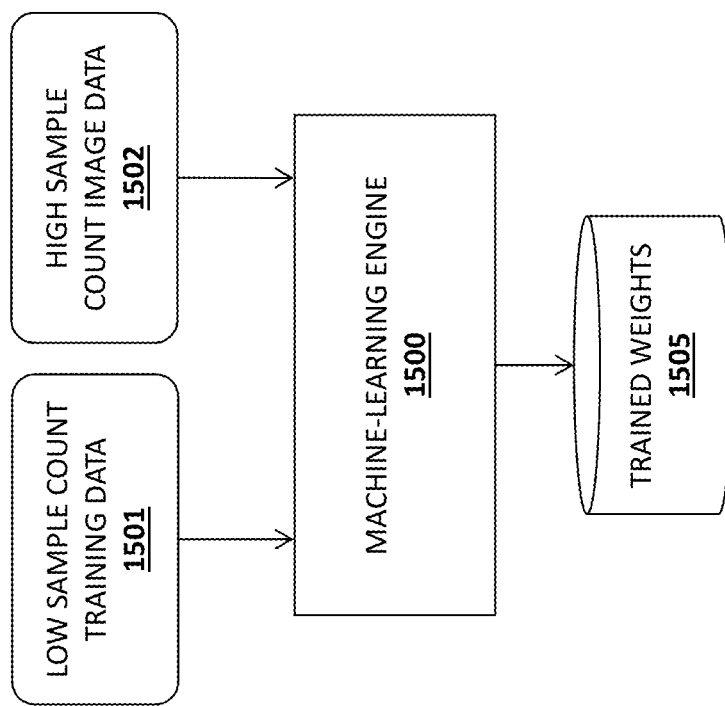
FIG. 15 illustrates one embodiment of an architecture for performing initial training of a machine-learning architecture.

FIG. 15 illustrates one embodiment of an initial training implementation. A machine learning engine 1500 (e.g., a CNN) receives a region of N×N pixels as high sample count image data 1702 with various per-pixel data channels such as pixel color, depth, normal, normal deviation, primitive IDs, and albedo and generates final pixel colors. Representative training data is generated using one frame's worth of low-sample count inputs 1501. The network is trained towards these inputs, generating a set of "ideal" weights 1505 which the machine learning engine 1500 subsequently uses to denoise low sample count images at runtime.

Figure 16:
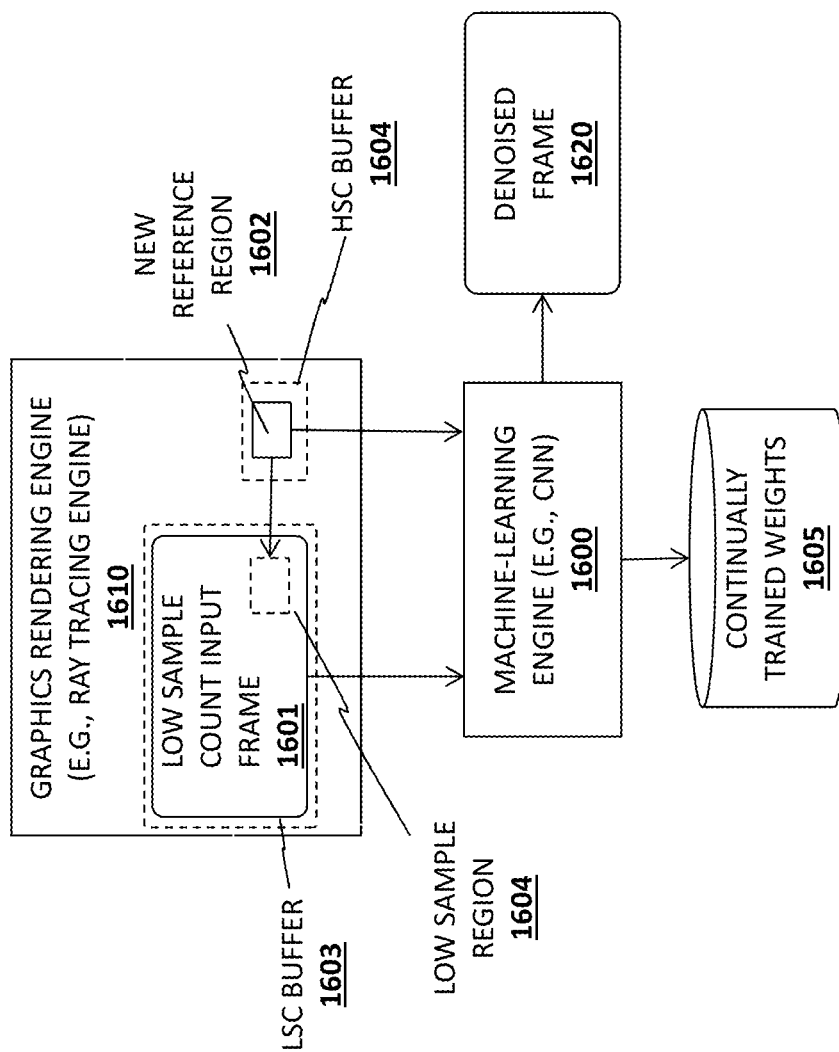
FIG. 16 illustrates one embodiment in which a machine-learning engine is continually trained and updated during runtime.

To improve the above techniques, one embodiment of the invention augments the denoising phase to generate new training data every frame or a subset of frames (e.g., every N frames where N=2, 3, 4, 10, 25, etc). In particular, as illustrated in FIG. 16, this embodiment chooses one or more regions in each frame, referred to here as "new reference regions" 1602 which are rendered with a high sample count into a separate high sample count buffer 1604. A low sample count buffer 1603 stores the low sample count input frame 1601 (including the low sample region 1604 corresponding to the new reference region 1602).

In one embodiment, the location of the new reference region 1602 is randomly selected. Alternatively, the location of the new reference region 1602 may be adjusted in a pre-specified manner for each new frame (e.g., using a predefined movement of the region between frames, limited to a specified region in the center of the frame, etc).

Regardless of how the new reference region is selected, it is used by the machine learning engine 1600 to continually refine and update the trained weights 1605 used for denoising. In particular, reference pixel colors from each new reference region 1602 and noisy reference pixel inputs from a corresponding low sample count region 1607 are rendered. Supplemental training is then performed on the machine learning engine 1600 using the high-sample-count reference region 1602 and the corresponding low sample count region 1607. In contrast to the initial training, this training is performed continuously during runtime for each new reference region 1602—thereby ensuring that the machine learning engine 1600 is precisely trained. For example, per-pixel data channels (e.g., pixel color, depth, normal, normal deviation, etc) may be evaluated, which the machine learning engine 1600 uses to make adjustments to the trained weights 1605. As in the training case (FIG. 15), the machine learning engine 1600 is trained towards a set of ideal weights 1605 for removing noise from the low sample count input frame 1601 to generate the denoised frame 1620. However, in this embodiment, the trained weights 1605 are continually updated, based on new image characteristics of new types of low sample count input frames 1601.

In one embodiment, the re-training operations performed by the machine learning engine 1600 are executed concurrently in a background process on the graphics processor unit (GPU) or host processor. The render loop, which may be implemented as a driver component and/or a GPU hardware component, continuously produces new training data (e.g., in the form of new reference regions 1602) which it places in a queue. The background training process, executed on the GPU or host processor, continuously reads the new training data from this queue, re-trains the machine learning engine 1600, and updates it with new weights 1605 at appropriate intervals.

Figure 17:
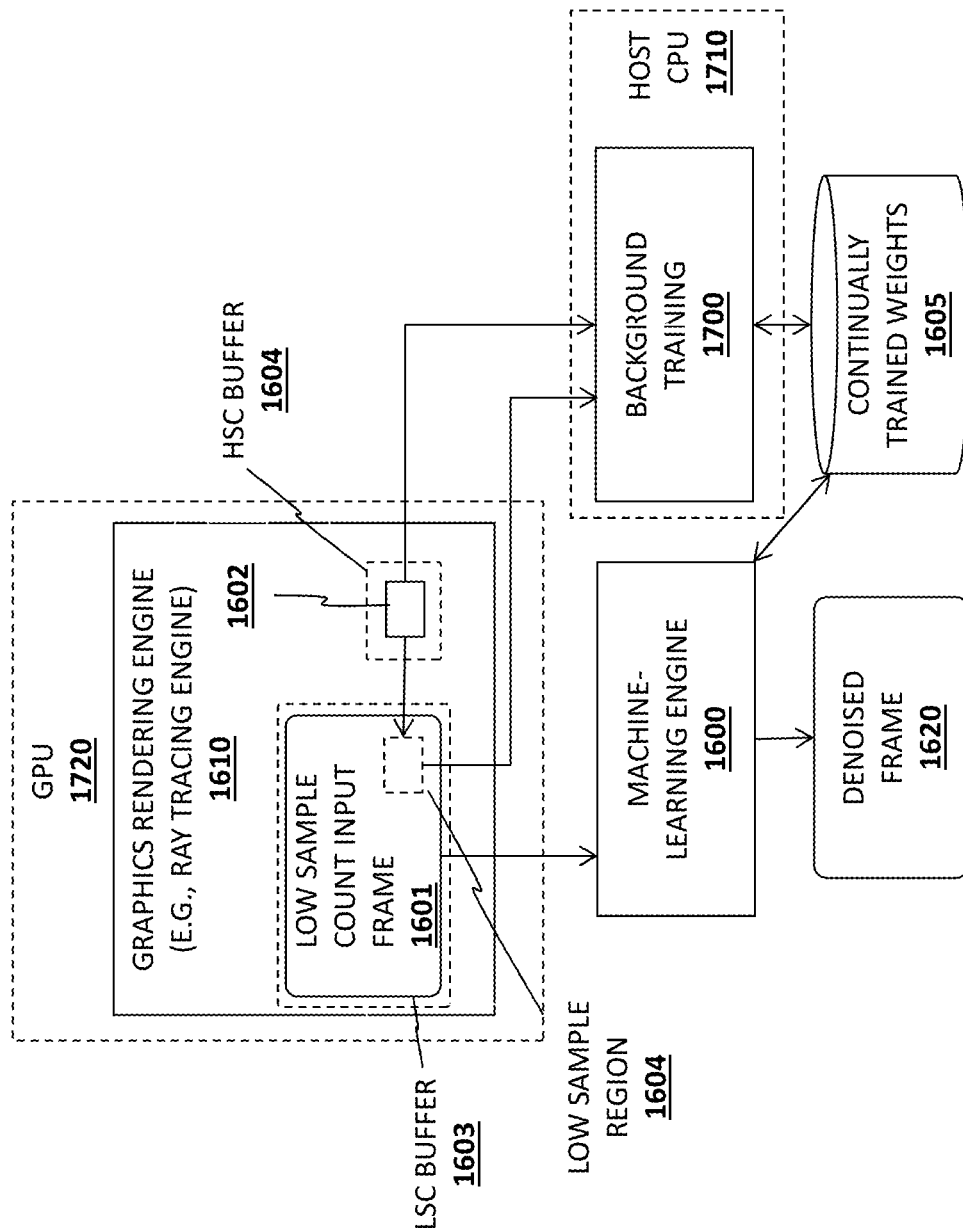
FIG. 17 illustrates another embodiment in which a machine-learning engine is continually trained and updated during runtime.

FIG. 17 illustrates an example of one such implementation in which the background training process 1700 is implemented by the host CPU 1710. In particular, in this embodiment, the background training process 1700 uses the high sample count new reference region 1602 and the corresponding low sample region 1604 to continually update the trained weights 1605, thereby updating the machine learning engine 1600.

Figure 18A:
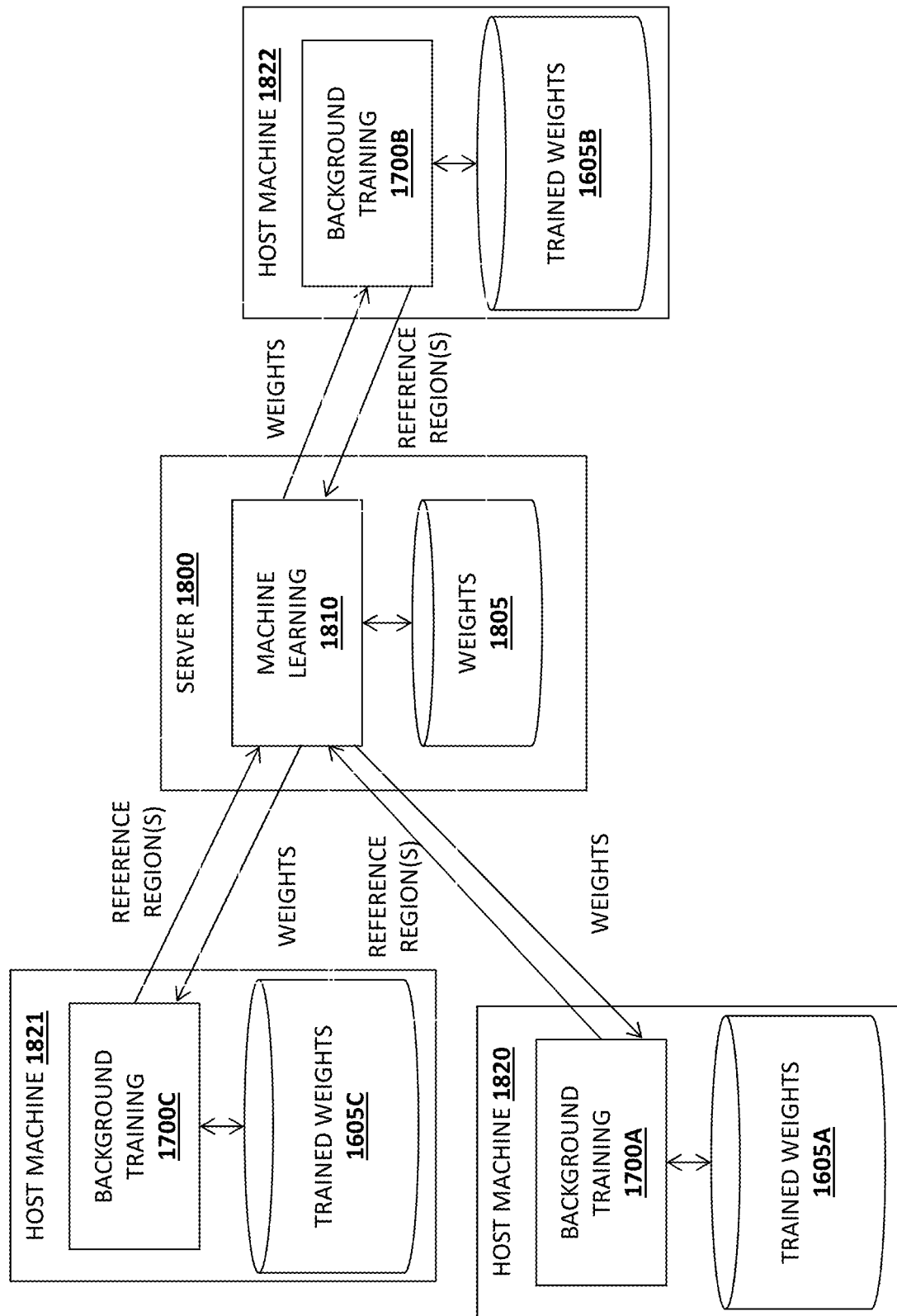
FIGS. 18A-B illustrate embodiments in which machine learning data is shared on a network.

As illustrated in FIG. 18A, in one implementation such as in a multi-player online game, different host machines 1820-1822 individually generate reference regions which a background training process 1700A-C transmits to a server 1800 (e.g., such as a gaming server). The server 1800 then performs training on a machine learning engine 1810 using the new reference regions received from each of the hosts 1821-1822, updating the weights 1805 as previously described. It transmits these weights 1805 to the host machines 1820 which store the weights 1605A-C, thereby updating each individual machine learning engine (not shown). Because the server 1800 may be provided a large number of reference regions in a short period of time, it can efficiently and precisely update the weights for any given application (e.g., an online game) being executed by the users.

Figure 18B:
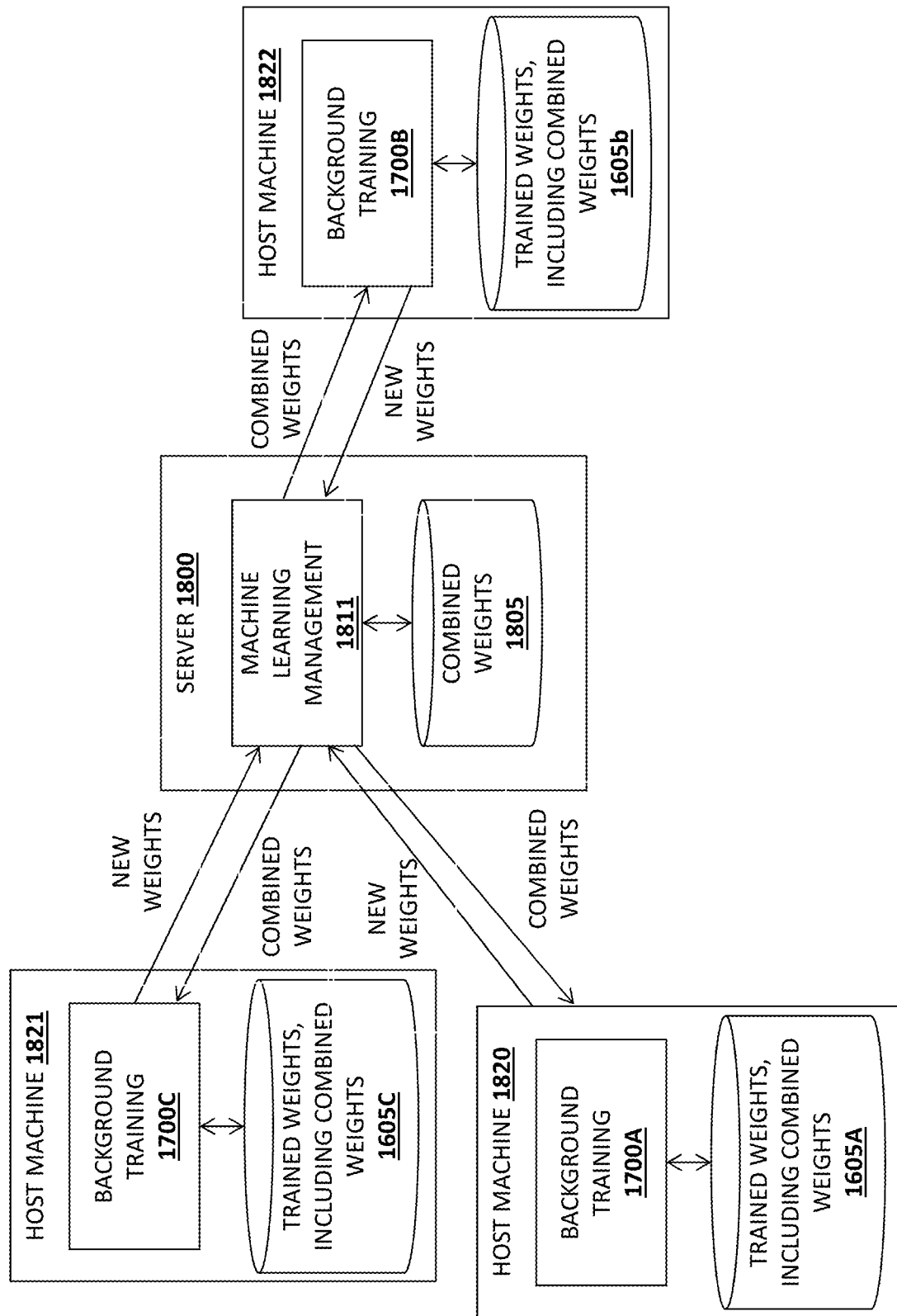

As illustrated in FIG. 18B, the different host machines may generate new trained weights (e.g., based on training/reference regions 1602 as previously described) and share the new trained weights with a server 1800 (e.g., such as a gaming server) or, alternatively, use a peer-to-peer sharing protocol. A machine learning management component 1810 on the server generates a set of combined weights 1805 using the new weights received from each of the host machines. The combined weights 1805, for example, may be an average generated from the new weights and continually updated as described herein. Once generated, copies of the combined weights 1605A-C may be transmitted and stored on each of the host machines 1820-1821 which may then use the combined weights as described herein to perform denoising operations.

In one embodiment, this semi-closed loop update mechanism can be used by the hardware manufacturer. For example, the reference network may be included as part of the driver distributed by the hardware manufacturer. As the driver generates new training data using the techniques described herein and continuously submits these back to the hardware manufacturer, the hardware manufacturer uses this information to continue to improve its machine learning implementations for the next driver update.

In one implementation (e.g., in batch movie rendering on a render farm) the renderer transmits the newly generated training regions to a dedicated server or database (in that studio's render farm) that aggregates this data from multiple render nodes over time. A separate process on a separate machine continuously improves the studio's dedicated denoising network, and new render jobs always use the latest trained network.

A method in accordance with one embodiment of the invention is illustrated in FIG. 19. The method may be implemented on the architectures described herein, but is not limited to any particular system or graphics processing architecture.

At 1901, as part of the initial training phase, low sample count image data and high sample count image data are generated for a plurality of image frames. At 1902, a machine-learning denoising engine is trained using the high/low sample count image data. In one embodiment, for example, a set of convolutional neural network weights associated with pixel features may be updated in accordance with the training. However, any machine-learning architecture may be used.

At 1903, at runtime, low sample count image frames are generated along with at least one reference region having a high sample count. At 1904, the high sample count reference region is used by the machine-learning engine and/or separate training logic (e.g., background training module 1700) to continually refine the training of the machine learning engine. For example, in one embodiment, the high sample count reference region is used in combination with a corresponding portion of the low sample count image to continue to teach the machine learning engine 1904 how to most effectively perform denoising. In a CNN implementation, for example, this may involve updating the weights associated with the CNN.

Multiple variations of the embodiments described above may be implemented, such as the manner in which the feedback loop to the machine learning engine is configured, the entities which generate the training data, the manner in which the training data is fed back to training engine, and how the improved network is provided to the rendering engines. In addition, while the above embodiments described above perform continuous training using a single reference region, any number of reference regions may be used. Moreover, as previously mentioned, the reference regions may be of different sizes, may be used on different numbers of image frames, and may be positioned in different locations within the image frames using different techniques (e.g., random, according to a predetermined pattern, etc).

In addition, while a convolutional neural network (CNN) is described as one example of a machine-learning engine 1600, the underlying principles of the invention may be implemented using any form of machine learning engine which is capable of continually refining its results using new training data. By way of example, and not limitation, other machine learning implementations include the group method of data handling (GMDH), long short-term memory, deep reservoir computing, deep belief networks, tensor deep stacking networks, and deep predictive coding networks, to name a few.

Apparatus and Method for Efficient Distributed Denoising

As described above, denoising has become a critical feature real-time ray tracing with smooth, noiseless images. Rendering can be done across a distributed system on multiple devices, but so far the existing denoising frameworks all operate on a single instance on a single machine. If rendering is being done across multiple devices, they may not have all rendered pixels accessible for computing a denoised portion of the image.

One embodiment of the invention includes a distributed denoising algorithm that works with both artificial intelligence (AI) and non-AI based denoising techniques. Regions of the image are either already distributed across nodes from a distributed render operation, or split up and distributed from a single frame buffer. Ghost regions of neighboring regions needed for computing sufficient denoising are collected from neighboring nodes when needed, and the final resulting tiles are composited into a final image.

Distributed Processing

Figure 20:
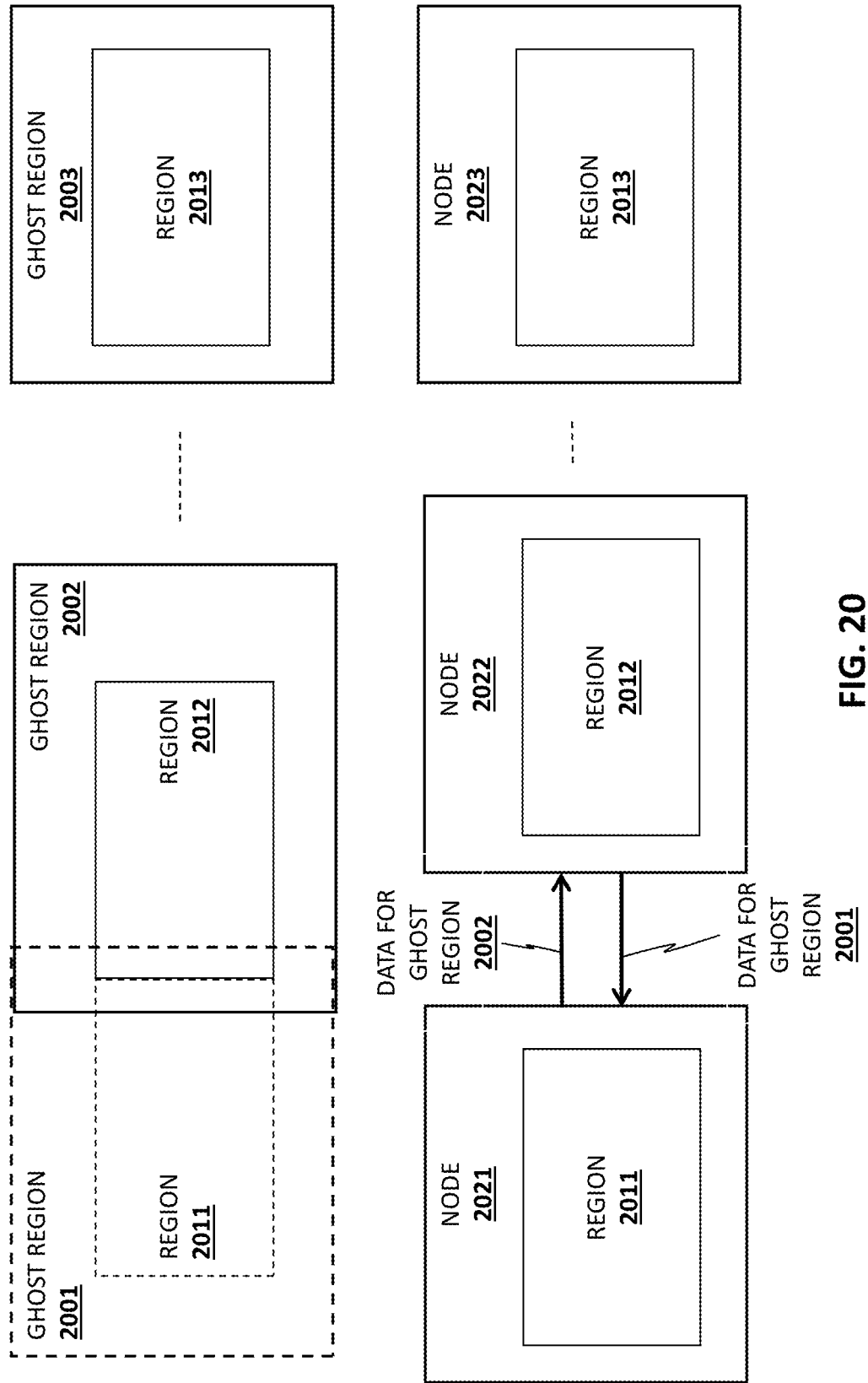
FIG. 20 illustrates one embodiment in which nodes exchange ghost region data to perform distributed denoising operations.

FIG. 20 illustrates one embodiment of the invention where multiple nodes 2021-2023 perform rendering. While only three nodes are illustrated for simplicity, the underlying principles of the invention are not limited to any particular number of nodes. In fact, a single node may be used to implement certain embodiments of the invention.

Nodes 2021-2023 each render a portion of an image, resulting in regions 2011-2013 in this example. While rectangular regions 2011-2013 are shown in FIG. 20, regions of any shape may be used and any device can process any number of regions. The regions that are needed by a node to perform a sufficiently smooth denoising operation are referred to as ghost regions 2011-2013. In other words, the ghost regions 2001-2003 represent the entirety of data required to perform denoising at a specified level of quality. Lowering the quality level reduces the size of the ghost region and therefore the amount of data required and raising the quality level increases the ghost region and corresponding data required.

In one embodiment, if a node such as node 2021 does have a local copy of a portion of the ghost region 2001 required to denoise its region 2011 at a specified level of quality, the node will retrieve the required data from one or more "adjacent" nodes, such as node 2022 which owns a portion of ghost region 2001 as illustrated. Similarly, if node 2022 does have a local copy of a portion of ghost region 2002 required to denoise its region 2012 at the specified level of quality, node 2022 will retrieve the required ghost region data 2032 from node 2021. The retrieval may be performed over a bus, an interconnect, a high speed memory fabric, a network (e.g., high speed Ethernet), or may even be an on-chip interconnect in a multi-core chip capable of distributing rendering work among a plurality of cores (e.g., used for rendering large images at either extreme resolutions or time varying). In one embodiment, each node 2021-2023 comprises an individual execution unit or specified set of execution units within a graphics processor.

The specific amount of data to be sent is dependent on the denoising techniques being used. Moreover, the data from the ghost region may include any data needed to improve denoising of each respective region. In one embodiment, for example, the ghost region data includes image colors/wavelengths, intensity/alpha data, and/or normals. However, the underlying principles of the invention are not limited to any particular set of ghost region data.

Additional Details of One Embodiment

For slower networks or interconnects, compression of this data can be utilized using existing general purpose lossless or lossy compression. Examples include, but are not limited to, zlib, gzip, and Lempel-Ziv-Markov chain algorithm (LZMA). Further content-specific compression may be used by noting that the delta in ray hit information between frames can be quite sparse, and only the samples that contribute to that delta need to be sent when the node already has the collected deltas from previous frames. These can be selectively pushed to nodes that collect those samples, i, or node i can request samples from other nodes. In one embodiment, lossless compression is used for certain types of data and program code while lossy data is used for other types of data.

Figure 21:
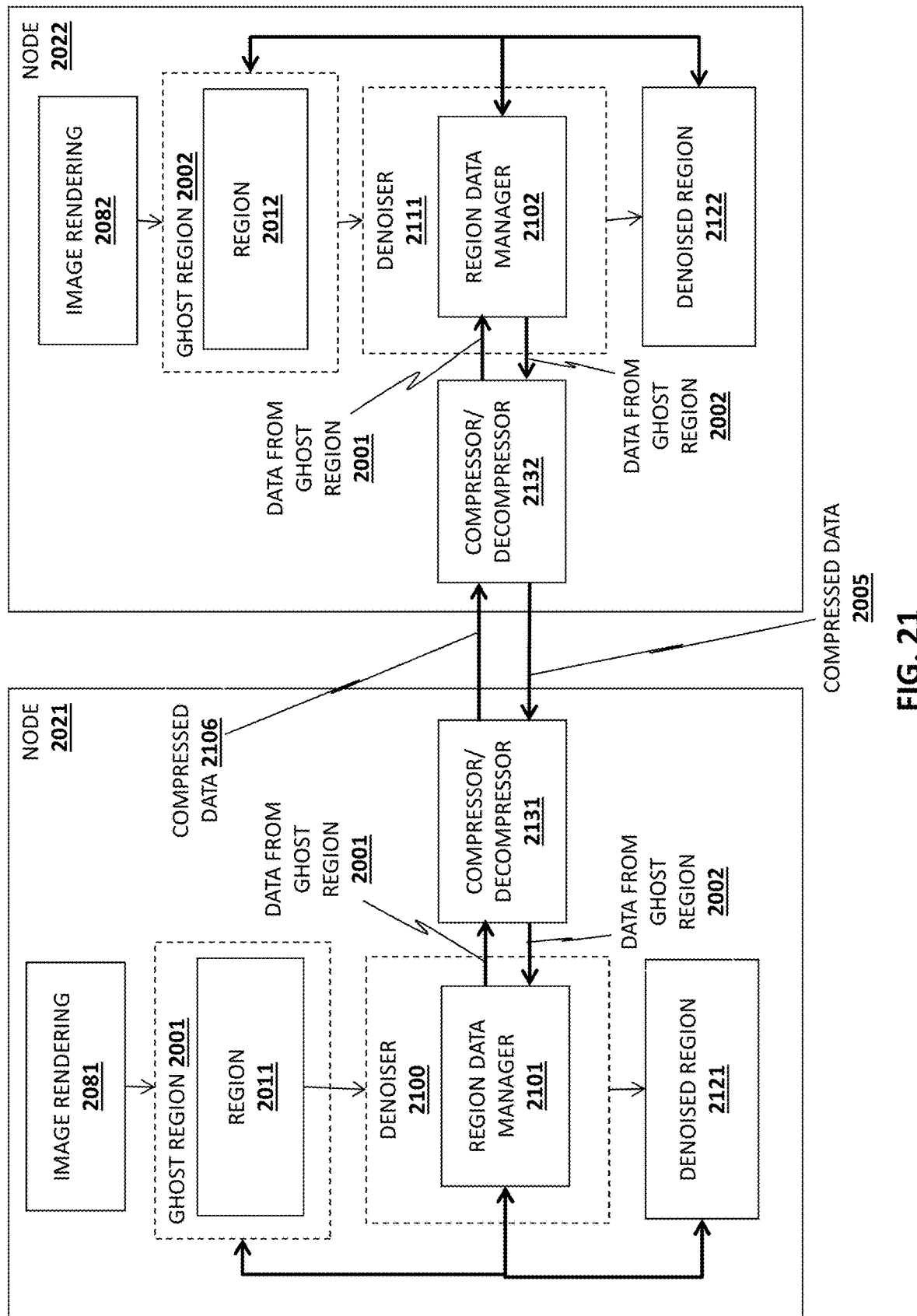
FIG. 21 illustrates one embodiment of an architecture in which image rendering and denoising operations are distributed across a plurality of nodes.

FIG. 21 illustrates additional details of the interactions between nodes 2021-2022, in accordance with one embodiment of the invention. Each node 2021-2022 includes a ray tracing rendering circuitry 2081-2082 for rendering the respective image regions 2011-2012 and ghost regions 2001-2002. Denoisers 2100-2111 execute denoising operations on the regions 2011-2012, respectively, which each node 2021-2022 is responsible for rendering and denoising. The denoisers 2021-2022, for example, may comprise circuitry, software, or any combination thereof to generate the denoised regions 2121-2122, respectively. As mentioned, when generating denoised regions the denoisers 2021-2022 may need to rely on data within a ghost region owned by a different node (e.g., denoiser 2100 may need data from ghost region 2002 owned by node 2022).

Thus, in one embodiment, the denoisers 2100-2111 generate the denoised regions 2121-2122 using data from regions 2011-2012 and ghost regions 2001-2002, respectively, at least a portion of which may be received from another node. Region data managers 2101-2102 manage data transfers from ghost regions 2001-2002 as described herein. In one embodiment, compressor/decompressor units 2131-2132 perform compression and decompression of the ghost region data exchanged between the nodes 2021-2022, respectively.

For example, region data manager 2101 of node 2021 may, upon request from node 2022, send data from ghost region 2001 to compressor/decompressor 2131, which compresses the data to generate compressed data 2106 which it transmits to node 2022, thereby reducing bandwidth over the interconnect, network, bus, or other data communication link. Compressor/decompressor 2132 of node 2022 then decompresses the compressed data 2106 and denoiser 2111 uses the decompressed ghost data to generate a higher quality denoised region 2012 than would be possible with only data from region 2012. The region data manager 2102 may store the decompressed data from ghost region 2001 in a cache, memory, register file or other storage to make it available to the denoiser 2111 when generating the denoised region 2122. A similar set of operations may be performed to provide the data from ghost region 2002 to denoiser 2100 on node 2021 which uses the data in combination with data from region 2011 to generate a higher quality denoised region 2121.

Grab Data or Render

If the connection between devices such as nodes 2021-2022 is slow (i.e., lower than a threshold latency and/or threshold bandwidth), it may be faster to render ghost regions locally rather than requesting the results from other devices. This can be determined at run-time by tracking network transaction speeds and linearly extrapolated render times for the ghost region size. In such cases where it is faster to render out the entire ghost region, multiple devices may end up rendering the same portions of the image. The resolution of the rendered portion of the ghost regions may be adjusted based on the variance of the base region and the determined degree of blurring.

Load Balancing

In one embodiment, static and/or dynamic load balancing schemes may are used to distribute the processing load among the various nodes 2021-2023. For dynamic load balancing, the variance determined by the denoising filter may require both more time in denoising but drive the amount of samples used to render a particular region of the scene, with low variance and blurry regions of the image requiring fewer samples. The specific regions assigned to specific nodes may be adjusted dynamically based on data from previous frames or dynamically communicated across devices as they are rendering so that all devices will have the same amount of work.

Figure 22:
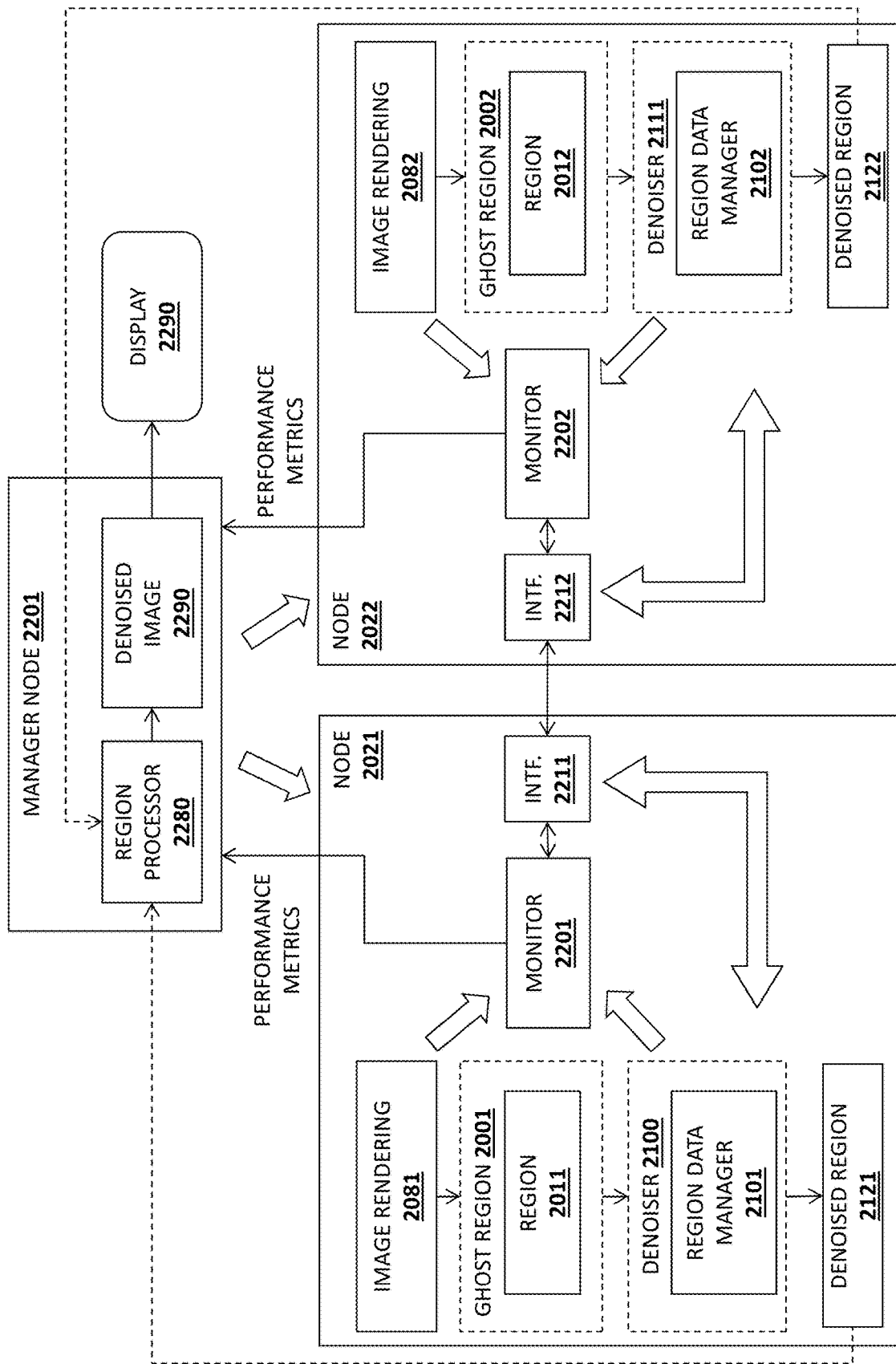
FIG. 22 illustrates additional details of an architecture for distributed rendering and denoising.

FIG. 22 illustrates one embodiment in which a monitor 2201-2202 running on each respective node 2021-2022 collects performance metric data including, but not limited to, the time consumed to transmit data over the network interface 2211-2212, the time consumed when denoising a region (with and without ghost region data), and the time consumed rendering each region/ghost region. The monitors 2201-2202 report these performance metrics back to a manager or load balancer node 2201, which analyzes the data to identify the current workload on each node 2021-2022 and potentially determines a more efficient mode of processing the various denoised regions 2121-2122. The manager node 2201 then distributes new workloads for new regions to the nodes 2021-2022 in accordance with the detected load. For example, the manager node 2201 may transmit more work to those nodes which are not heavily loaded and/or reallocate work from those nodes which are overloaded. In addition, the load balancer node 2201 may transmit a reconfiguration command to adjust the specific manner in which rendering and/or denoising is performed by each of the nodes (some examples of which are described above).

Determining Ghost Regions

In one embodiment, the sizes and shapes of the ghost regions 2001-2002 are determined based on the denoising algorithm implemented by the denoisers 2100-2111. Their respective sizes can then be dynamically modified based on the detected variance of the samples being denoised. The learning algorithm used for AI denoising itself may be used for determining appropriate region sizes, or in other cases such as a bilateral blur the predetermined filter width will determine the size of the ghost regions 2001-2002. In an implementation which uses a learning algorithm, the machine learning engine may be executed on the manager node 2201 and/or portions of the machine learning may be executed on each of the individual nodes 2021-2023 (see, e.g., FIGS. 18A-B and associated text above).

Gathering the Final Image

In one embodiment, the final image is generated by gathering the rendered and denoised regions from each of the nodes 2021-2023, without the need for the ghost regions or normals. In FIG. 22, for example, the denoised regions 2121-2122 are transmitted to regions processor 2280 of the manager node 2201 which combines the regions to generate the final denoised image 2290, which is then displayed on a display 2290. The region processor 2280 may combine the regions using a variety of 2D compositing techniques. Although illustrated as separate components, the region processor 2280 and denoised image 2290 may be integral to the display 2290. In this embodiment, the various nodes 2021-2022 may use a direct-send technique to transmit the denoised regions 2121-2122 and potentially using various lossy or lossless compression of the region data.

AI denoising is still a costly operation and as gaming moves into the cloud. As such, distributing processing of denoising across multiple nodes 2021-2022 may become required for achieving real-time frame rates for traditional gaming or virtual reality (VR) which requires higher frame rates. Movie studios also often render in large render farms which can be utilized for faster denoising.

Figure 23:
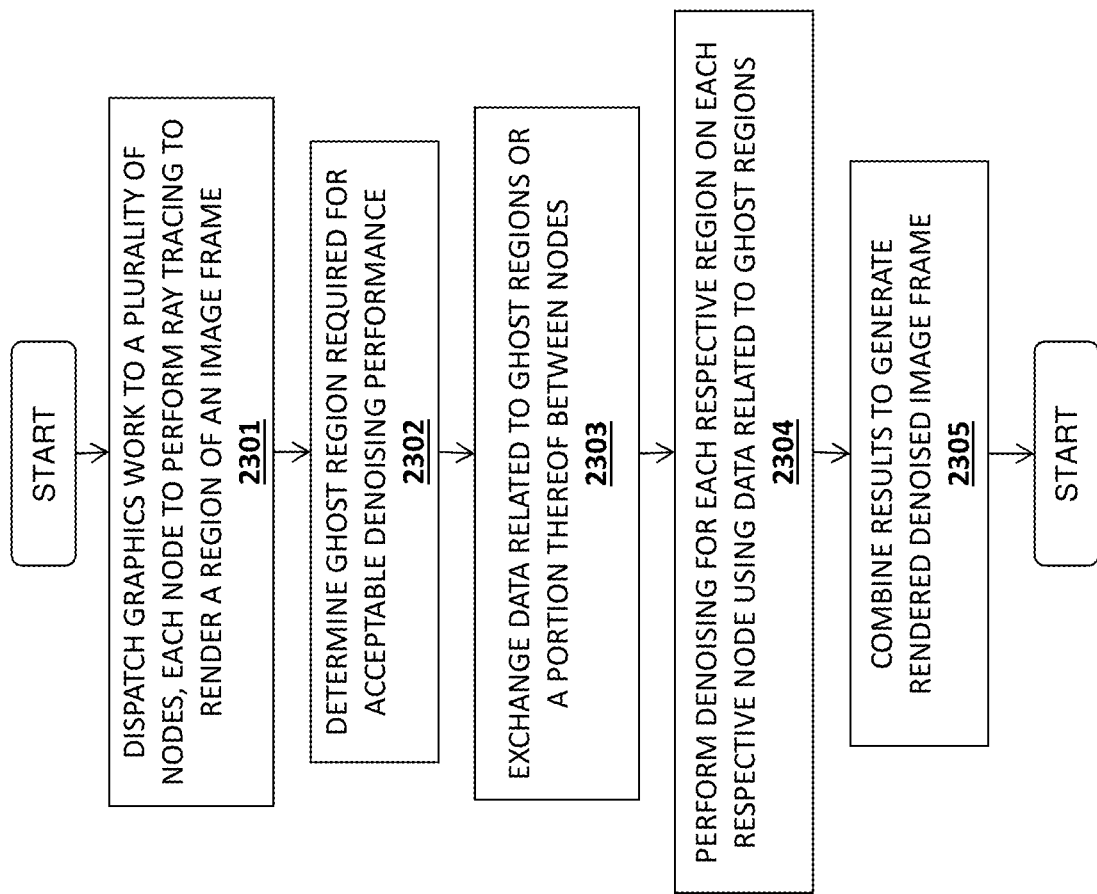
FIG. 23 illustrates a method in accordance with one embodiment of the invention.

One embodiment of a method for performing distributed rendering and denoising is illustrated in FIG. 23. The method may be implemented within the context of the system architectures described above, but is not limited to any particular system architecture.

At 2301, graphics work is dispatched to a plurality of nodes which perform ray tracing operations to render a region of an image frame. In one embodiment, each node may already have data required to perform the operations in memory. For example, two or more of the nodes may share a common memory or the local memories of the nodes may already have stored data from prior ray tracing operations. Alternatively, or in addition, certain data may be transmitted to each node.

At 2302, the "ghost region" required for a specified level of denoising (i.e., at an acceptable level of performance) is determined. The ghost region comprises any data required to perform the specified level of denoising, including data owned by one or more other nodes.

At 2303, data related to the ghost regions (or portions thereof) is exchanged between nodes. At 2304 each node performs denoising on its respective region (e.g., using the exchanged data) and at 2305 the results are combined to generate the final denoised image frame.

In one embodiment, a manager node or primary node such as shown in FIG. 22 dispatches the work to the nodes and then combines the work performed by the nodes to generate the final image frame. In another embodiment, a peer-based architecture is used where the nodes are peers which exchange data to render and denoise the final image frame.

The nodes described herein (e.g., nodes 2021-2023) may be graphics processing computing systems interconnected via a high speed network. Alternatively, the nodes may be individual processing elements coupled to a high speed memory fabric. In this embodiment, all of the nodes may share a common virtual memory space and/or a common physical memory. In another embodiment, the nodes may be a combination of CPUs and GPUs. For example, the manager node 2201 described above may be a CPU and/or software executed on the CPU and the nodes 2021-2022 may be GPUs and/or software executed on the GPUs. Various different types of nodes may be used while still complying with the underlying principles of the invention.

Example Neural Network Implementations

There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 24:
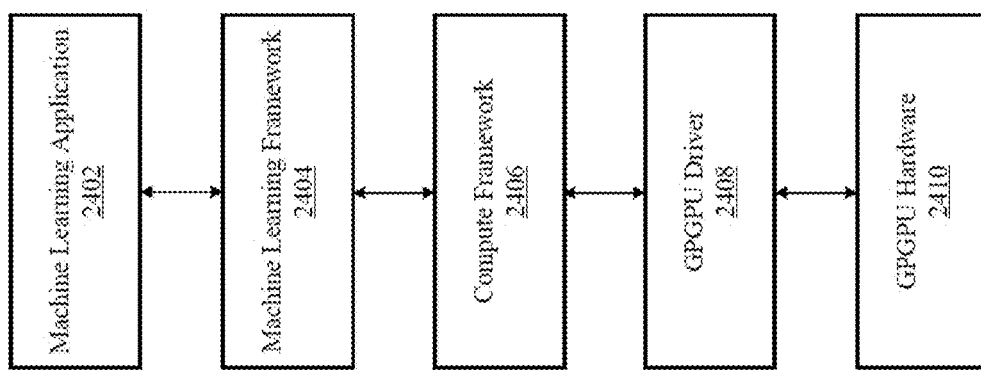
FIG. 24 illustrates one embodiment of a machine learning method.

FIG. 24 is a generalized diagram of a machine learning software stack 2400. A machine learning application 2402 can be configured to train a neural network using a training dataset or to use a trained deep neural network to implement machine intelligence. The machine learning application 2402 can include training and inference functionality for a neural network and/or specialized software that can be used to train a neural network before deployment. The machine learning application 2402 can implement any type of machine intelligence including but not limited to image recognition, mapping and localization, autonomous navigation, speech synthesis, medical imaging, or language translation.

Hardware acceleration for the machine learning application 2402 can be enabled via a machine learning framework 2404. The machine learning framework 2404 can provide a library of machine learning primitives. Machine learning primitives are basic operations that are commonly performed by machine learning algorithms. Without the machine learning framework 2404, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 2404. Exemplary primitives include tensor convolutions, activation functions, and pooling, which are computational operations that are performed while training a convolutional neural network (CNN). The machine learning framework 2404 can also provide primitives to implement basic linear algebra subprograms performed by many machine-learning algorithms, such as matrix and vector operations.

The machine learning framework 2404 can process input data received from the machine learning application 2402 and generate the appropriate input to a compute framework 2406. The compute framework 2406 can abstract the underlying instructions provided to the GPGPU driver 2408 to enable the machine learning framework 2404 to take advantage of hardware acceleration via the GPGPU hardware 2410 without requiring the machine learning framework 2404 to have intimate knowledge of the architecture of the GPGPU hardware 2410. Additionally, the compute framework 2406 can enable hardware acceleration for the machine learning framework 2404 across a variety of types and generations of the GPGPU hardware 2410.

GPGPU Machine Learning Acceleration

Figure 25:
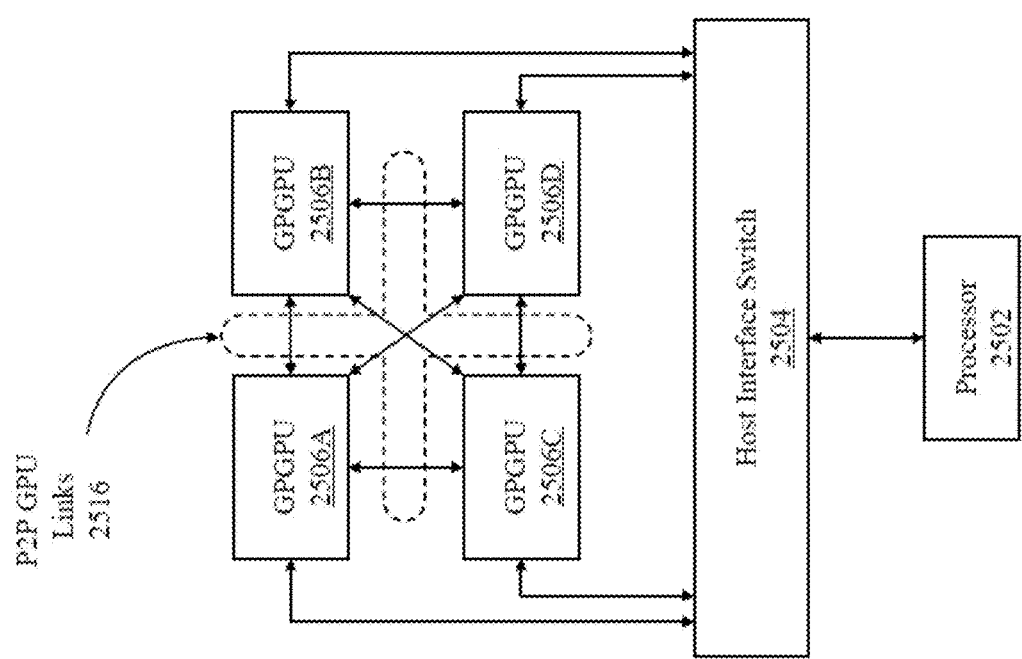
FIG. 25 illustrates a plurality of interconnected general purpose graphics processors.

FIG. 25 illustrates a multi-GPU computing system 2500, according to an embodiment. The multi-GPU computing system 2500 can include a processor 2502 coupled to multiple GPGPUs 2506A-D via a host interface switch 2504. The host interface switch 2504, in one embodiment, is a PCI express switch device that couples the processor 2502 to a PCI express bus over which the processor 2502 can communicate with the set of GPGPUs 2506A-D. Each of the multiple GPGPUs 2506A-D can be an instance of the GPGPU described above. The GPGPUs 2506A-D can interconnect via a set of high-speed point to point GPU to GPU links 2516. The high-speed GPU to GPU links can connect to each of the GPGPUs 2506A-D via a dedicated GPU link. The P2P GPU links 2516 enable direct communication between each of the GPGPUs 2506A-D without requiring communication over the host interface bus to which the processor 2502 is connected. With GPU-to-GPU traffic directed to the P2P GPU links, the host interface bus remains available for system memory access or to communicate with other instances of the multi-GPU computing system 2500, for example, via one or more network devices. While in the illustrated embodiment the GPGPUs 2506A-D connect to the processor 2502 via the host interface switch 2504, in one embodiment the processor 2502 includes direct support for the P2P GPU links 2516 and can connect directly to the GPGPUs 2506A-D.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 26:
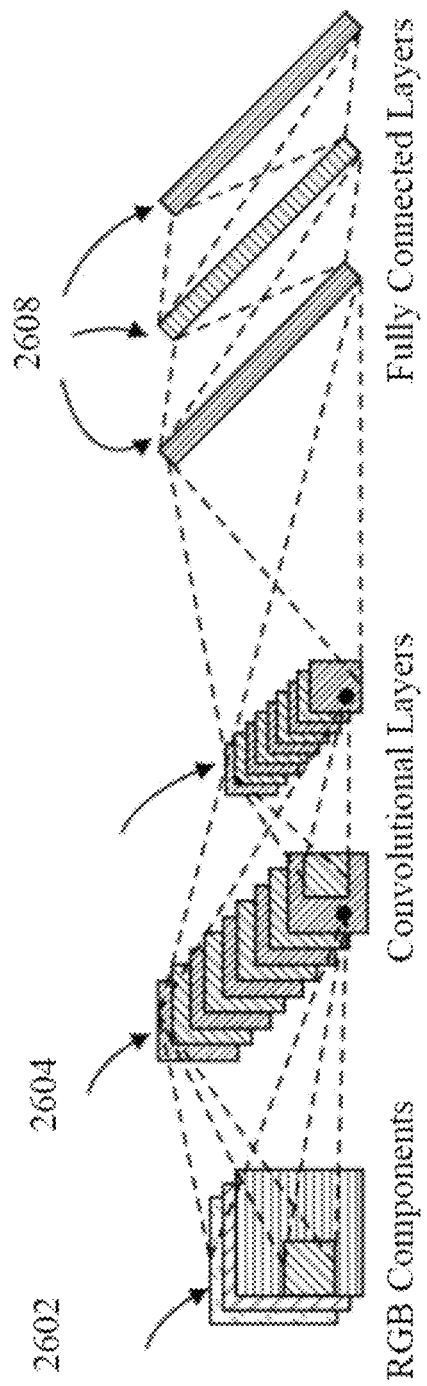
FIG. 26 illustrates a set of convolutional layers and fully connected layers for a machine learning implementation.
Figure 27:
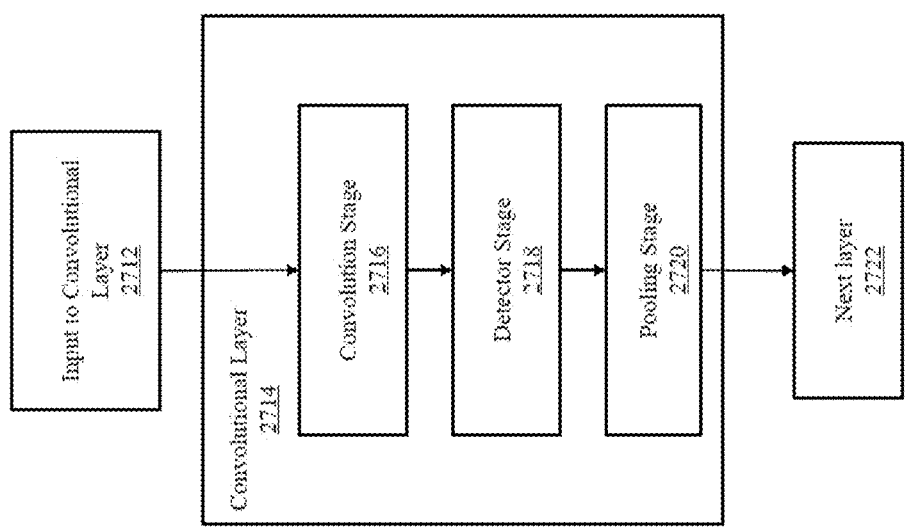
FIG. 27 illustrates one embodiment of a convolutional layer.

FIGS. 26-27 illustrate an exemplary convolutional neural network. FIG. 26 illustrates various layers within a CNN. As shown in FIG. 26, an exemplary CNN used to model image processing can receive input 2602 describing the red, green, and blue (RGB) components of an input image. The input 2602 can be processed by multiple convolutional layers (e.g., convolutional layer 2604, convolutional layer 2606). The output from the multiple convolutional layers may optionally be processed by a set of fully connected layers 2608. Neurons in a fully connected layer have full connections to all activations in the previous layer, as previously described for a feedforward network. The output from the fully connected layers 2608 can be used to generate an output result from the network. The activations within the fully connected layers 2608 can be computed using matrix multiplication instead of convolution. Not all CNN implementations are make use of fully connected layers. For example, in some implementations the convolutional layer 2606 can generate output for the CNN.

The convolutional layers are sparsely connected, which differs from traditional neural network configuration found in the fully connected layers 2608. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 27 illustrates exemplary computation stages within a convolutional layer of a CNN. Input to a convolutional layer 2712 of a CNN can be processed in three stages of a convolutional layer 2714. The three stages can include a convolution stage 2716, a detector stage 2718, and a pooling stage 2720. The convolution layer 2714 can then output data to a successive convolutional layer. The final convolutional layer of the network can generate output feature map data or provide input to a fully connected layer, for example, to generate a classification value for the input to the CNN.

In the convolution stage 2716 performs several convolutions in parallel to produce a set of linear activations. The convolution stage 2716 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 2716 defines a set of linear activations that are processed by successive stages of the convolutional layer 2714.

The linear activations can be processed by a detector stage 2718. In the detector stage 2718, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0,x)$, such that the activation is thresholded at zero.

The pooling stage 2720 uses a pooling function that replaces the output of the convolutional layer 2706 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 2720, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 2714 can then be processed by the next layer 2722. The next layer 2722 can be an additional convolutional layer or one of the fully connected layers 2708. For example, the first convolutional layer 2704 of FIG. 27 can output to the second convolutional layer 2706, while the second convolutional layer can output to a first layer of the fully connected layers 2808.

Figure 28:
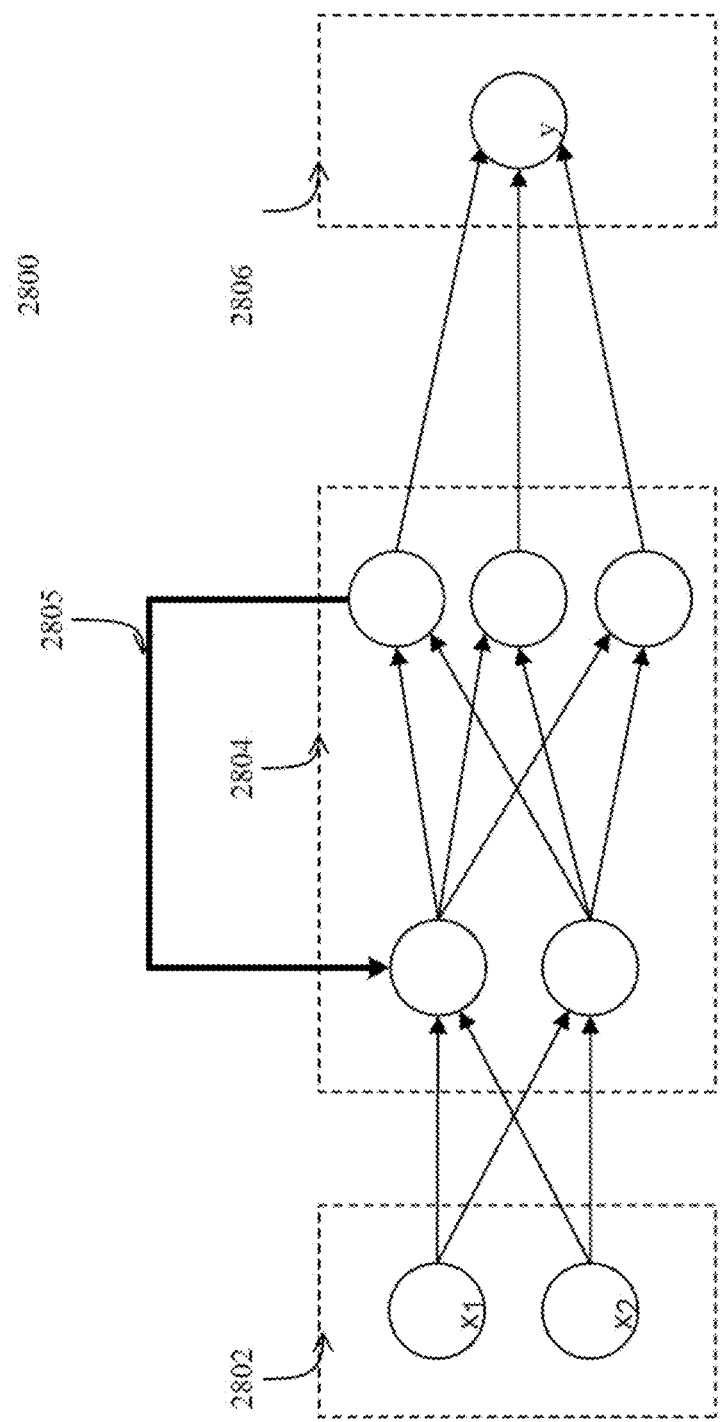
FIG. 28 illustrates an example of a set of interconnected nodes in a machine learning implementation.

FIG. 28 illustrates an exemplary recurrent neural network 2800. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 2800 can be described has having an input layer 2802 that receives an input vector, hidden layers 2804 to implement a recurrent function, a feedback mechanism 2805 to enable a 'memory' of previous states, and an output layer 2806 to output a result. The RNN 2800 operates based on time-steps. The state of the RNN at a given time step is influenced based on the previous time step via the feedback mechanism 2805. For a given time step, the state of the hidden layers 2804 is defined by the previous state and the input at the current time step. An initial input (x1) at a first time step can be processed by the hidden layer 2804. A second input (x2) can be processed by the hidden layer 2804 using state information that is determined during the processing of the initial input (x1). A given state can be computed as $s\_t=f(Ux\_t+Ws\_(t-1))$, where U and W are parameter matrices. The function f is generally a nonlinearity, such as the hyperbolic tangent function (Tan h) or a variant of the rectifier function $f(x)=\max(0,x)$. However, the specific mathematical function used in the hidden layers 2804 can vary depending on the specific implementation details of the RNN 2800.

In addition to the basic CNN and RNN networks described, variations on those networks may be enabled. One example RNN variant is the long short term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 29:
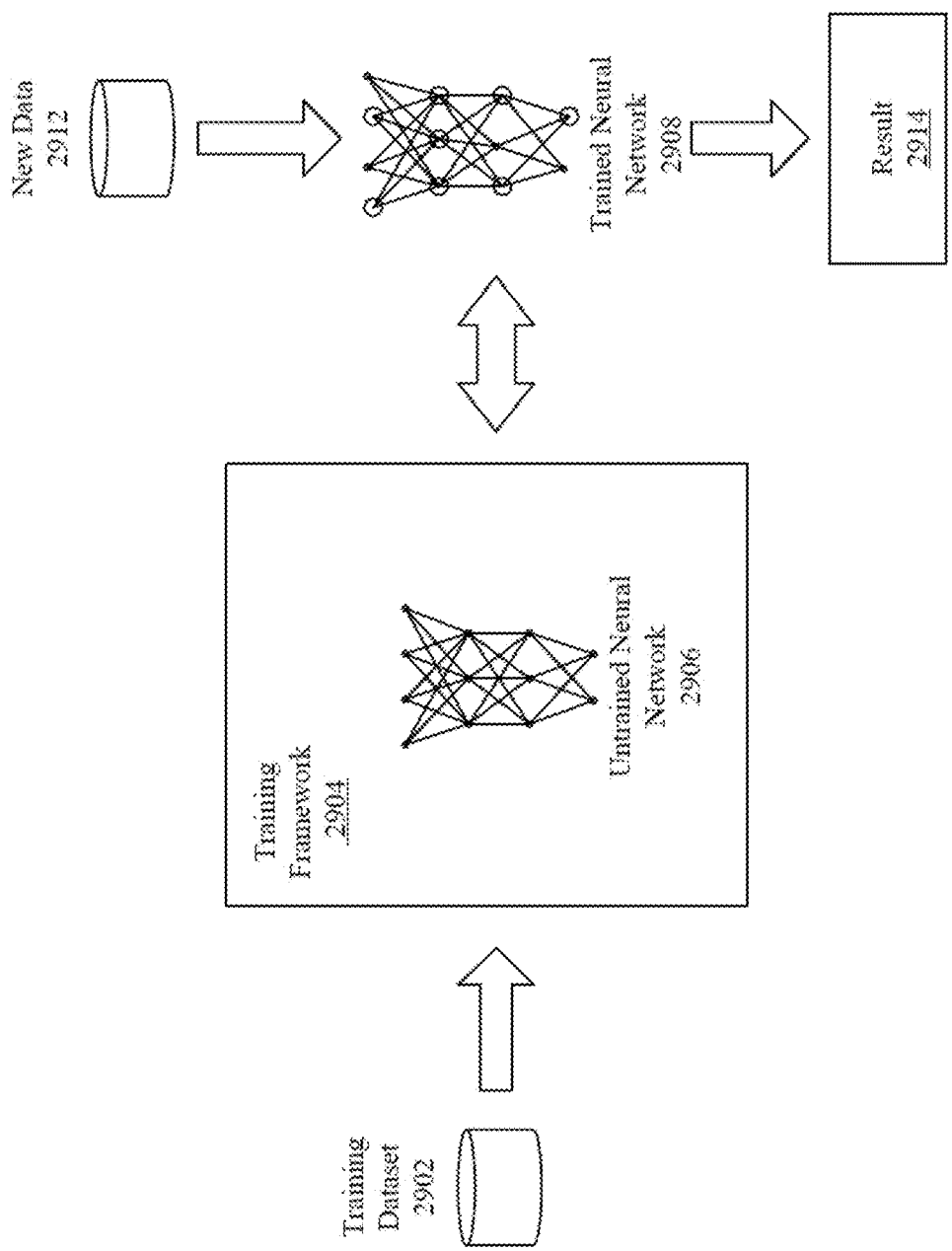
FIG. 29 illustrates an embodiment of a training framework within which a neural network learns using a training dataset.

FIG. 29 illustrates training and deployment of a deep neural network. Once a given network has been structured for a task the neural network is trained using a training dataset 2902. Various training frameworks 2904 have been developed to enable hardware acceleration of the training process. For example, the machine learning framework described above may be configured as a training framework. The training framework 2904 can hook into an untrained neural network 2906 and enable the untrained neural net to be trained using the parallel processing resources described herein to generate a trained neural net 2908.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 2902 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 2904 can adjust to adjust the weights that control the untrained neural network 2906. The training framework 2904 can provide tools to monitor how well the untrained neural network 2906 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural net 2908. The trained neural network 2908 can then be deployed to implement any number of machine learning operations.

Unsupervised learning is a learning method in which the network attempts to train itself using unlabeled data. Thus, for unsupervised learning the training dataset 2902 will include input data without any associated output data. The untrained neural network 2906 can learn groupings within the unlabeled input and can determine how individual inputs are related to the overall dataset. Unsupervised training can be used to generate a self-organizing map, which is a type of trained neural network 2907 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 2902 includes a mix of labeled and unlabeled data of the same distribution. Incremental learning is a variant of supervised learning in which input data is continuously used to further train the model. Incremental learning enables the trained neural network 2908 to adapt to the new data 2912 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 30A:
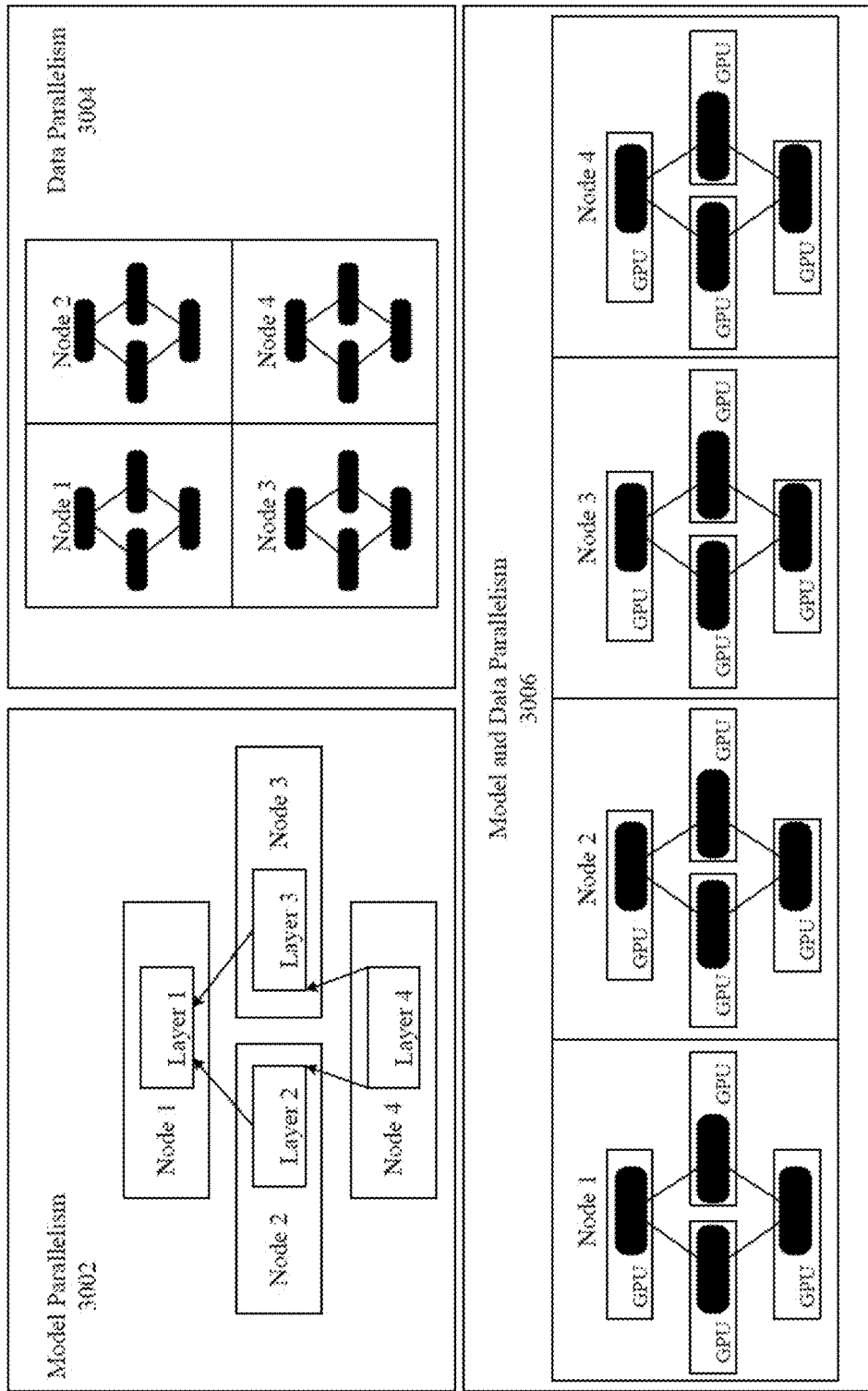
FIG. 30A illustrates examples of model parallelism and data parallelism.

FIG. 30A is a block diagram illustrating distributed learning. Distributed learning is a training model that uses multiple distributed computing nodes such as the nodes described above to perform supervised or unsupervised training of a neural network. The distributed computational nodes can each include one or more host processors and one or more of the general-purpose processing nodes, such as a highly-parallel general-purpose graphics processing unit. As illustrated, distributed learning can be performed model parallelism 3002, data parallelism 3004, or a combination of model and data parallelism.

In model parallelism 3002, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 3004, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 3006 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the highly-parallel general-purpose graphics processing unit and/or the multi-GPU computing systems described herein. On the contrary, deployed machine learning platforms generally include lower power parallel processors suitable for use in products such as cameras, autonomous robots, and autonomous vehicles.

Figure 30B:
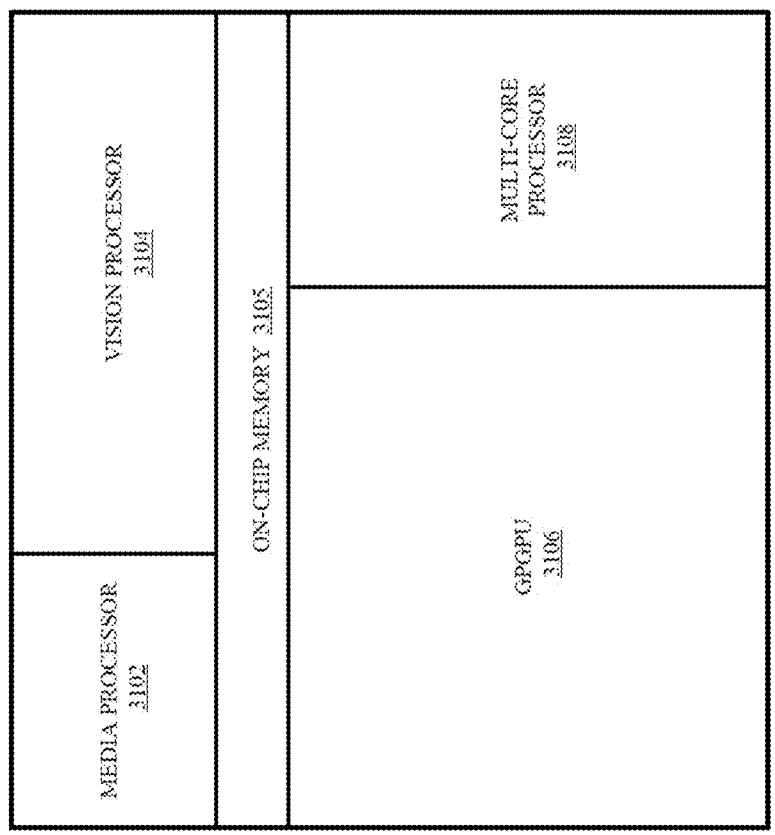
FIG. 30B illustrates an example of a system on a chip (SoC)

FIG. 30B illustrates an exemplary inferencing system on a chip (SOC) 3100 suitable for performing inferencing using a trained model. The SOC 3100 can integrate processing components including a media processor 3102, a vision processor 3104, a GPGPU 3106 and a multi-core processor 3108. The SOC 3100 can additionally include on-chip memory 3105 that can enable a shared on-chip data pool that is accessible by each of the processing components. The processing components can be optimized for low power operation to enable deployment to a variety of machine learning platforms, including autonomous vehicles and autonomous robots. For example, one implementation of the SOC 3100 can be used as a portion of the main control system for an autonomous vehicle. Where the SOC 3100 is configured for use in autonomous vehicles the SOC is designed and configured for compliance with the relevant functional safety standards of the deployment jurisdiction.

During operation, the media processor 3102 and vision processor 3104 can work in concert to accelerate computer vision operations. The media processor 3102 can enable low latency decode of multiple high-resolution (e.g., 4K, 8K) video streams. The decoded video streams can be written to a buffer in the on-chip-memory 3105. The vision processor 3104 can then parse the decoded video and perform preliminary processing operations on the frames of the decoded video in preparation of processing the frames using a trained image recognition model. For example, the vision processor 3104 can accelerate convolution operations for a CNN that is used to perform image recognition on the high-resolution video data, while back end model computations are performed by the GPGPU 3106.

The multi-core processor 3108 can include control logic to assist with sequencing and synchronization of data transfers and shared memory operations performed by the media processor 3102 and the vision processor 3104. The multi-core processor 3108 can also function as an application processor to execute software applications that can make use of the inferencing compute capability of the GPGPU 3106. For example, at least a portion of the navigation and driving logic can be implemented in software executing on the multi-core processor 3108. Such software can directly issue computational workloads to the GPGPU 3106 or the computational workloads can be issued to the multi-core processor 3108, which can offload at least a portion of those operations to the GPGPU 3106.

The GPGPU 3106 can include compute clusters such as a low power configuration of the compute clusters DPLAB06A-DPLAB06H within the highly-parallel general-purpose graphics processing unit DPLAB00. The compute clusters within the GPGPU 3106 can support instruction that are specifically optimized to perform inferencing computations on a trained neural network. For example, the GPGPU 3106 can support instructions to perform low precision computations such as 8-bit and 4-bit integer vector operations.

Ray Tracing Architecture

In one implementation, the graphics processor includes circuitry and/or program code for performing real-time ray tracing. In some embodiments, a dedicated set of ray tracing cores are included in the graphics processor to perform the various ray tracing operations described herein, including ray traversal and/or ray intersection operations. In addition to the ray tracing cores, one embodiment includes multiple sets of graphics processing cores for performing programmable shading operations and multiple sets of tensor cores for performing matrix operations on tensor data.

Figure 31:
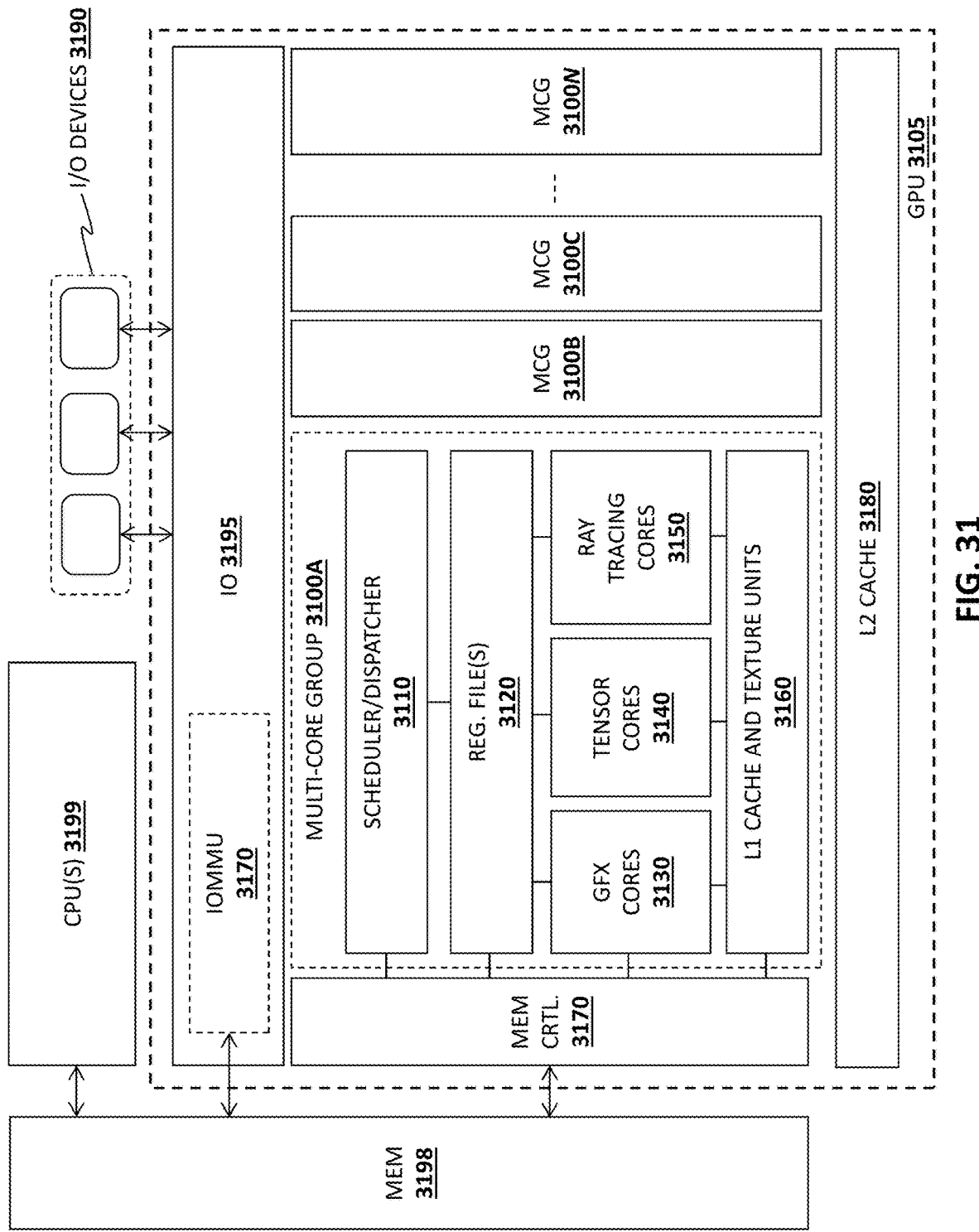
FIG. 31 illustrates an example of a processing architecture which includes ray tracing cores and tensor cores.

FIG. 31 illustrates an exemplary portion of one such graphics processing unit (GPU) 3105 which includes dedicated sets of graphics processing resources arranged into multi-core groups 3100A-N. While the details of only a single multi-core group 3100A are provided, it will be appreciated that the other multi-core groups 3100B-N may be equipped with the same or similar sets of graphics processing resources.

As illustrated, a multi-core group 3100A may include a set of graphics cores 3130, a set of tensor cores 3140, and a set of ray tracing cores 3150. A scheduler/dispatcher 3110 schedules and dispatches the graphics threads for execution on the various cores 3130, 3140, 3150. A set of register files 3120 store operand values used by the cores 3130, 3140, 3150 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more Level 1 (L1) caches and texture units 3160 store graphics data such as texture data, vertex data, pixel data, ray data, bounding volume data, etc, locally within each multi-core group 3100A. A Level 2 (L2) cache 3180 shared by all or a subset of the multi-core groups 3100A-N stores graphics data and/or instructions for multiple concurrent graphics threads. As illustrated, the L2 cache 3180 may be shared across a plurality of multi-core groups 3100A-N. One or more memory controllers 3170 couple the GPU 3105 to a memory 3198 which may be a system memory (e.g., DRAM) and/or a dedicated graphics memory (e.g., GDDR6 memory).

Input/output (IO) circuitry 3195 couples the GPU 3105 to one or more IO devices 3195 such as digital signal processors (DSPs), network controllers, or user input devices. An on-chip interconnect may be used to couple the I/O devices 3190 to the GPU 3105 and memory 3198. One or more IO memory management units (IOMMUs) 3170 of the IO circuitry 3195 couple the IO devices 3190 directly to the system memory 3198. In one embodiment, the IOMMU 3170 manages multiple sets of page tables to map virtual addresses to physical addresses in system memory 3198. In this embodiment, the IO devices 3190, CPU(s) 3199, and GPU(s) 3105 may share the same virtual address space.

In one implementation, the IOMMU 3170 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 3198). The base addresses of each of the first and second sets of page tables may be stored in control registers and swapped out on a context switch (e.g., so that the new context is provided with access to the relevant set of page tables). While not illustrated in FIG. 31, each of the cores 3130, 3140, 3150 and/or multi-core groups 3100A-N may include translation lookaside buffers (TLBs) to cache guest virtual to guest physical translations, guest physical to host physical translations, and guest virtual to host physical translations.

In one embodiment, the CPUs 3199, GPUs 3105, and IO devices 3190 are integrated on a single semiconductor chip and/or chip package. The illustrated memory 3198 may be integrated on the same chip or may be coupled to the memory controllers 3170 via an off-chip interface. In one implementation, the memory 3198 comprises GDDR6 memory which shares the same virtual address space as other physical system-level memories, although the underlying principles of the invention are not limited to this specific implementation.

In one embodiment, the tensor cores 3140 include a plurality of execution units specifically designed to perform matrix operations, which are the fundamental compute operation used to perform deep learning operations. For example, simultaneous matrix multiplication operations may be used for neural network training and inferencing. The tensor cores 3140 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 3140. The training of neural networks, in particular, requires a significant number matrix dot product operations. In order to process an inner-product formulation of an N×N×N matrix multiply, the tensor cores 3140 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 3140 to ensure that the most efficient precision is used for different workloads (e.g., such as inferencing workloads which can tolerate quantization to bytes and half-bytes).

In one embodiment, the ray tracing cores 3150 accelerate ray tracing operations for both real-time ray tracing and non-real-time ray tracing implementations. In particular, the ray tracing cores 3150 include ray traversal/intersection circuitry for performing ray traversal using bounding volume hierarchies (BVHs) and identifying intersections between rays and primitives enclosed within the BVH volumes. The ray tracing cores 3150 may also include circuitry for performing depth testing and culling (e.g., using a Z buffer or similar arrangement). In one implementation, the ray tracing cores 3150 perform traversal and intersection operations in concert with the image denoising techniques described herein, at least a portion of which may be executed on the tensor cores 3140. For example, in one embodiment, the tensor cores 3140 implement a deep learning neural network to perform denoising of frames generated by the ray tracing cores 3150. However, the CPU(s) 3199, graphics cores 3130, and/or ray tracing cores 3150 may also implement all or a portion of the denoising and/or deep learning algorithms.

In addition, as described above, a distributed approach to denoising may be employed in which the GPU 3105 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 3150 process all BVH traversal and ray-primitive intersections, saving the graphics cores 3130 from being overloaded with thousands of instructions per ray. In one embodiment, each ray tracing core 3150 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 3100A can simply launch a ray probe, and the ray tracing cores 3150 independently perform ray traversal and intersection and return hit data (e.g., a hit, no hit, multiple hits, etc) to the thread context. The other cores 3130, 3140 are freed to perform other graphics or compute work while the ray tracing cores 3150 perform the traversal and intersection operations.

In one embodiment, each ray tracing core 3150 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 3130 and tensor cores 3140) are freed to perform other forms of graphics work.

In one particular embodiment described below, a hybrid rasterization/ray tracing approach is used in which work is distributed between the graphics cores 3130 and ray tracing cores 3150.

In one embodiment, the ray tracing cores 3150 (and/or other cores 3130, 3140) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 3150, graphics cores 3130 and tensor cores 3140 is Vulkan 1.1.85. Note, however, that the underlying principles of the invention are not limited to any particular ray tracing ISA.

In general, the various cores 3150, 3140, 3130 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Hierarchical Beam Tracing

Bounding volume hierarchies are commonly used to improve the efficiency with which operations are performed on graphics primitives and other graphics objects. A BVH is a hierarchical tree structure which is built based on a set of geometric objects. At the top of the tree structure is the root node which encloses all of the geometric objects in a given scene. The individual geometric objects are wrapped in bounding volumes that form the leaf nodes of the tree. These nodes are then grouped as small sets and enclosed within larger bounding volumes. These, in turn, are also grouped and enclosed within other larger bounding volumes in a recursive fashion, eventually resulting in a tree structure with a single bounding volume, represented by the root node, at the top of the tree. Bounding volume hierarchies are used to efficiently support a variety of operations on sets of geometric objects, such as collision detection, primitive culling, and ray traversal/intersection operations used in ray tracing.

In ray tracing architectures, rays are traversed through a BVH to determine ray-primitive intersections. For example, if a ray does not pass through the root node of the BVH, then the ray does not intersect any of the primitives enclosed by the BVH and no further processing is required for the ray with respect to this set of primitives. If a ray passes through a first child node of the BVH but not the second child node, then the ray need not be tested against any primitives enclosed by the second child node. In this manner, a BVH provides an efficient mechanism to test for ray-primitive intersections.

Figure 32:
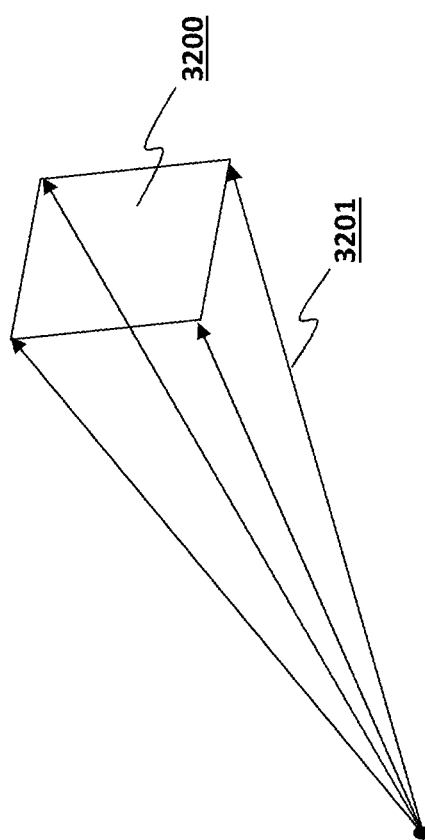
FIG. 32 illustrates an example of a beam.

In one embodiment of the invention, groups of contiguous rays, referred to as "beams" are tested against the BVH, rather than individual rays. FIG. 32 illustrates an exemplary beam 3201 outlined by four different rays. Any rays which intersect the patch 3200 defined by the four rays are considered to be within the same beam. While the beam 3201 in FIG. 32 is defined by a rectangular arrangement of rays, beams may be defined in various other ways while still complying with the underlying principles of the invention (e.g., circles, ellipses, etc).

Figure 33:
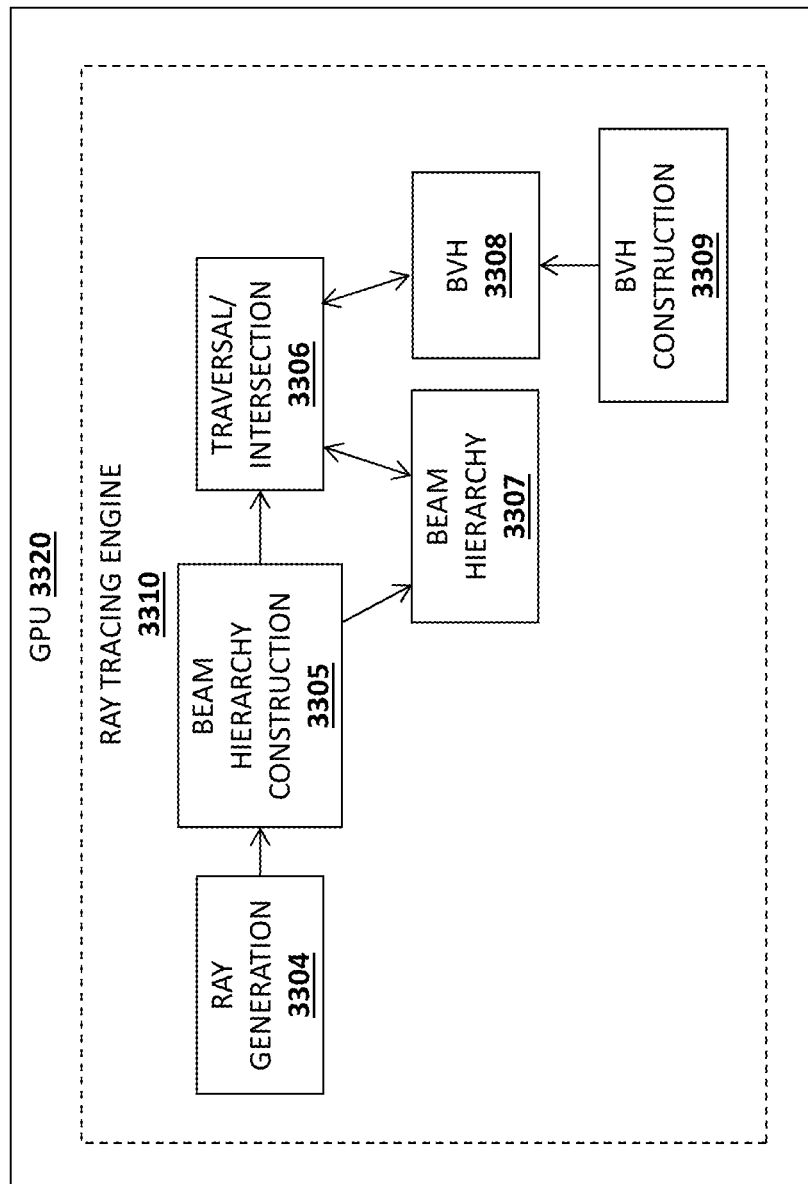
FIG. 33 illustrates an embodiment of an apparatus for performing beam tracing.
Figure 34:
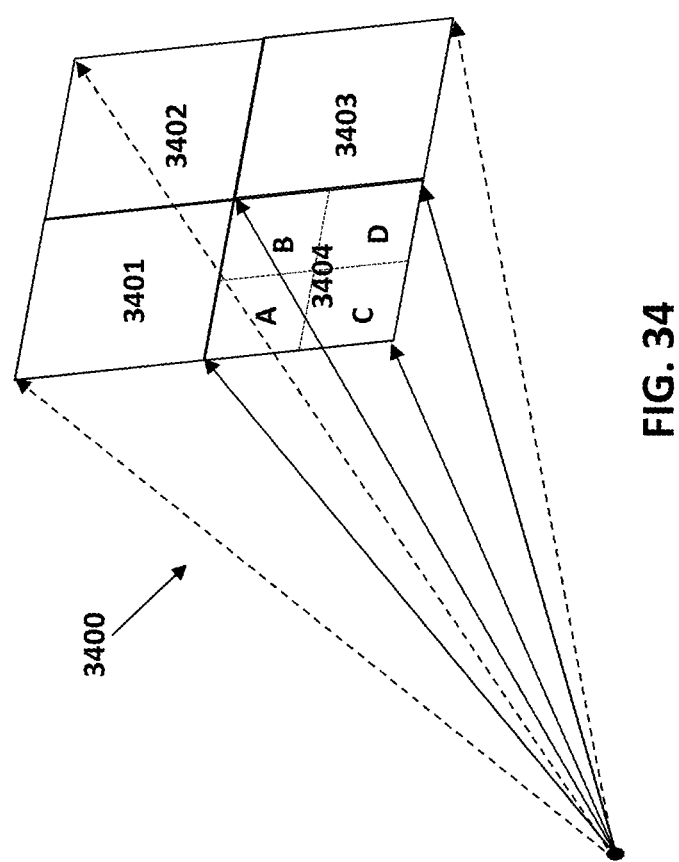
FIG. 34 illustrates an example of a beam hierarchy.

FIG. 33 illustrates an exemplary embodiment in which a ray tracing engine 3310 of a GPU 3320 implements the beam tracing techniques described herein. In particular, ray generation circuitry 3304 generates a plurality of rays for which traversal and intersection operations are to be performed. However, rather than performing traversal an intersection operations on individual rays, the illustrated embodiment performs traversal and intersection using a hierarchy of beams 3307 generated by beam hierarchy construction circuitry 3305. In one embodiment, the beam hierarchy is analogous to the bounding volume hierarchy (BVH). For example, FIG. 34 provides an example of a primary beam 3400 which may be subdivided into a plurality of different components. In particular, primary beam 3400 may be divided into quadrants 3401-3404 and each quadrant may itself be divided into sub-quadrants such as sub-quadrants A-D within quadrant 3404. The primary beam may be subdivided in a variety of ways. For example, in one embodiment, the primary beam may be divided in half (rather than quadrants) and each half may be divided in half, and so on. Regardless of how the subdivisions are made, in one embodiment, a hierarchical structure is generated in a similar manner as a BVH, e.g., with a root node representing the primary beam 3400, a first level of child nodes, each represented by a quadrant 3401-3404, second level child nodes for each sub-quadrant A-D, and so on.

In one embodiment, once the beam hierarchy 3307 is constructed, traversal/intersection circuitry 3306 performs traversal/intersection operations using the beam hierarchy 3307 and the BVH 3308. In particular, it may test the beam against the BVH and cull portions of the beam which do not intersect any portions of the BVH. Using the data shown in FIG. 34, for example, if the sub-beams associated with sub-regions 3402 and 3403 do not intersect with the BVH or a particular branch of the BVH, then they may be culled with respect to the BVH or the branch. The remaining portions 3401, 3404 may be tested against the BVH by performing a depth-first search or other search algorithm.

Figure 35:
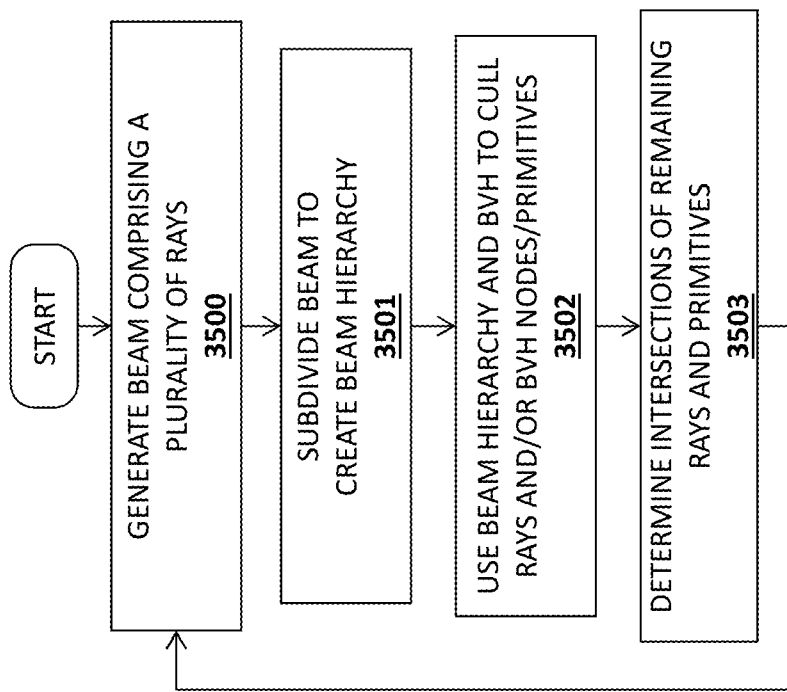
FIG. 35 illustrates a method for performing beam tracing.

A method in accordance with one embodiment of the invention is illustrated in FIG. 35. The method may be implemented within the context of the graphics processing architectures described above, but is not limited to any particular architecture.

At 3500 a primary beam is constructed comprising a plurality of rays and at 3501, the beam is subdivided and hierarchical data structures generated to create a beam hierarchy. In one embodiment, operations 3500-3501 are performed as a single, integrated operation which constructs a beam hierarchy from a plurality of rays. at 3502, the beam hierarchy is used with a BVH to cull rays (from the beam hierarchy) and/or nodes/primitives from the BVH. At 3503, ray-primitive intersections are determined for the remaining rays and primitives.

Lossy and Lossless Packet Compression in a Distributed Ray Tracing System

Figure 36:
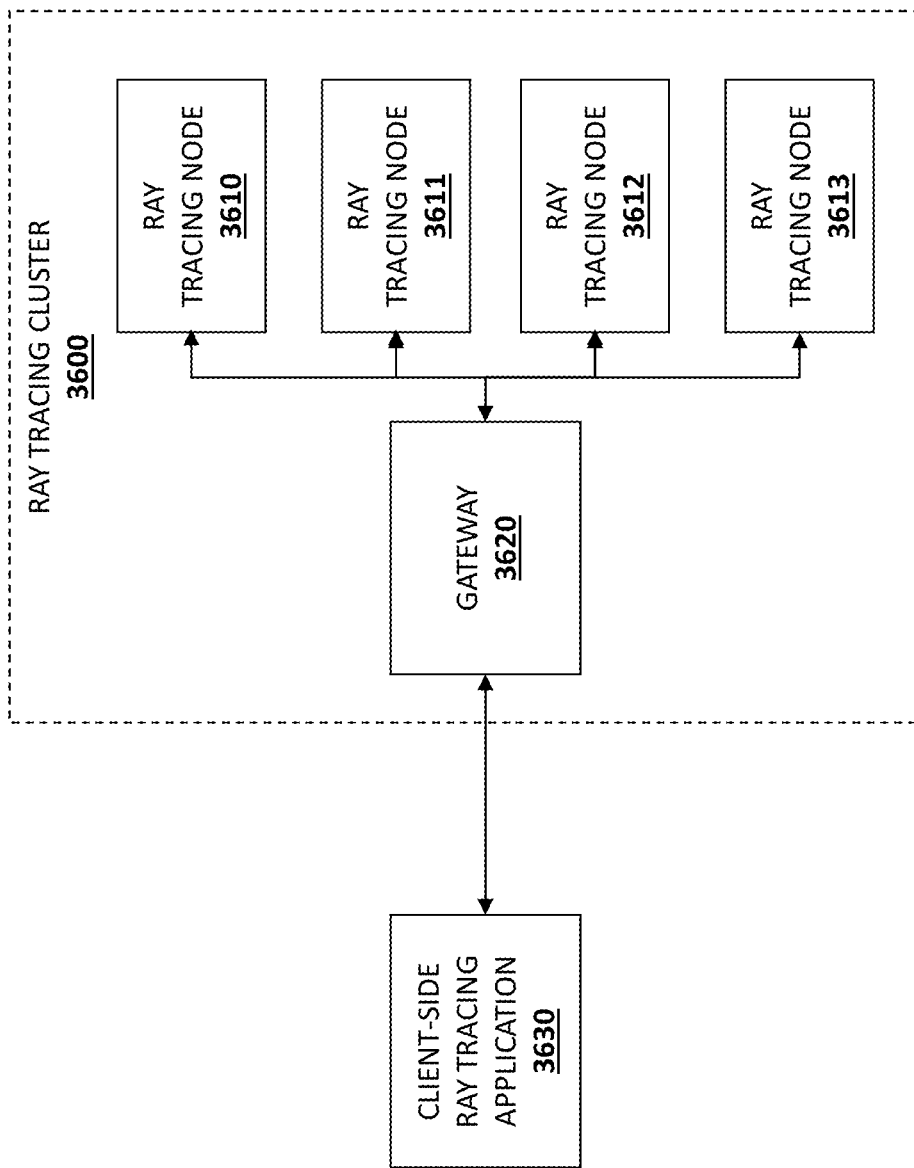
FIG. 36 illustrates an example of a distributed ray tracing engine.

In one embodiment, ray tracing operations are distributed across a plurality of compute nodes coupled together over a network. FIG. 36, for example, illustrates a ray tracing cluster 3600 comprising a plurality of ray tracing nodes 3610-3613 perform ray tracing operations in parallel, potentially combining the results on one of the nodes. In the illustrated architecture, the ray tracing nodes 3610-3613 are communicatively coupled to a client-side ray tracing application 3630 via a gateway.

One of the difficulties with a distributed architecture is the large amount of packetized data that must be transmitted between each of the ray tracing nodes 3610-3613. In one embodiment, both lossless compression techniques and lossy compression techniques are used to reduce the data transmitted between the ray tracing nodes 3610-3613.

To implement lossless compression, rather than sending packets filled with the results of certain types of operations, data or commands are sent which allow the receiving node to reconstruct the results. For example, stochastically sampled area lights and ambient occlusion (AO) operations do not necessarily need directions. Consequently, in one embodiment, a transmitting node will simply send a random seed which is then used by the receiving node to perform random sampling. For example, if a scene is distributed across nodes 3610-3612, to sample light 1 at points p1-p3, only the light ID and origins need to be sent to nodes 3610-3612. Each of the nodes may then stochastically sample the light independently. In one embodiment, the random seed is generated by the receiving node. Similarly, for primary ray hit points, ambient occlusion (AO) and soft shadow sampling can be computed on nodes 3610-3612 without waiting for the original points for successive frames. Additionally, if it is known that a set of rays will go to the same point light source, instructions may be sent identifying the light source to the receiving node which will apply it to the set of rays. As another example, if there are N ambient occlusion rays transmitted a single point, a command may be sent to generate N samples from this point.

Various additional techniques may be applied for lossy compression. For example, in one embodiment, a quantization factor may be employed to quantize all coordinate values associated with the BVH, primitives, and rays. In addition, 32-bit floating point values used for data such as BVH nodes and primitives may be converted into 8-bit integer values. In one particular implementation, the bounds of ray packets are stored in in full precision but individual ray points P1-P3 are transmitted as indexed offsets to the bounds. Similarly, a plurality of local coordinate systems may be generated which use 8-bit integer values as local coordinates. The location of the origin of each of these local coordinate systems may be encoded using the full precision (e.g., 32-bit floating point) values, effectively connecting the global and local coordinate systems.

The following is an example of lossless compression employed in one embodiment of the invention. An example of a Ray data format used internally in a ray tracing program is as follows:

```
struct Ray
{
  uint32 pixId;
  uint32 materialID;
  uint32 instanceID;
  uint64 primitiveID;
  uint32 geometryID;
  uint32 lightID;
  float origin[3];
  float direction[3];
  float t0;
  float t;
  float time;
  float normal[3]; //used for geometry intersections
  float u;
  float v;
  float wavelength;
  float phase; //Interferometry
  float refractedOffset; //Schlieren-esque
  float amplitude;
  float weight;
};
```

Instead of sending the raw data for each and every node generated, this data can be compressed by grouping values and by creating implicit rays using applicable metadata where possible.

Bundling and Grouping Ray Data

One embodiment uses flags for common data or masks with modifiers.

```
struct RayPacket
{
  uint32 size;
  uint32 flags;
  list<Ray> rays;
}
```

For example:
  RayPacket.rays=ray_1 to ray_256
Origins are all Shared
  All ray data is packed, except only a single origin is stored across all rays. RayPacket.flags is set for RAYPACKET_COMMON_ORIGIN. When RayPacket is unpacked when received, origins are filled in from the single origin value.
Origins are Shared Only Among Some Rays
  All ray data is packed, except for rays that share origins. For each group of unique shared origins, an operator is packed on that identifies the operation (shared origins), stores the origin, and masks which rays share the information. Such an operation can be done on any shared values among nodes such as material IDs, primitive IDs, origin, direction, normals, etc.

```
struct RayOperation
{
  uint8 operationID;
  void* value;
  uint64 mask;
}
```

Sending Implicit Rays

Often times, ray data can be derived on the receiving end with minimal meta information used to generate it. A very common example is generating multiple secondary rays to stochastically sample an area. Instead of the sender generating a secondary ray, sending it, and the receiver operating on it, the sender can send a command that a ray needs to be generated with any dependent information, and the ray is generated on the receiving end. In the case where the ray needs to be first generated by the sender to determine which receiver to send it to, the ray is generated and the random seed can be sent to regenerate the exact same ray.

For example, to sample a hit point with 64 shadow rays sampling an area light source, all 64 rays intersect with regions from the same compute N4. A RayPacket with common origin and normal is created. More data could be sent if one wished the receiver to shade the resulting pixel contribution, but for this example let us assume we wish to only return whether a ray hits another nodes data. A RayOperation is created for a generate shadow ray operation, and is assigned the value of the lightID to be sampled and the random number seed. When N4 receives the ray packet, it generates the fully filled Ray data by filling in the shared origin data to all rays and setting the direction based on the lightID stochastically sampled with the random number seed to generate the same rays that the original sender generated. When the results are returned, only binary results for every ray need be returned, which can be handed by a mask over the rays.

Sending the original 64 rays in this example would have used 104 Bytes*64 rays=6656 Bytes. If the returning rays were sent in their raw form as well, than this is also doubled to 13312 Bytes. Using lossless compression with only sending the common ray origin, normal, and ray generation operation with seed and ID, only 29 Bytes are sent with 8 Bytes returned for the was intersected mask. This results in a data compression rate that needs to be sent over the network of ~360:1. This does not include overhead to process the message itself, which would need to be identified in some way, but that is left up to the implementation. Other operations may be done for recomputing ray origin and directions from the pixelD for primary rays, recalculating pixelIDs based on the ranges in the raypacket, and many other possible implementations for recomputation of values. Similar operations can be used for any single or group of rays sent, including shadows, reflections, refraction, ambient occlusion, intersections, volume intersections, shading, bounced reflections in path tracing, etc.

Figure 37:
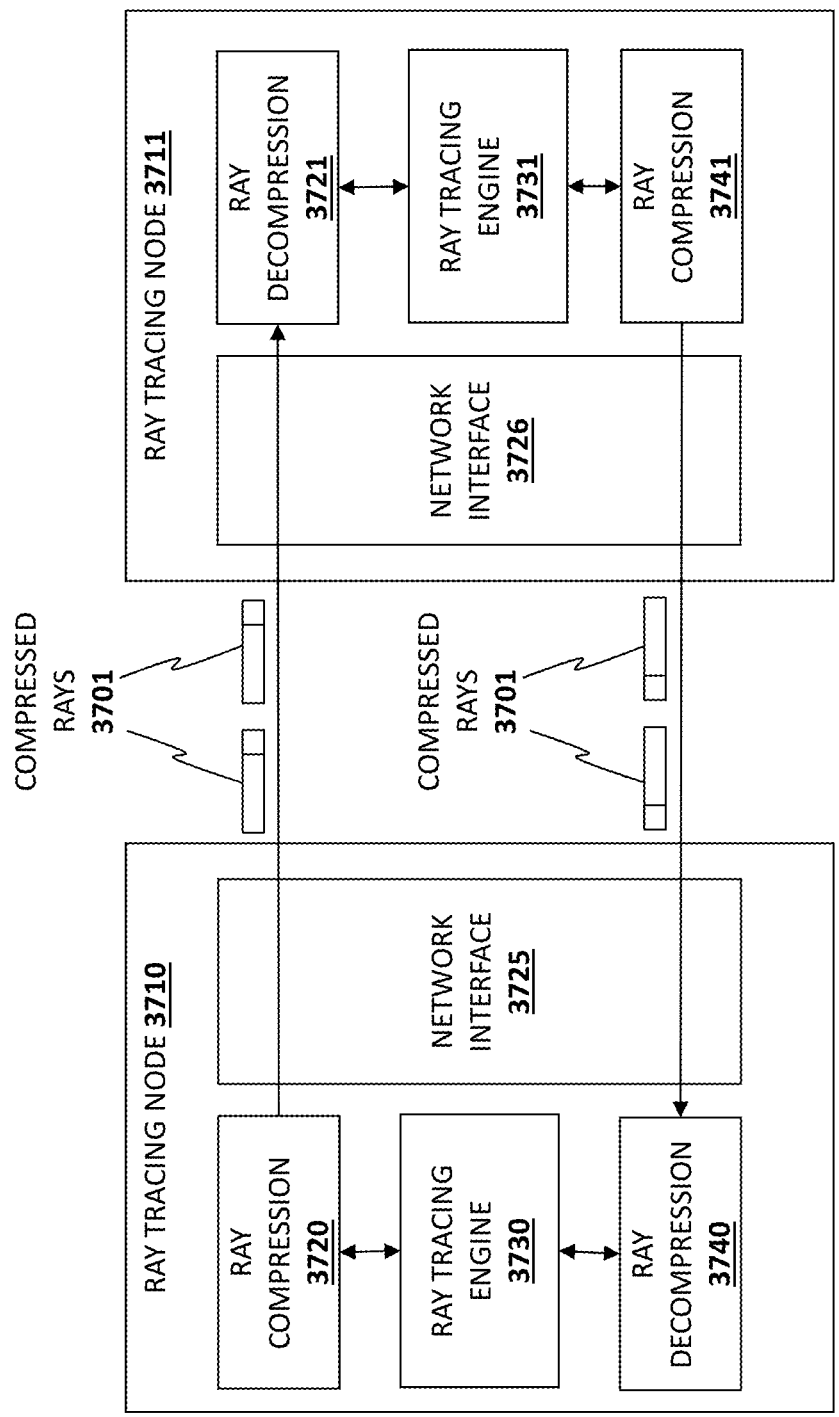
FIGS. 37-38 illustrate an example of compression performed in a ray tracing system.

FIG. 37 illustrates additional details for two ray tracing nodes 3710-3711 which perform compression and decompression of ray tracing packets. In particular, in one embodiment, when a first ray tracing engine 3730 is ready to transmit data to a second ray tracing engine 3731, ray compression circuitry 3720 performs lossy and/or lossless compression of the ray tracing data as described herein (e.g., converting 32-bit values to 8-bit values, substituting raw data for instructions to reconstruct the data, etc). The compressed ray packets 3701 are transmitted from network interface 3725 to network interface 3726 over a local network (e.g., a 10 Gb/s, 100 Gb/s Ethernet network). Ray decompression circuitry then decompresses the ray packets when appropriate. For example, it may execute commands to reconstruct the ray tracing data (e.g., using a random seed to perform random sampling for lighting operations). Ray tracing engine 3731 then uses the received data to perform ray tracing operations.

In the reverse direction, ray compression circuitry 3741 compresses ray data, network interface 3726 transmits the compressed ray data over the network (e.g., using the techniques described herein), ray decompression circuitry 3740 decompresses the ray data when necessary and ray tracing engine 3730 uses the data in ray tracing operations. Although illustrated as a separate unit in FIG. 37, ray decompression circuitry 3740-3741 may be integrated within ray tracing engines 3730-3731, respectively. For example, to the extent the compressed ray data comprises commands to reconstruct the ray data, these commands may be executed by each respective ray tracing engine 3730-3731.

Figure 38:
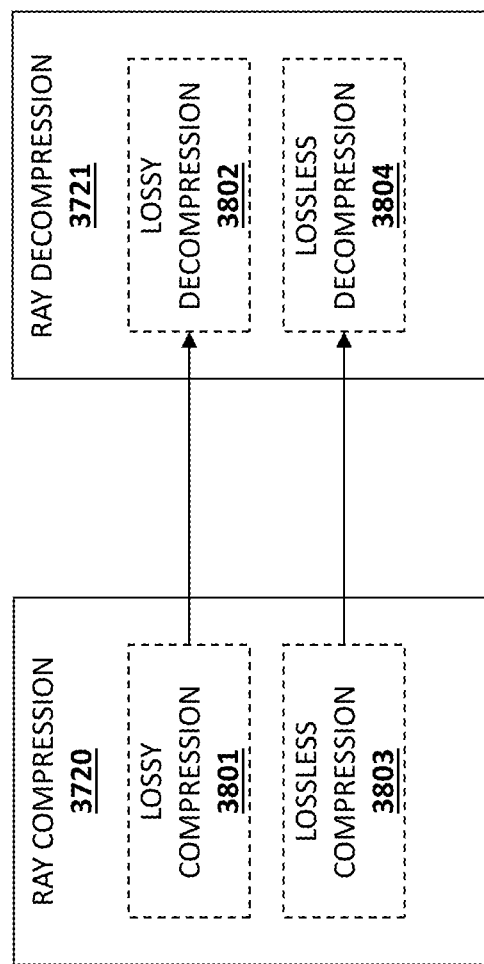

As illustrated in FIG. 38, ray compression circuitry 3720 may include lossy compression circuitry 3801 for performing the lossy compression techniques described herein (e.g., converting 32-bit floating point coordinates to 8-bit integer coordinates) and lossless compression circuitry 3803 for performing the lossless compression techniques (e.g., transmitting commands and data to allow ray recompression circuitry 3821 to reconstruct the data). Ray decompression circuitry 3721 includes lossy decompression circuitry 3802 and lossless decompression circuitry 3804 for performing lossless decompression.

Figure 39:
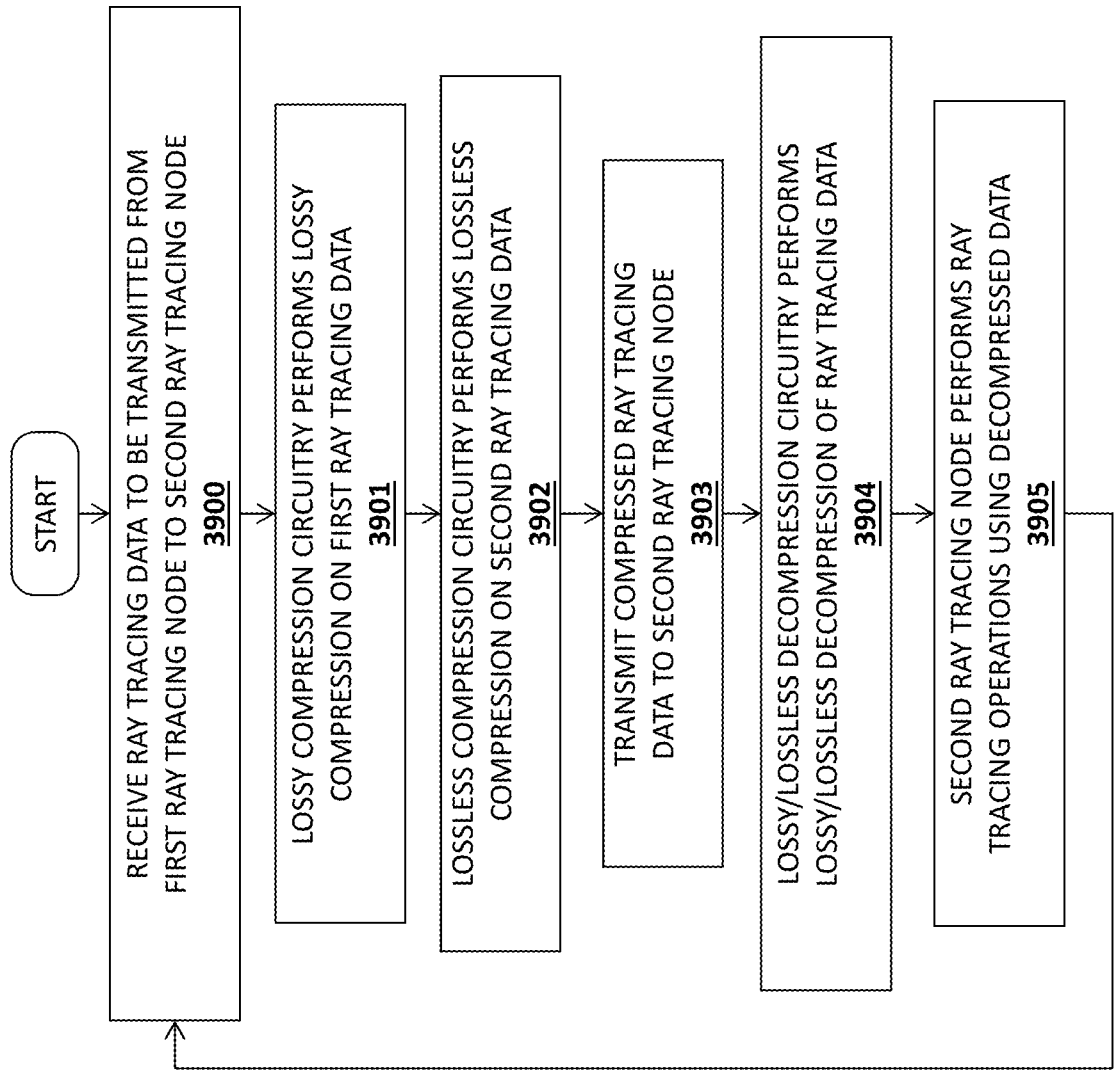
FIG. 39 illustrates a method in accordance with one embodiment of the invention.

A method in accordance with one embodiment is illustrated in FIG. 39. The method may be implemented on the ray tracing architectures described herein but is not limited to any particular architecture.

At 3900, ray data is received which will be transmitted from a first ray tracing node to a second ray tracing node. At 3901, lossy compression circuitry performs lossy compression on first ray tracing data and, at 3902, lossless compression circuitry performs lossless compression on second ray tracing data. At 3903, the compressed ray racing data is transmitted to a second ray tracing node. At 3904, lossy/lossless decompression circuitry performs lossy/lossless decompression of the ray tracing data and, at 3905, the second ray tracing node performs ray tracing operations sing the decompressed data.

Graphics Processor with Hardware Accelerated Hybrid Ray Tracing

One embodiment of the invention includes a hybrid rendering pipeline which performs rasterization on graphics cores 3130 and ray tracing operations on the ray tracing cores 3150, graphics cores 3130, and/or CPU 3199 cores. For example, rasterization and depth testing may be performed on the graphics cores 3130 in place of the primary ray casting stage. The ray tracing cores 3150 may then generate secondary rays for ray reflections, refractions, and shadows. In addition, certain embodiments may select certain regions of a scene in which the ray tracing cores 3150 will perform ray tracing operations (e.g., based on material property thresholds such as high reflectivity levels) while other regions of the scene will be rendered with rasterization on the graphics cores 3130. In one embodiment, this hybrid implementation is used for real-time ray tracing applications—where latency is a critical issue.

One embodiment of the ray traversal architecture described below performs programmable shading and control of ray traversal using existing single instruction multiple data (SIMD) and/or single instruction multiple thread (SIMT) graphics processors while accelerating critical functions, such as BVH traversal and/or intersections, using dedicated hardware. In this embodiment, SIMD occupancy for incoherent paths is improved by regrouping spawned shaders at specific points during traversal and before shading. This is achieved using dedicated hardware that sorts shaders dynamically, on-chip. Recursion is managed by splitting a function into continuations that execute upon returning and regrouping continuations before execution for improved SIMD occupancy.

Programmable control of ray traversal/intersection is achieved by decomposing traversal functionality into an inner traversal that can be implemented as fixed function hardware and an outer traversal that executes on GPU processors and enables programmable control through user defined traversal shaders. The cost of transferring the traversal context between hardware and software is reduced by conservatively truncating the inner traversal state during the transition between inner and outer traversal.

Programmable control of ray tracing can be expressed through the different shader types listed in Table A below. There can be multiple shaders for each type. For example each material can have a different hit shader.

TABLE A

| Shader Type | Functionality |
|---|---|
| Primary | Launching primary rays |
| Hit | Bidirectional reflectance distribution function (BRDF) sampling, launching secondary rays |
| Any Hit | Computing transmittance for alpha textured geometry |
| Miss | Computing radiance from a light source |
| Intersection | Intersecting custom shapes |
| Traversal | Instance selection and transformation |
| Callable | A general-purpose function |

In one embodiment, recursive ray tracing is initiated by an API function that commands the graphics processor to launch a set of primary shaders or intersection circuitry which can spawn ray-scene intersections for primary rays. This in turn spawns other shaders such as traversal, hit shaders, or miss shaders. A shader that spawns a child shader can also receive a return value from that child shader. Callable shaders are general-purpose functions that can be directly spawned by another shader and can also return values to the calling shader.

Figure 40:
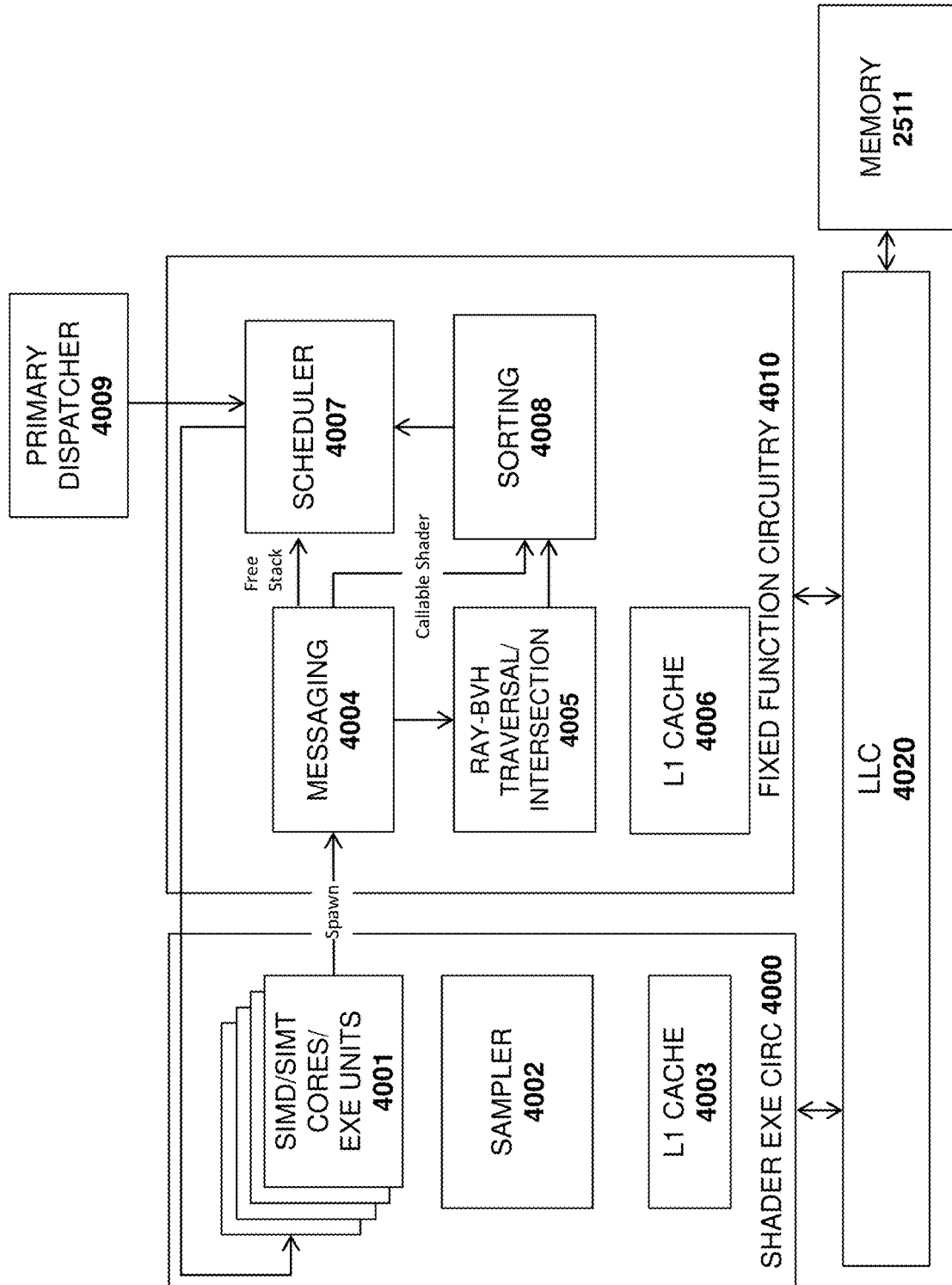
FIG. 40 illustrates an exemplary hybrid ray tracing apparatus.

FIG. 40 illustrates an embodiment of a graphics processing architecture which includes shader execution circuitry 4000 and fixed function circuitry 4010. The general purpose execution hardware subsystem includes a plurality of single instruction multiple data (SIMD) and/or single instructions multiple threads (SIMT) cores/execution units (EUs) 4001 (i.e., each core may comprise a plurality of execution units), one or more samplers 4002, and a Level 1 (L1) cache 4003 or other form of local memory. The fixed function hardware subsystem 4010 includes message unit 4004, a scheduler 4007, ray-BVH traversal/intersection circuitry 4005, sorting circuitry 4008, and a local L1 cache 4006.

In operation, primary dispatcher 4009 dispatches a set of primary rays to the scheduler 4007, which schedules work to shaders executed on the SIMD/SIMT cores/EUs 4001. The SIMD cores/EUs 4001 may be ray tracing cores 3150 and/or graphics cores 3130 described above. Execution of the primary shaders spawns additional work to be performed (e.g., to be executed by one or more child shaders and/or fixed function hardware). The message unit 4004 distributes work spawned by the SIMD cores/EUs 4001 to the scheduler 4007, accessing the free stack pool as needed, the sorting circuitry 4008, or the ray-BVH intersection circuitry 4005. If the additional work is sent to the scheduler 4007, it is scheduled for processing on the SIMD/SIMT cores/EUs 4001. Prior to scheduling, the sorting circuitry 4008 may sort the rays into groups or bins as described herein (e.g., grouping rays with similar characteristics). The ray-BVH intersection circuitry 4005 performs intersection testing of rays using BVH volumes. For example, the ray-BVH intersection circuitry 4005 may compare ray coordinates with each level of the BVH to identify volumes which are intersected by the ray.

Shaders can be referenced using a shader record, a user-allocated structure that includes a pointer to the entry function, vendor-specific metadata, and global arguments to the shader executed by the SIMD cores/EUs 4001. Each executing instance of a shader is associated with a call stack which may be used to store arguments passed between a parent shader and child shader. Call stacks may also store references to the continuation functions that are executed when a call returns.

Figure 41:
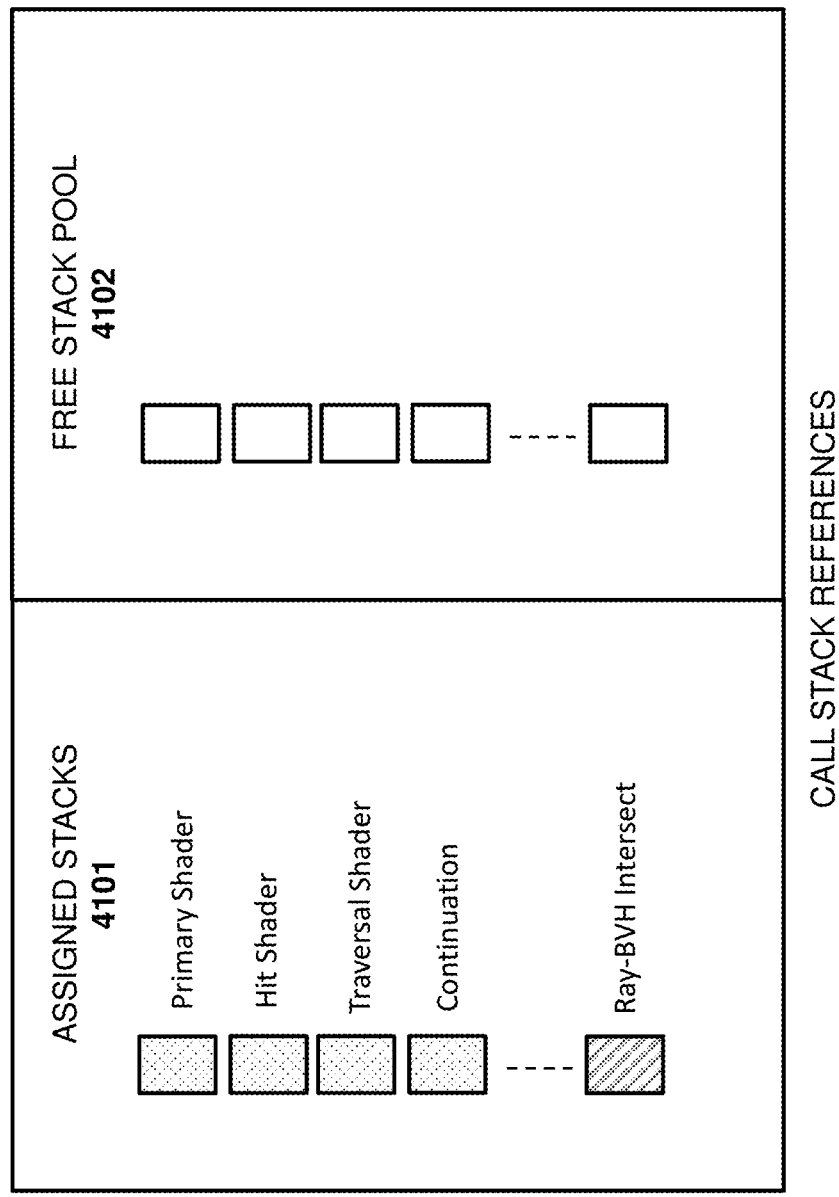
FIG. 41 illustrates examples of stacks used for ray tracing operations.

FIG. 41 illustrates an example set of assigned stacks 4101 which includes a primary shader stack, a hit shader stack, a traversal shader stack, a continuation function stack, and a ray-BVH intersection stack (which, as described, may be executed by fixed function hardware 4010). New shader invocations may implement new stacks from a free stack pool 4102. The call stacks may be cached in a local L1 cache 4003, 4006 to reduce the latency of accesses.

In one embodiment, there are a finite number of call stacks, each with a fixed maximum size "Sstack" allocated in a contiguous region of memory. Therefore the base address of a stack can be directly computed from a stack index (SID) as base address=SID*Sstack. In one embodiment, stack IDs are allocated and deallocated by the scheduler 4007 when scheduling work to the SIMD cores/EUs 4001.

In one embodiment, the primary dispatcher 4009 comprises a graphics processor command processor which dispatches primary shaders in response to a dispatch command from the host (e.g., a CPU). The scheduler 4007 receives these dispatch requests and launches a primary shader on a SIMD processor thread if it can allocate a stack ID for each SIMD lane. Stack IDs are allocated from the free stack pool 4102 that is initialized at the beginning of the dispatch command.

An executing shader can spawn a child shader by sending a spawn message to the messaging unit 4004. This command includes the stack IDs associated with the shader and also includes a pointer to the child shader record for each active SIMD lane. A parent shader can only issue this message once for an active lane. In one embodiment, after sending spawn messages for all relevant lanes, the parent shader terminates.

A shader executed on the SIMD cores/EUs 4001 can also spawn fixed-function tasks such as ray-BVH intersections using a spawn message with a shader record pointer reserved for the fixed-function hardware. As mentioned, the messaging unit 4004 sends spawned ray-BVH intersection work to the fixed-function ray-BVH intersection circuitry 4005 and callable shaders directly to the sorting circuitry 4008. In one embodiment, the sorting circuitry groups the shaders by shader record pointer to derive a SIMD batch with similar characteristics. Accordingly, stack IDs from different parent shaders can be grouped by the sorting circuitry 4008 in the same batch. The sorting circuitry 4008 sends grouped batches to the scheduler 4007 which accesses the shader record from graphics memory 2511 or the last level cache (LLC) 4020 and launches the shader on a processor thread.

In one embodiment, continuations are treated as callable shaders and may also be referenced through shader records. When a child shader is spawned and returns values to the parent shader, a pointer to the continuation shader record is pushed on the call stack 4101. When a child shader returns, the continuation shader record is popped from the call stack 4101 and a continuation shader is spawned. Spawned continuations go through the sorting unit similar to callable shaders and get launched on a processor thread.

Figure 42:
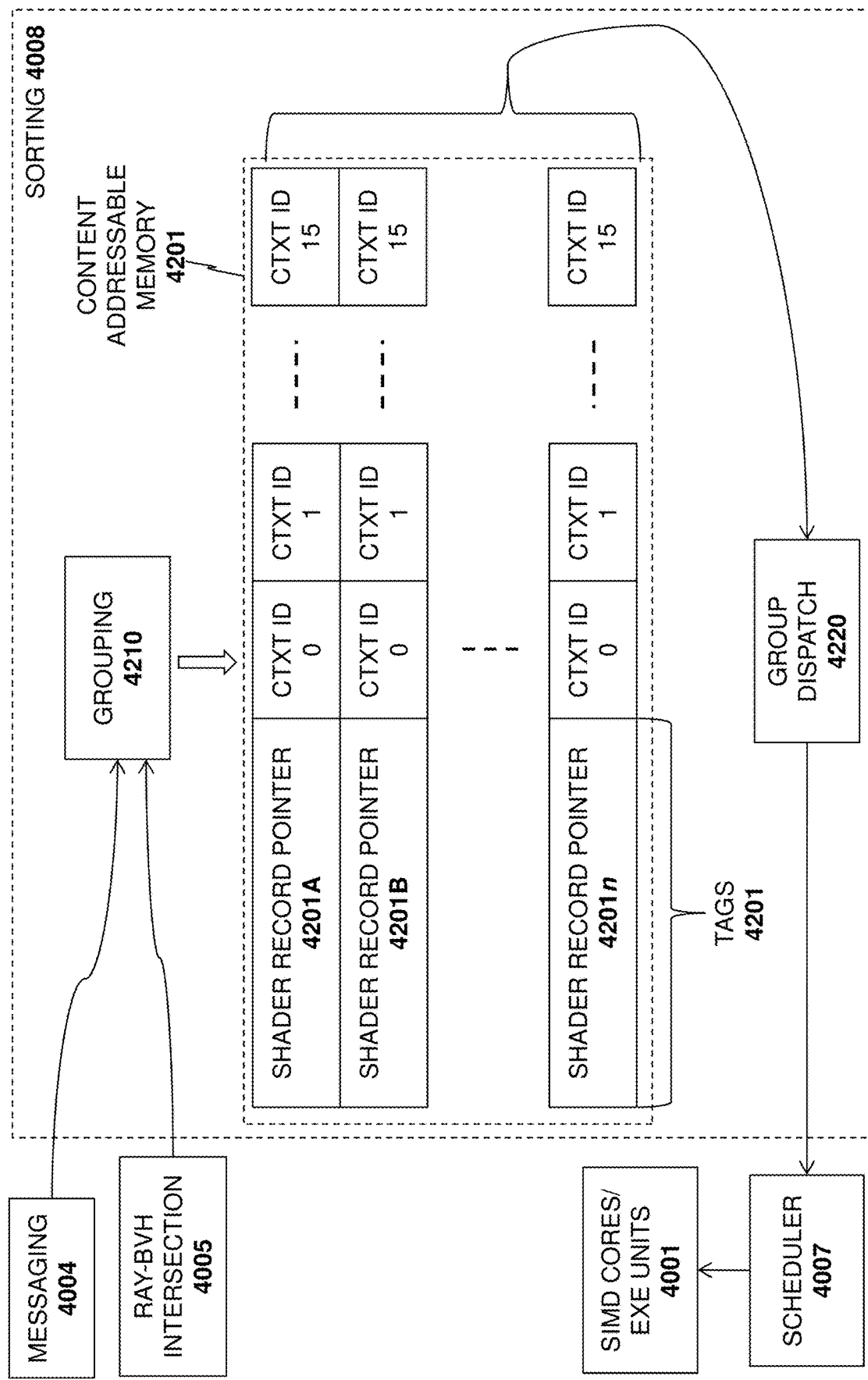
FIG. 42 illustrates additional details for one embodiment of a hybrid ray tracing apparatus.

As illustrated in FIG. 42, one embodiment of the sorting circuitry 4008 groups spawned tasks by shader record pointers 4201A, 4201B, 4201n to create SIMD batches for shading. The stack IDs or context IDs in a sorted batch can be grouped from different dispatches and different input SIMD lanes. In one embodiment, grouping circuitry 4210 performs the sorting using a content addressable memory (CAM) structure 4201 comprising a plurality of entries with each entry identified with a tag 4201. As mentioned, in one embodiment, the tag 4201 is a corresponding shader record pointer 4201A, 4201B, 4201n. In one embodiment, the CAM structure 4201 stores a limited number of tags (e.g. 32, 64, 128, etc) each associated with an incomplete SIMD batch corresponding to a shader record pointer.

For an incoming spawn command, each SIMD lane has a corresponding stack ID (shown as 16 context IDs 0-15 in each CAM entry) and a shader record pointer 4201A-B, . . . n (acting as a tag value). In one embodiment, the grouping circuitry 4210 compares the shader record pointer for each lane against the tags 4201 in the CAM structure 4201 to find a matching batch. If a matching batch is found, the stack ID/context ID is added to the batch. Otherwise a new entry with a new shader record pointer tag is created, possibly evicting an older entry with an incomplete batch.

An executing shader can deallocate the call stack when it is empty by sending a deallocate message to the message unit. The deallocate message is relayed to the scheduler which returns stack IDs/context IDs for active SIMD lanes to the free pool.

Figure 43:
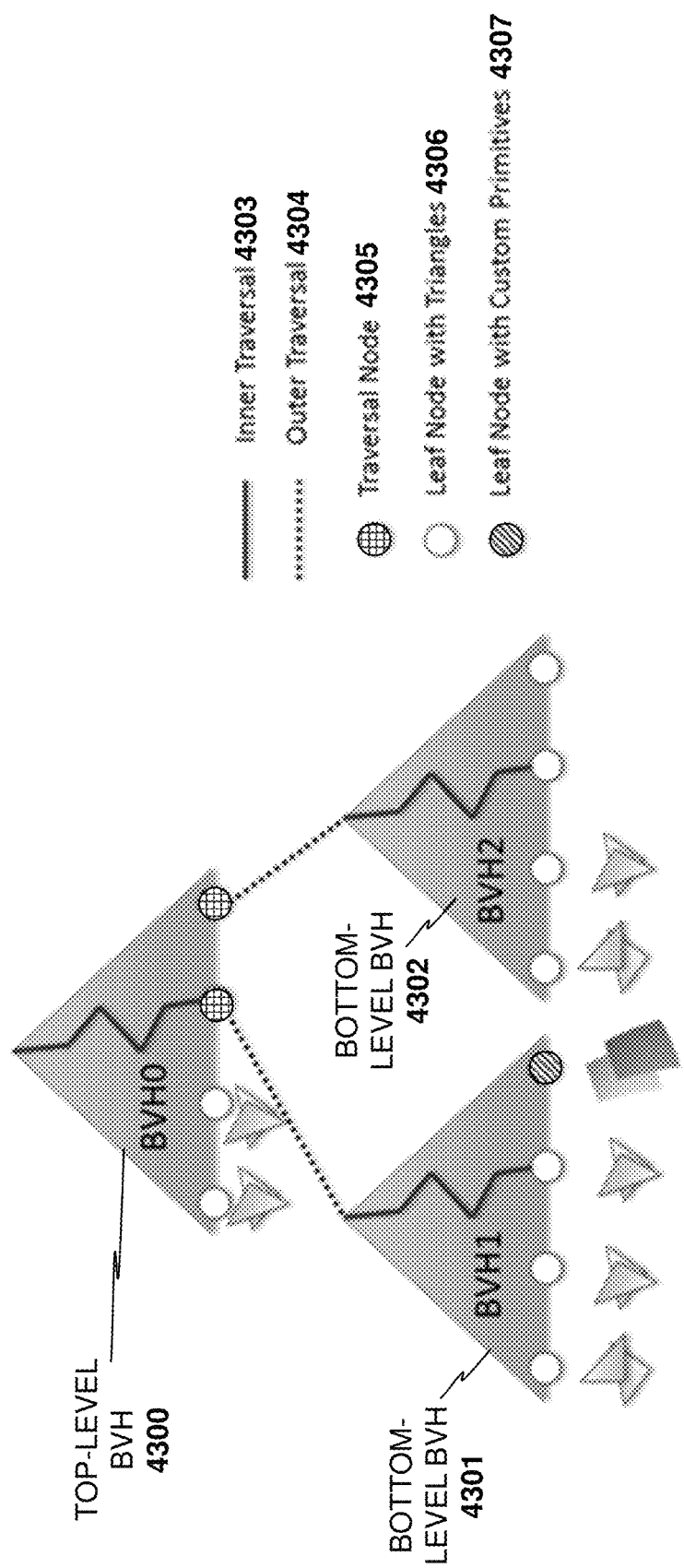
FIG. 43 illustrates an example of a bounding volume hierarchy.

One embodiment of the invention implements a hybrid approach for ray traversal operations, using a combination of fixed-function ray traversal and software ray traversal. Consequently, it provides the flexibility of software traversal while maintaining the efficiency of fixed-function traversal. FIG. 43 shows an acceleration structure which may be used for hybrid traversal, which is a two-level tree with a single top level BVH 4300 and several bottom level BVHs 4301 and 4302. Graphical elements are shown to the right to indicate inner traversal paths 4303, outer traversal paths 4304, traversal nodes 4305, leaf nodes with triangles 4306, and leaf nodes with custom primitives 4307.

The leaf nodes with triangles 4306 in the top level BVH 4300 can reference triangles, intersection shader records for custom primitives or traversal shader records. The leaf nodes with triangles 4306 of the bottom level BVHs 4301-4302 can only reference triangles and intersection shader records for custom primitives. The type of reference is encoded within the leaf node 4306. Inner traversal 4303 refers to traversal within each BVH 4300-4302. Inner traversal operations comprise computation of ray-BVH intersections and traversal across the BVH structures 4300-4302 is known as outer traversal. Inner traversal operations can be implemented efficiently in fixed function hardware while outer traversal operations can be performed with acceptable performance with programmable shaders. Consequently, one embodiment of the invention performs inner traversal operations using fixed-function circuitry 4010 and performs outer traversal operations using the shader execution circuitry 4000 including SIMD/SIMT cores/EUs 4001 for executing programmable shaders.

Note that the SIMD/SIMT cores/EUs 4001 are sometimes simply referred to herein as "cores," "SIMD cores," "EUs," or "SIMD processors" for simplicity. Similarly, the ray-BVH traversal/intersection circuitry 4005 is sometimes simply referred to as a "traversal unit," "traversal/intersection unit" or "traversal/intersection circuitry." When an alternate term is used, the particular name used to designate the respective circuitry/logic does not alter the underlying functions which the circuitry/logic performs, as described herein.

Moreover, while illustrated as a single component in FIG. 40 for purposes of explanation, the traversal/intersection unit 4005 may comprise a distinct traversal unit and a separate intersection unit, each of which may be implemented in circuitry and/or logic as described herein.

In one embodiment, when a ray intersects a traversal node during an inner traversal, a traversal shader is spawned. The sorting circuitry 4008 groups these shaders by shader record pointers 4201A-B, n to create a SIMD batch which is launched by the scheduler 4007 for SIMD execution on the graphics SIMD cores/EUs 4001. Traversal shaders can modify traversal in several ways, enabling a wide range of applications. For example, the traversal shader can select a BVH at a coarser level of detail (LOD) or transform the ray to enable rigid body transformations. The traversal shader then spawns inner traversal for the selected BVH.

Inner traversal computes ray-BVH intersections by traversing the BVH and computing ray-box and ray-triangle intersections. Inner traversal is spawned in the same manner as shaders by sending a message to the messaging circuitry 4004 which relays the corresponding spawn message to the ray-BVH intersection circuitry 4005 which computes ray-BVH intersections.

In one embodiment, the stack for inner traversal is stored locally in the fixed-function circuitry 4010 (e.g., within the L1 cache 4006). When a ray intersects a leaf node corresponding to a traversal shader or an intersection shader, inner traversal is terminated and the inner stack is truncated. The truncated stack along with a pointer to the ray and BVH is written to memory at a location specified by the calling shader and then the corresponding traversal shader or intersection shader is spawned. If the ray intersects any triangles during inner traversal, the corresponding hit information is provided as input arguments to these shaders as shown in the below code. These spawned shaders are grouped by the sorting circuitry 4008 to create SIMD batches for execution.

```
struct HitInfo {
    float barycentrics[2];
    float tmax;
    bool innerTravComplete;
    uint primID;
    uint geomID;
    ShaderRecord* leafShaderRecord;
}
```

Truncating the inner traversal stack reduces the cost of spilling it to memory. One embodiment of the invention uses the approach described in Restart Trail for Stackless BVH Traversal, High Performance Graphics (2010), pp. 107-111, to truncate the stack to a small number of entries at the top of the stack, a 42-bit restart trail and a 6-bit depth value. The restart trail indicates branches that have already been taken inside the BVH and the depth value indicates the depth of traversal corresponding to the last stack entry. This is sufficient information to resume inner traversal at a later time.

Inner traversal is complete when the inner stack is empty and there no more BVH nodes to test. In this case an outer stack handler is spawned that pops the top of the outer stack and resumes traversal if the outer stack is not empty.

In one embodiment, outer traversal executes the main traversal state machine and is implemented in program code executed by the shader execution circuitry 4000. It spawns an inner traversal query under the following conditions: (1) when a new ray is spawned by a hit shader or a primary shader; (2) when a traversal shader selects a BVH for traversal; and (3) when an outer stack handler resumes inner traversal for a BVH.

Figure 44:
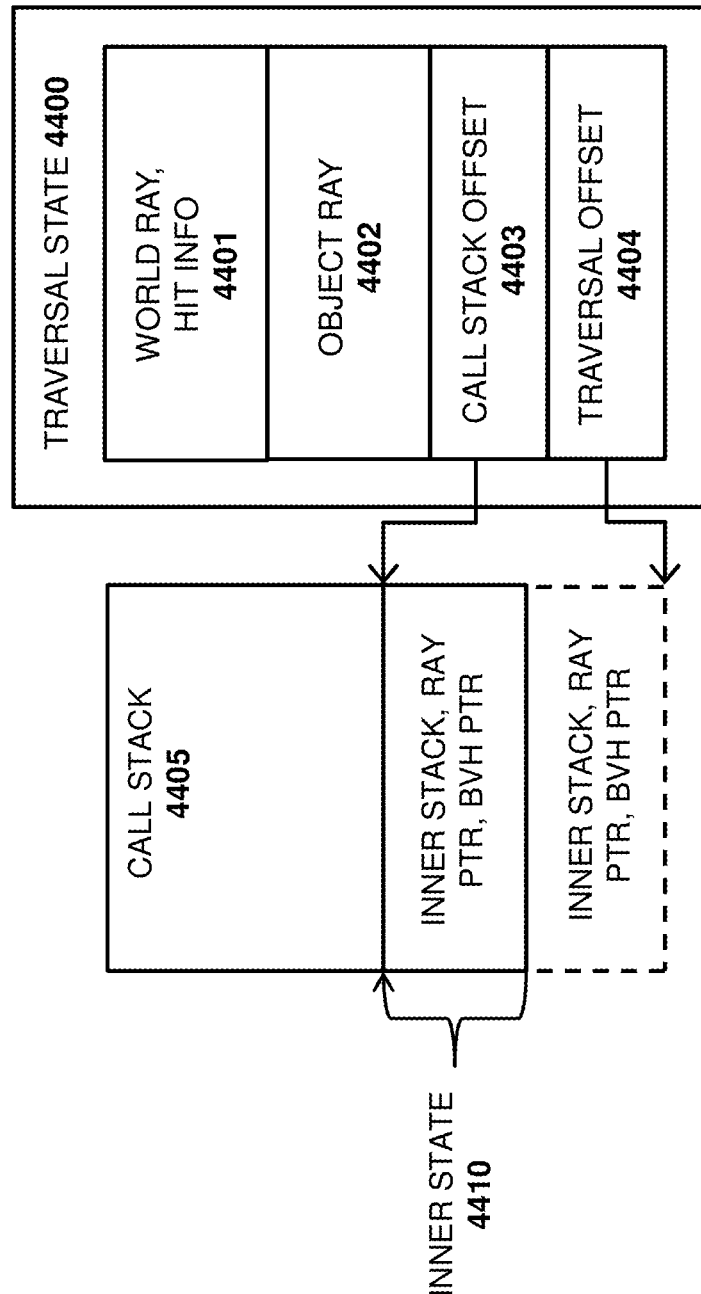
FIG. 44 illustrates an example of a call stack and traversal state storage.

As illustrated in FIG. 44, before inner traversal is spawned, space is allocated on the call stack 4405 for the fixed-function circuitry 4010 to store the truncated inner stack 4410. Offsets 4403-4404 to the top of the call stack and the inner stack are maintained in the traversal state 4400 which is also stored in memory 2511. The traversal state 4400 also includes the ray in world space 4401 and object space 4402 as well as hit information for the closest intersecting primitive.

The traversal shader, intersection shader and outer stack handler are all spawned by the ray-BVH intersection circuitry 4005. The traversal shader allocates on the call stack 4405 before initiating a new inner traversal for the second level BVH. The outer stack handler is a shader that is responsible for updating the hit information and resuming any pending inner traversal tasks. The outer stack handler is also responsible for spawning hit or miss shaders when traversal is complete. Traversal is complete when there are no pending inner traversal queries to spawn. When traversal is complete and an intersection is found, a hit shader is spawned; otherwise a miss shader is spawned.

While the hybrid traversal scheme described above uses a two-level BVH hierarchy, the embodiments of the invention described herein may use an arbitrary number of BVH levels with a corresponding change in the outer traversal implementation.

In addition, while fixed function circuitry 4010 is described for performing ray-BVH intersections in the above embodiments, other system components may also be implemented in fixed function circuitry. For example, the outer stack handler described above may be an internal (not user visible) shader that could potentially be implemented in the fixed function BVH traversal/intersection circuitry 4005. This implementation may be used to reduce the number of dispatched shader stages and round trips between the fixed function intersection hardware 4005 and the processor.

The embodiments of the invention described here enable programmable shading and ray traversal control using user-defined functions that can execute with greater SIMD efficiency on existing and future GPU processors. Programmable control of ray traversal enables several important features such as procedural instancing, stochastic level-of-detail selection, custom primitive intersection and lazy BVH updates.

Compressed Stack Representation for Hierarchical Acceleration Structures of Arbitrary Widths Efficient ray-scene intersection computations are a key to real time raytracing performance. As discussed above in detail, a widely used approach for computing these intersections is to build a Bounding Volume Hierarchy (BVH) and traverse this structure to find geometry that intersects a ray.

In recent years there have been several advances in using fixed function hardware to accelerate BVH traversal, leveraging techniques such as reduced precision arithmetic to reduce intersection costs and BVH node compression to reduce memory bandwidth. The recently released Turing GPU includes fixed function acceleration for ray traversal.

Despite these improvements, ray tracing performance is still constrained by the available memory bandwidth. Although memory traffic related to BVH nodes can be reduced through node compression, there are other aspects of ray tracing that still introduce a significant amount of memory traffic, such as accesses to the traversal stack and reading leaf geometry.

The embodiments of the invention described below utilize a compressed representation of the traversal stack which may be applied to arbitrarily wide BVH topologies. In particular, in one embodiment, a compressed stack representation for N-wide BVHs includes a short stack of a fixed size that can retain a small number of entries at the top of the stack and one additional bit for each entry that indicates whether the entry is the last child in an N-wide BVH internal node.

In one embodiment, a new data structure called the Child Index Array is used, which is an array of length D where each entry is a $\log_2(N)$ bit value that indicates the index of a child subtree that is currently being traversed within its respective level of the BVH. Like the restart trail, the Child Index Array enables restarting traversal from the root node if one or more stack entries are removed from the short stack. However, while the restart trail only applies to a 2-wide BVH, the child index array can be used with BVHs of arbitrary widths.

With hardware-based traversal, the compressed traversal stack can be stored in the hardware registers for low-latency access. However, traversal can potentially be interrupted to execute some parts of traversal on a programmable processor (e.g., such as programmable instancing or intersections as described herein). While these programmable functions execute, the traversal stack can be saved in memory, freeing up the hardware registers for another ray. In one implementation, the short stack is further compressed before it is saved to memory, further reducing memory traffic.

Figure 45:
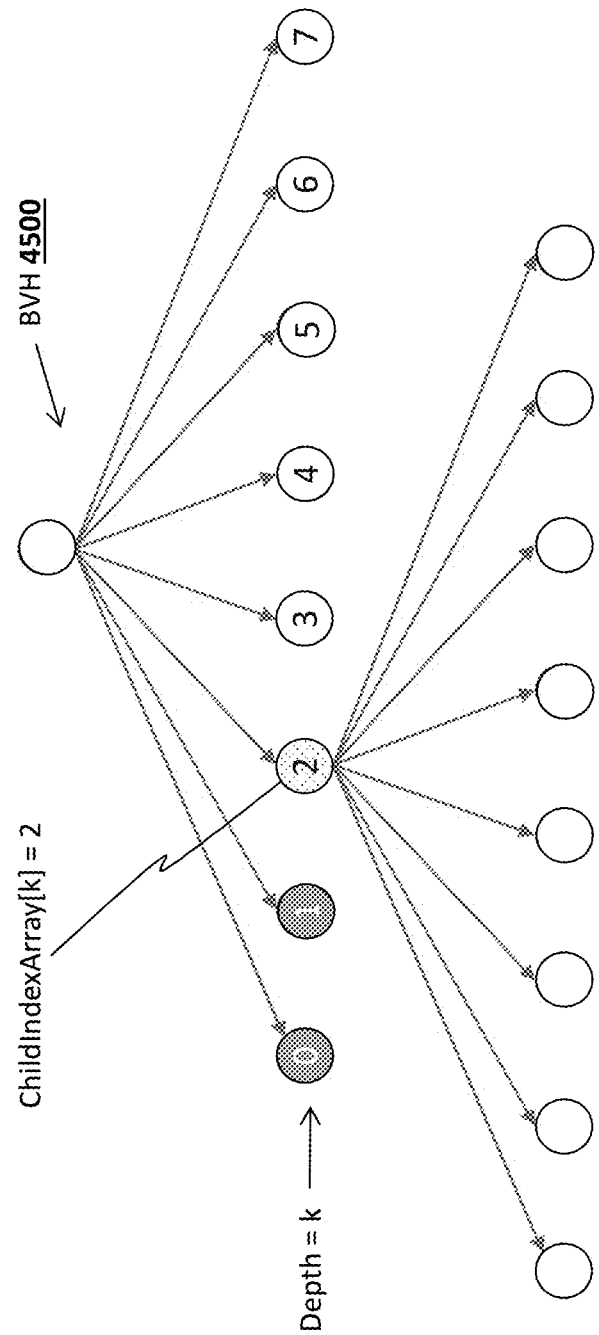
FIG. 45 illustrates an example bounding volume in which each parent node includes eight child nodes.

As illustrated in FIG. 45, in an N-wide BVH 4500, each internal node references N child nodes and includes the bounds of the child nodes. In the illustrated example, N=8 (i.e., each node references 8 child nodes 0-7). Each level or depth of the BVH has a current child index array identifying the node for which traversal is currently being performed. In FIG. 45, at level k in the BVH 6800, nodes 0 and 1 have been traversed and node 2 is currently being traversed (i.e., ChildIndexArray[k]=2).

Figure 46:
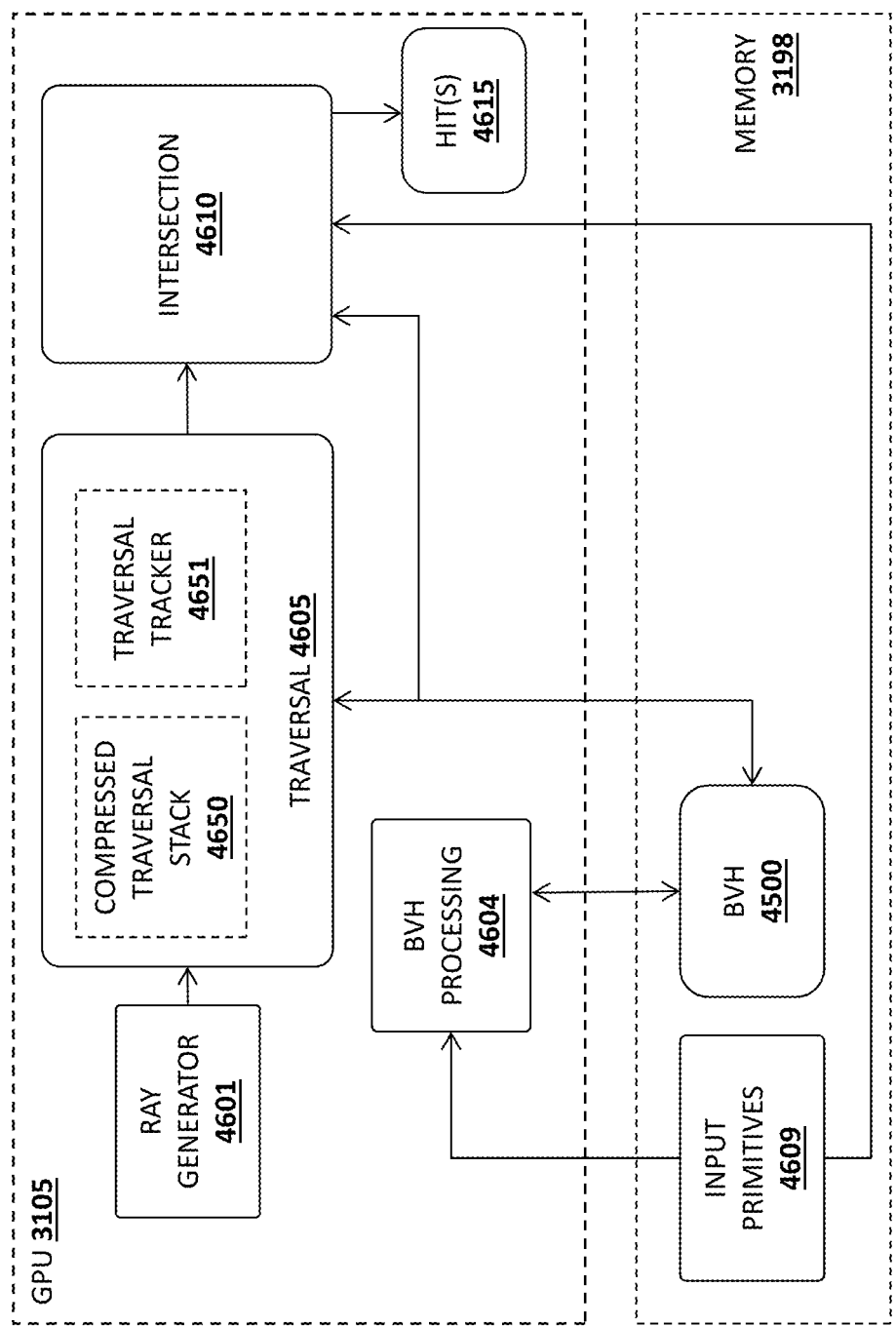
FIG. 46 illustrates one embodiment of an architecture including compressed traversal stack.

FIG. 46 illustrates additional details including a compressed traversal stack 4650 and a traversal tracker 4651. As mentioned, in one embodiment, the compressed traversal stack 4650 is a short stack of a fixed size that can retain a small number of entries at the top of the stack and the traversal tracker 4651 comprises an array having a length equal to the depth of the BVH and a width of a $\log_2(N)$ bit value identifying a particular node at each depth.

In operation, a BVH processor 4604 constructs a BVH 4607 based on the current set of input primitives 4609 of a graphics scene. A ray generator 4601 generates rays which traversal circuitry 4605 traverses through the BVH 4607. Intersection circuitry 4610 identifies ray-primitive intersections to generate hits 4615 which are used for further processing (e.g., generating secondary rays based on material specifications, etc).

In one embodiment, during traversal, a ray is tested against the N children at each BVH level in parallel and the child references are sorted by the hit distance. Traversal then proceeds with the closest child while the other intersecting children are pushed on the traversal stack 4650, with the next closest child at the top of the stack.

Figure 47:
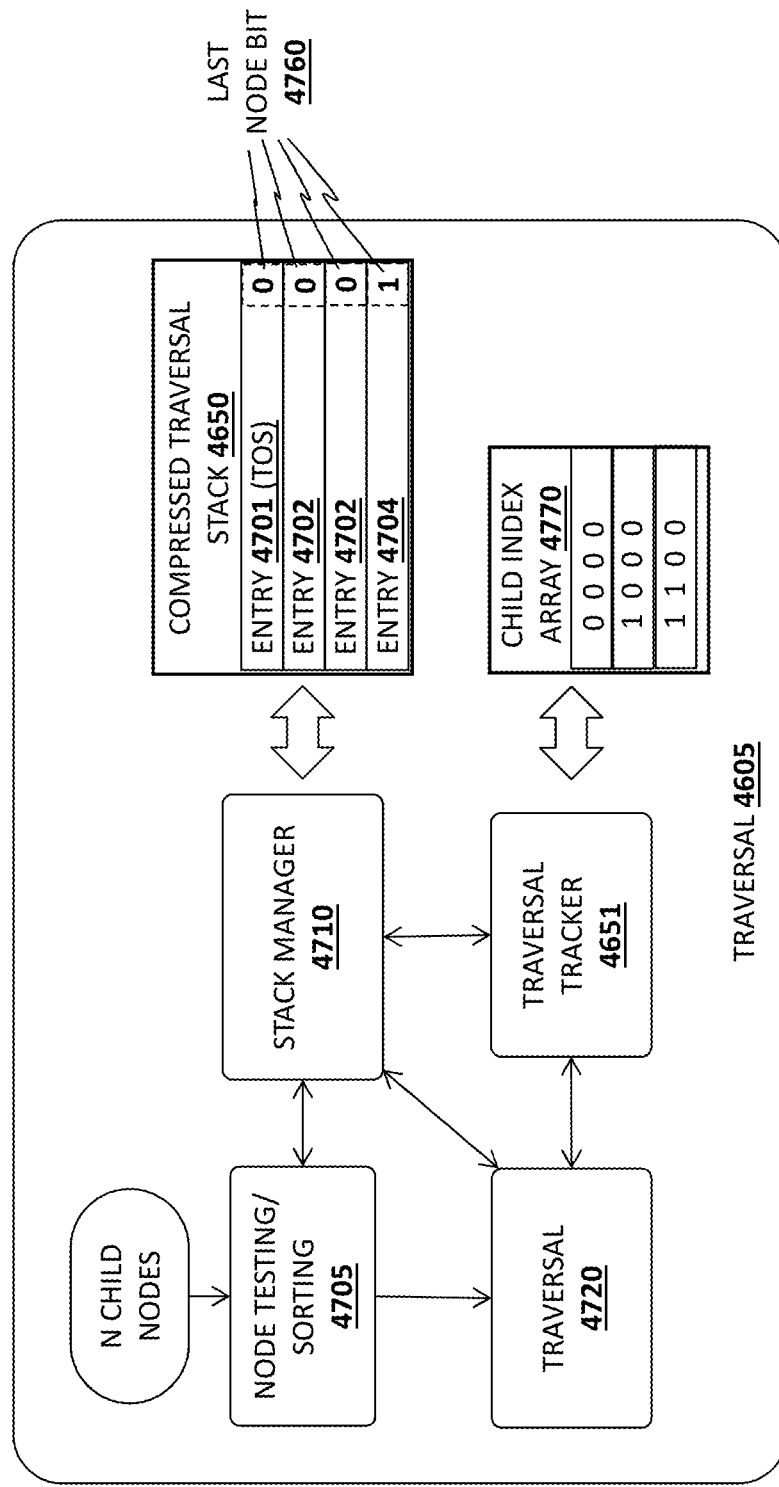
FIG. 47 illustrates a traversal unit including a compressed traversal stack and child index array.

Additional details of one embodiment are illustrated in FIG. 47 which shows node testing/sorting circuitry 4705 testing the N child nodes to determine hit distances and sorting the N child nodes by their respective hit distances. The traversal circuitry 4720 then proceeds with ray traversal for the closest child node while entries 4701-4704 for the other intersecting child nodes are pushed to the compressed traversal stack 4750 with an entry 4701 for the next closest child at the top of the stack (TOS). In the illustrated example, the compressed traversal stack 4650 includes only four entries 4701-4704 associated with the four closest child nodes (other than the closest node which is immediately traversed by the traversal circuitry 4720). A stack manager 4710 provides access to the compressed traversal stack 6850 upon request from the traversal circuitry 4720.

The traversal tracker 4651 updates a child index array 4770 which identifies the child node/subtree in each level of the BVH hierarchy which is currently being traversed. In one implementation, the array length is equal to the depth of the BVH (3 in the example) and each entry in the child index array 4770 is a $\log_2(N)$ bit value comprising the index of the child subtree currently being traversed. In one embodiment, child nodes assigned an index smaller than the current child index (processed nodes 0 and 1 in FIG. 45) have been fully traversed and will therefore not be revisited in the event of a restart. In one embodiment, when last intersected child is being traversed, the child index is set to the maximum value to indicate that there are no more entries on the stack.

In one embodiment, the compressed traversal stack 6850 stores the top few entries of the stack in a circular array. The example code sequence below describes a short stack of size four. Each stack entry in the short stack includes the offset to a node, miscellaneous information such as the node type (internal, primitive, instance etc.) as well as one bit that indicates if this child is the last (farthest) intersected child node in a parent node.

```
struct StackEntry {
    uint offset;
    bool isLastChild;
}
struct ShortStack{
    StackEntry entries[4];
    uint wrIndex;
    uint size;
    void Initialize( ) {
        wrIndex = 0;
        size = 0;
    }
    void Push(StackEntry entry) {
        entries[wrIndex] = entry;
        wrIndex = (wrIndex + 1) % 4;
        size++;
    }
    StackEntry Pop( ) {
        wrIndex = (wrIndex - 1) % 4;
        size--;
        return entries[wrIndex];
    }
    bool IsEmpty( ) {
        return (size == 0);
    }
}
```

The example code sequence below describes the traversal algorithm with the compressed stack representation:

```
struct BoxHit {
    uint offset;    // child offset
    float t;        // child distance. INF if child is not intersected
}
void Traverse(Ray& ray) {
    currNodeOffset = 0;
    currDepth = 0;
    const MAX_CHILD = log2(N) - 1;
    // Initialize index in the chIndexArray
    for (int i = 1; i <maxDepth; i++) {
        chIndexArray.SetCount(i, 0);
    }
    while (true) {
        if (!node->IsLeaf( )) {
            BoxHit children[N];
            /* Test ray against N boxes */
            BoxTest(ray, currNodeOffset, children);
            SortByDistance(children);
            /* push all except closest child on stack */
            int nextChild = chIndexArray.GetCount(currDepth);
            /* push all except closest child on stack */
            int numHits = 0;
            int i = MAX_CHILD;
            bool lastChild = true:
            for (; i > 0; i--) {
                if (children[i].t ! = INFINITY) {
                    numHits++;
                    // max value of next child indicates that subtrees for
                    // all children except the last one have been fully traversed
                    if (nextChild == MAX_CHILD || i = = nextChild) {
                        break;
                    }
                    StackEntry stackEntry;
                    stackEntry.offset = children[i] offset;
                    stackEntry.lastChild = lastChild;
                    lastChild = false;
                    stackPush(stackEntry);
                }
            }
            /* no child hit */
            if (!numHits) {
                chIndexArray.SetCount(currDepth, MAX_CHILD);
                if (!stackPop( ))
                    break;
            }
            else {
                /* Traverse closest child whose subtree has not been fully
                traversed */
                currNodeOffset = children[i].node;
                currDepth++;
            }
        }
        else {
            PrimitiveTest(ray, node);
            if (!stackPop( ))
                break;
        }
    }
}
```

The example code sequence below specifies updating of the child index array in one embodiment:

```
int findNextDepth( ) {
    int i = currDepth;
    for (; i >= 0; i--) {
        nextChild = chIndexArray.GetCount(i);
        if (nextChild != MAX_CHILD)
            break;
    }
    return i;
}
void clearTrail( ) {
    for (int i = currDepth; i <= MAX_DEPTH; i++) {
        chIndexArray.SetCount(i, 0);
    }
}
bool stackPop( ) {
    currDepth--;
    currDepth = findNextDepth( );
    /* Exit if stack is empty */
    if (currDepth < 0) {
        return false;
    }
    uint nextChild = chIndexArray.GetCount(currDepth);
    chIndexArray.SetCount(currDepth, ++nextChild);
    currDepth++;
    clearTrail( );
    StackEntry stackEntry;
    bool shortStackEmpty = popShortStack(stackEntry);
    if (!shortStackEmpty) {
        currNodeOffset = stackEntry.offset;
```

```
            if (stackEntry.lastChild) {
                chIndexArray.SetCount(currDepth, MAX_CHILD);
            }
            currDepth++;
        }
        else {
            currDepth = 0;
            currNodeOffset = 0;
        }
        return true;
    }
```

Stack Compaction

When hardware ray traversal is interrupted at a leaf node (e.g., when a custom primitive or an instance node is reached), the compressed stack representation can be further compacted before it is saved to memory by encoding the current depth and stack size. The code example below lists the steps for compacting and restoring a 4-deep short stack.

```
struct CompactedStack {
    int2 child IndexArray[MAX_DEPTH];
    StackEntry entries[4]; // 4 Deep short stack
}
CompactStack compactStack( ) {
    CompactStack cstack;
    // Save child index array
    cstack.chIndexArray=chIndexArray;
    // Encode current leaf depth in the Child index array by
        setting
    //the child index to max value for all depths>current
        depth
    for (int i=currDept; i<MAX_DEPTH; i++) {
        cstack.chIndexArray.SetCount(i, MAX_CHILD);
    }
    // Copy stack entries from the circular buffer to a linear
        array
    int cirIdx=shortStack.wrIndex-1;
    for (int i=shortStack.size; i>=0; i--) {
        cstack.entries[i]=shortStack.entries[cirIdx];
        cirIdx=(cirIdx-1) % 4;
    }
    //If the stack size is less than maximum, add a sentinel
        entry
    // with a 0 offset to encode the stack size
    if (shortStack.size<4) {
        cstack.entries[shortStack.size].offset=0;
    }
    return cstack;
}
void restoreStack(CompactStack cstack) {
    // Restore child index array
    chIndexArray=cstack.chIndexArray;
    // Find current depth by searching upwards
    // Clear child index values below current depth
    int i=MAX_DEPTH
    for (; i>=0; i--) {
        if (cstack.chIndexArray.GetCount(i)    !=MAX-
            _CHILD)
            break;
        chIndexArray.SetCount(i, 0);
    }
    currDepth=i;
    // Copy stack entries back to the circular buffer from the
        linear array
    int cirIdx=shortStack.wrIndex-1;
    for (int i=0; i<4; i++) {
        // If a sentinel entry with a 0 offset is found
        //the stack size is smaller than max size
        if (cstack.entries[i].offset==0)
            break;
        shortStack.entries[i]=cstack.entries[i];
    }
    shortStack.size=i;
    shortStack.wrIndex=shortStack.size % 4;
}
```

Additional Truncation and Compressed Offsets

During stack compaction, one or more entries can be dropped from the bottom of the stack to further reduce its size before saving it to memory. Moreover, the number of bits required for the stack entries can be reduced by storing the node offset values for the top stack entries relative to the offset value for the bottom most entry. If the relative offsets are small, they can be stored with fewer bits and the number of bits needed for the offsets can be specified in the compacted stack. The approach of storing fewer bits using relative or delta encoding schemes can be applied to storing hit distances (single precision floating point values) on the compacted stack as well. For example, hit distances for the children of the same BVH node deeper in the BVH tree will typically be close by each other, which increases the probability that the upper most bits of the floating point representation are similar and can therefore be efficiently compressed.

The example code below shows a compact stack layout with compressed relative offsets. Additional truncation and compressed offsets can be employed to align the size of the compacted stack to the cache line size.

```
struct CompactStackRelOffsets {
    uint32_t         offsetBottom;
    bit              isLastChildBottom;
    uint4_t          nOffsetBits;
    nOffsetBits      relOffset[3];
    bit              isLastChild[3];
    uint2_t          childIndexArray[MAX_DEPTH];
}
```

Path Encoding Array

As described above, the child index array specifies the index of the currently traversed child node at each BVH level, where the child nodes are sorted by their distance from the ray origin. Since the hit distance depends on the ray parameters such as the ray direction, the order of the child nodes can be different for different rays.

Figure 48:
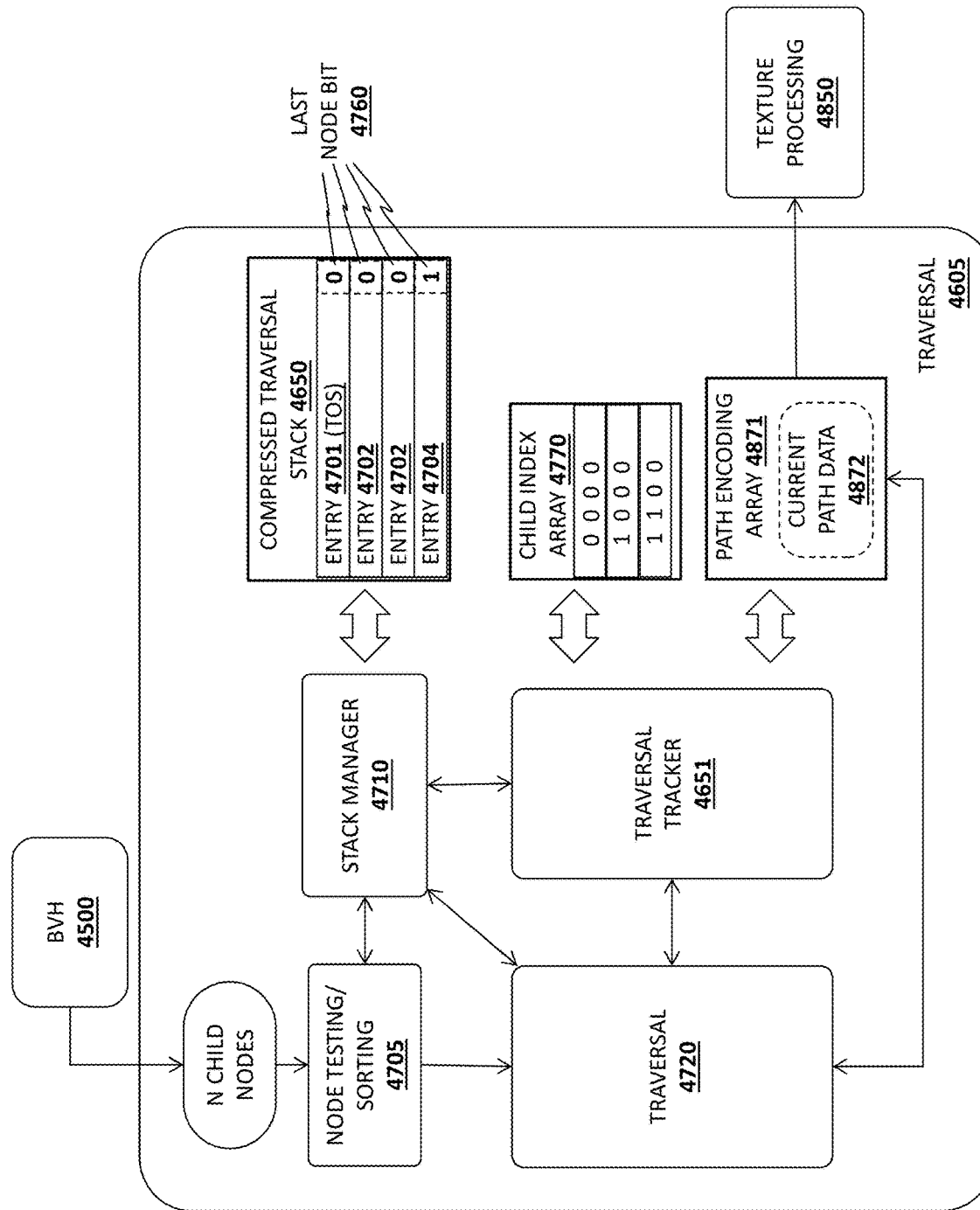
FIG. 48 illustrates one embodiment which uses a path encoding array to avoid retracing a prior traversal path.

As illustrated in FIG. 48, the traversal tracker 4651 of one embodiment also manages a path encoding array 4771 which stores the current path data 4772 including the index of the currently traversed child node. In contrast to the child index array, in the path encoding array 4771 the child nodes are not sorted by the hit distance. Therefore, the order of the child nodes remains the same irrespective of the ray. When a ray intersects a leaf node, the value of the current path data 4772 in the path encoding array 4771 uniquely encodes the position of the leaf node in the BVH 4500.

In one embodiment, the traversal circuitry 4720 uses the current path data 4772 to prevent new rays from re-intersecting the triangles from which they originated, avoiding the previously-encoded path. This approach has a significantly lower complexity than existing techniques to avoid self-intersections.

Moreover, since the path encoding array 4771 uniquely encodes the position of a node or a subtree inside the BVH 4500, in one embodiment, the texture processing circuitry/ logic 4850 uses the current path data 4872 as a key to sort hit points for improved texture locality.

The embodiments of the invention described above utilize a compressed representation of the traversal stack which may be applied to arbitrarily wide BVH topologies. In addition, the Child Index Array indicating a child subtree that is currently being traversed allows the traversal circuitry/logic to begin traversal from the current child subtree in the event of a restart, thereby conserving processing resources using a limited amount of storage. In addition, with hardware-based traversal, the compressed traversal stack described above can be stored in the hardware registers for low-latency access. The traversal stack can also be saved in memory, freeing up the hardware registers for another ray. In one implementation, the short stack is further compressed before it is saved to memory, further reducing memory traffic. Finally, a path encoding may be used to store a current path where the child nodes are not sorted by hit distance.

In embodiments, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine, module, or logic may be implemented in firmware, hardware, software, or any combination of firmware, hardware, and software.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a ray generator to generate a plurality of rays in a first graphics scene;
a bounding volume hierarchy (BVH) generator to construct a BVH comprising a plurality of hierarchically arranged nodes, wherein the BVH comprises a specified number of child nodes at a current BVH level beneath a parent node in the hierarchy;
traversal/intersection circuitry to traverse one or more of the rays through the hierarchically arranged nodes of the BVH to form a current traversal path and intersect the one or more rays with primitives contained within the nodes; and
traversal tracking circuitry to maintain a path encoding array to store path data related to the current traversal path, the path data comprising an index of a currently traversed child node;
wherein the traversal/intersection circuitry is to prevent one or more subsequent rays from re-intersecting primitives from which they originated and/or avoid re-traversing the current traversal path based on the path data in the path encoding array.

2. The apparatus of claim 1 wherein the path data comprises an index of one or more additional child nodes and wherein the child nodes are not sorted by a hit distance from a current ray origin.

3. The apparatus of claim 1 further comprising:
a short traversal stack of a fixed size comprising a specified number of entries fewer than the number of child nodes beneath the parent node, each entry associated with a child node at the current BVH level, the entries ordered from top to bottom within the short traversal stack based on a sorted distance of each respective child node,
wherein each entry includes a field to indicate whether that entry is associated with a final child in the current BVH level;
wherein the traversal/intersection circuitry is to process entries from the top of the traversal stack, removing entries as they are processed, the traversal/intersection circuitry to determine that a current entry is associated with the final child node at the current BVH level by reading a first value in the field.

4. The apparatus of claim 3 wherein the value comprises a single bit value, the single bit value set to 1 to indicate that the entry is associated with the final child node in the current BVH level.

5. The apparatus of claim 4 wherein the traversal/intersection circuitry is to move to a new set of nodes of the BVH after determining that the current entry is associated with the final child node a the current BVH level.

6. The apparatus of claim 3 further comprising:
sorting circuitry and/or logic to sort the child nodes at the current BVH level based on distance of the child nodes from an origin of the ray; and
indexing circuitry and/or logic to maintain a child index array having a number of index entries equal to a depth of the BVH, wherein each entry identifies a child subtree that is currently being traversed at a particular level of the BVH.

7. The apparatus of claim 6 wherein an index value in an index entry is increased as the traversal/intersection circuitry completes processing a given child node at an associated BVH level.

8. The apparatus of claim 7 wherein child nodes associated with index values smaller than a current index value in the index entry have been processed by the traversal/intersection circuitry.

9. The apparatus of claim 8 wherein in the event of a restart, the traversal/intersection circuitry is to restart at the child node associated with the current index value and is to avoid re-processing those child nodes associated with index values smaller than the current index value and is further to avoid re-traversing the current traversal path based on the path data in the path encoding array.

10. A method comprising:
generating a plurality of rays in a first graphics scene;
constructing a bounding volume hierarchy (BVH) comprising a plurality of hierarchically arranged nodes, wherein the BVH comprises a specified number of child nodes at a current BVH level beneath a parent node in the hierarchy;
traversing one or more of the rays through the hierarchically arranged nodes of the BVH to form a current traversal path;
intersecting the one or more rays with primitives contained within the nodes; and
maintaining a path encoding array to store path data related to the current traversal path, the path data comprising an index of a currently traversed child node;
evaluating the path data in the path encoding array to prevent one or more subsequent rays from re-intersecting primitives from which they originated and/or avoid re-traversing the current traversal path.

11. The method of claim 10 wherein the path data comprises an index of one or more additional child nodes and wherein the child nodes are not sorted by a hit distance from a current ray origin.

12. The method of claim 10 further comprising:
providing a short traversal stack of a fixed size comprising a specified number of entries fewer than the number of child nodes beneath the parent node, each entry associated with a child node at the current BVH level, the entries ordered from top to bottom within the short traversal stack based on a sorted distance of each respective child node;
wherein each entry includes a field to indicate whether that entry is associated with a final child in the current BVH level;
wherein entries are to be processed from the top of the traversal stack and removed as they are processed, a current entry to be identified as associated with the final child node at the current BVH level by reading a first value from the field.

13. The method of claim 12 wherein the value comprises a single bit value, the single bit value set to 1 to indicate that the entry is associated with the final child node in the current BVH level.

14. The method of claim 12 wherein a new set of nodes of the BVH are to be processed after determining that the current entry is associated with the final child node a the current BVH level.

15. The method of claim 12 further comprising:
sorting the child nodes at the current BVH level based on distance of the child nodes from an origin of the ray; and
generating and updating a child index array having a number of index entries equal to a depth of the BVH, wherein each entry identifies a child subtree that is currently being traversed at a particular level of the BVH.

16. The method of claim 15 wherein an index value in an index entry is increased as the traversal/intersection circuitry completes processing a given child node at an associated BVH level.

17. The method of claim 16 wherein child nodes associated with index values smaller than a current index value in the index entry have been processed by the traversal/intersection circuitry.

18. The method of claim 17 further comprising:
responsive to a restart event, restarting at the child node associated with the current index value, avoiding re-processing those child nodes associated with index values smaller than the current index value, and avoid re-traversing the current traversal path based on the path data in the path encoding array.

19. A non-transitory machine-readable medium having program code stored thereon which, when executed by a machine, causes the machine to perform the operations of:
generating a plurality of rays in a first graphics scene;
constructing a bounding volume hierarchy (BVH) comprising a plurality of hierarchically arranged nodes, wherein the BVH comprises a specified number of child nodes at a current BVH level beneath a parent node in the hierarchy;
traversing one or more of the rays through the hierarchically arranged nodes of the BVH to form a current traversal path;
intersecting the one or more rays with primitives contained within the nodes; and
maintaining a path encoding array to store path data related to the current traversal path, the path data comprising an index of a currently traversed child node;
evaluating the path data in the path encoding array to prevent one or more subsequent rays from re-intersecting primitives from which they originated and/or avoid re-traversing the current traversal path.

20. The non-transitory machine-readable medium of claim 19 wherein the path data comprises an index of one or more additional child nodes and wherein the child nodes are not sorted by a hit distance from a current ray origin.

21. The non-transitory machine-readable medium of claim 19 further comprising:
providing a short traversal stack of a fixed size comprising a specified number of entries fewer than the number of child nodes beneath the parent node, each entry associated with a child node at the current BVH level, the entries ordered from top to bottom within the short traversal stack based on a sorted distance of each respective child node;

wherein each entry includes a field to indicate whether that entry is associated with a final child in the current BVH level;

wherein entries are to be processed from the top of the traversal stack and removed as they are processed, a current entry to be identified as associated with the final child node at the current BVH level by reading a first value from the field.

22. The non-transitory machine-readable medium of claim 21 wherein the value comprises a single bit value, the single bit value set to 1 to indicate that the entry is associated with the final child node in the current BVH level.

23. The non-transitory machine-readable medium of claim 21 wherein a new set of nodes of the BVH are to be processed after determining that the current entry is associated with the final child node a the current BVH level.

24. The non-transitory machine-readable medium of claim 21 further comprising:

sorting the child nodes at the current BVH level based on distance of the child nodes from an origin of the ray; and generating and updating a child index array having a number of index entries equal to a depth of the BVH, wherein each entry identifies a child subtree that is currently being traversed at a particular level of the BVH.

25. The non-transitory machine-readable medium of claim 24 wherein an index value in an index entry is increased as the traversal/intersection circuitry completes processing a given child node at an associated BVH level.

26. The non-transitory machine-readable medium of claim 25 wherein child nodes associated with index values smaller than a current index value in the index entry have been processed by the traversal/intersection circuitry.

27. The non-transitory machine-readable medium of claim 26 further comprising:

responsive to a restart event, restarting at the child node associated with the current index value, avoiding re-processing those child nodes associated with index values smaller than the current index value, and avoid re-traversing the current traversal path based on the path data in the path encoding array.

* * * * *